US012768113B1

(12) United States Patent
Benton, Jr. et al.

(10) Patent No.: US 12,768,113 B1
(45) Date of Patent: Oct. 20, 2026

(54) CRYOGENIC TRENCH/TROUGH APPARATUS AND METHOD

(71) Applicant: WASKEY BRIDGES, INC., Baton Rouge, LA (US)

(72) Inventors: Stephen G. Benton, Jr., Metairie, LA (US); Benjamin Owens, Baton Rouge, LA (US); Kevin Babin, Baton Rouge, LA (US); Jon Gary, Baton Rouge, LA (US); Christopher McCrary Thompson, Baton Rouge, LA (US); Darran Buxton, Greenwell Springs, LA (US)

(73) Assignee: WASKEY BRIDGES, INC., Baton Rouge, LA (US)

( * ) Notice: Subject to any disclaimer, the term of this patent is extended or adjusted under 35 U.S.C. 154(b) by 946 days.

(21) Appl. No.: 17/973,237

(22) Filed: Oct. 25, 2022

Related U.S. Application Data

(60) Provisional application No. 63/271,525, filed on Oct. 25, 2021.

(51) Int. Cl.
*E01C 11/22* (2006.01)
*B29C 67/24* (2006.01)
*E03F 3/04* (2006.01)

(52) U.S. Cl.
CPC .......... *E01C 11/227* (2013.01); *B29C 67/243* (2013.01); *E03F 3/046* (2013.01)

(58) Field of Classification Search
CPC ........ E01C 11/227; E03F 3/046; E02B 13/00; E02B 5/02

(Continued)

(56) References Cited

U.S. PATENT DOCUMENTS 4,689,358 A 8/1987 Schorr et al.
4,940,359 A 7/1990 Van Duyn et al.

(Continued)

FOREIGN PATENT DOCUMENTS

FR 3022992 1/2016
WO 2012073123 6/2012

OTHER PUBLICATIONS

Youtube video, "Double mould for precast panels" (Year: 2017).*

(Continued)

*Primary Examiner* — Sunil Singh
(74) *Attorney, Agent, or Firm* — Garvey, Smith & Nehrbass, Patent Attorneys, L.L.C.; Charles C. Garvey, Jr.; Vanessa M. D'Souza

(57) ABSTRACT

A method of installing a trench for containing a cryogenic spill, including the step of constructing multiple precast concrete sections at a first location, each section preferably having a bottom wall and spaced apart side walls connected to and extending up from the bottom wall. Each section preferably has end portions that enable connection to another said concrete section. The method includes applying a polymeric concrete material to the bottom wall and side walls of each concrete section preferably using a spray application. The concrete sections are connected together using connections that preferably join one end portion of a concrete section to and end portion of another concrete section. An epoxy grout or non-sag seal can be preferably applied to the connections. In one embodiment, a specially configured pump/mold arrangement enables formation of a cryogenic resistant panel that is removable from the mold after curing, wherein one of the mold sections is rotatable about a generally horizontal axis.

23 Claims, 44 Drawing Sheets

(58) Field of Classification Search
USPC .............. 404/2, 4; 405/118, 119; 249/10, 11
See application file for complete search history.

(56) References Cited

U.S. PATENT DOCUMENTS

| | | | |
|---|---|---|---|
| 5,213,438 | A | 5/1993 | Barenwald |
| 5,305,568 | A | 4/1994 | Beckerman |
| 5,568,995 | A | 10/1996 | Beamer |
| 5,573,351 | A | 11/1996 | Beamer |
| 5,613,804 | A | 3/1997 | Beamer |
| 5,709,739 | A | 1/1998 | Wittich et al. |
| 5,810,511 | A | 9/1998 | Schmidt |
| 8,545,611 | B2 | 10/2013 | Davies et al. |
| 10,487,510 | B1 | 11/2019 | Benton, Jr. et al. |
| 10,495,235 | B1 | 12/2019 | Benton, Jr. et al. |
| 10,871,244 | B1 | 12/2020 | Benton, Jr. et al. |
| 11,041,299 | B1 | 6/2021 | Benton, Jr. et al. |
| 11,447,921 | B1 | 9/2022 | Benton, Jr. et al. |
| 11,473,308 | B1 | 10/2022 | Benton, Jr. et al. |
| 2006/0280558 | A1 | 12/2006 | Hankinson |
| 2008/0210305 | A1 | 9/2008 | Kolodziej et al. |
| 2010/0287957 | A1 | 11/2010 | Liu |
| 2011/0110719 | A1 | 5/2011 | Simon |
| 2014/0305856 | A1 | 10/2014 | Deskins |
| 2015/0219243 | A1 | 8/2015 | Kumar |
| 2019/0242526 | A1 | 8/2019 | Subotsch |

OTHER PUBLICATIONS

ChemCo Systems CCS InsulPOX PowerPoint Presentation found at: https://www.slideshare.net/jbors/chemco-systems-insulpox-cryogenic-insulating-polymer-concrete-ipc-overlay-91977859.

Chem Co Systems Concrete Repair Posts, found at : http://info.chemcosystems.com/blog/-insulating-polymer-overlay-for-cryogenic-Ing-terminal-spills.

Thiokol 415 Technical Data Sheet, found at: http://lakeamandapoa.org/assets/Product_data_sheets_for_Misc_Specs.pdf.

* cited by examiner

CRYOGENIC TRENCH/TROUGH APPARATUS AND METHOD

CROSS-REFERENCE TO RELATED APPLICATIONS

This application claims benefit of U.S. Provisional Patent Application Ser. No. 63/271,525, filed 25 Oct. 2021, which is hereby incorporated herein by reference.

Priority of U.S. Provisional Patent Application Ser. No. 63/271,525, filed 25 Oct. 2021, which is hereby incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to a method and apparatus for construction of a cryogenic trench that features concrete precast sections that are fitted with cast panels, transported to a job site and assembled with special connections.

2. General Background of the Invention

Liquified natural gas (LNG) can include methane and ethane. When the gas is cooled to approximately-260 degrees Fahrenheit, it can be transported in a liquid state. In a liquid state, LNG takes up 1⁄600th of the space compared to a gaseous phase, making it much easier to ship and store when pipeline transport is not feasible. The present invention provides a method and apparatus for construction and installation of precast troughs or trenches that are preferably lined with panels that are capable of handling spillage of cryogenic material such as liquified natural gas or LNG.

The following are each hereby incorporated herein by reference:

U.S. Provisional Patent Application Ser. No. 62/863,537, filed 19 Jun. 2019; U.S. patent application Ser. No. 16/906,324, filed 19 Jun. 2020; U.S. patent application Ser. No. 17/129,320, filed 21 Dec. 2020 (issued as U.S. Pat. No. 11,447,921 on 20 Sep. 2022; U.S. patent application Ser. No. 16/662,578, filed 24 Oct. 2019 (issued as U.S. Pat. No. 10,871,244 on 22 Dec. 2020); U.S. patent application Ser. No. 16/596,081, filed 8 Oct. 2019 (issued as U.S. Pat. No. 11,041,299 on 22 Jun. 2021); and U.S. patent application Ser. No. 17/352,594, filed 21 Jun. 2021 (issued as U.S. Pat. No. 11,473,308 on 18 Oct. 2022).

U.S. Provisional Patent Application Ser. No. 62/570,369, filed 10 Oct. 2017; U.S. Provisional Patent Application Ser. No. 62/580,943, filed 2 Nov. 2017; U.S. Provisional Patent Application Ser. No. 62/599,905, filed 18 Dec. 2017; and U.S. patent application Ser. No. 16/156,844, filed 10 Oct. 2018 (issued as U.S. Pat. No. 10,495,235 on 3 Dec. 2019).

U.S. Provisional Patent Application Ser. No. 62/599,905, filed 18 Dec. 2017; U.S. Provisional Patent Application Ser. No. 62/760,257, filed 13 Nov. 2018; and U.S. patent application Ser. No. 16/223,581, filed 18 Dec. 2018 (issued as U.S. Pat. No. 10,487,510 on 26 Nov. 2019).

ChemCo Systems CCS InsulPOX™ PowerPoint Presentation found at: https://www.slideshare.net/jbors/chemco-systems-insulpox-cryogenic-insulating-polymer-con crete-ipc-overlay-91977859;

ChemCo Systems Concrete Repair Posts, found at: https://info.chemcosystems.com/blog/-insulating-polymer-overlay-for-cryogenic-Ing-terminal-spills;

Thiokol 415 Technical Data Sheet, found at: http://lakea-mandapoa.org/assets/Product data_sheets_for_Misc_Specs.pdf.

BRIEF SUMMARY OF THE INVENTION

A preferred embodiment of the present invention includes a method of installing a trench for containing a cryogenic spill. The method includes the steps of constructing multiple sections, e.g., precast concrete sections, each section preferably having a bottom wall and spaced apart side walls connected to and extending up from the bottom wall. Each section can have end portions that preferably enable connection to another concrete section. At the first location, multiple panels of polymeric concrete material can be prepared by filling one or more molds with a slurry or liquid polymeric concrete material or cryogen insulating material and after time allowing the material to cure and harden. The mold can have a cavity that is preferably lined with a release material, e.g., one that preferably includes lard or animal fat. At the first location, one or more of the panels can be adhered to the bottom wall and side walls of each concrete section preferably using an adhesive. The concrete sections can be transported from the first location to a second location. At the second location, the concrete sections can be connected together using connections of one end portion to another end portion. An epoxy grout, for example, can be added to the connections at the second location.

In one preferred embodiment, each panel can have an upper surface and a lower surface and further comprising applying the adhesive to the upper surface.

In one preferred embodiment, the lard can be removed from the lower surface of each panel.

In one preferred embodiment, each panel can be between about one half and three inches thick.

In one preferred embodiment, each panel can have a generally rectangular periphery.

In one preferred embodiment, the liquid polymeric concrete material can be a cryogenic insulating material.

In one preferred embodiment, the release material preferably includes animal fat.

In one preferred embodiment, the release material preferably includes lard.

In one preferred embodiment, at least one of the side walls can have a side wall height and wherein the panels preferably extend vertically only along part of the side wall height.

In one preferred embodiment, the precast concrete sections can have openings through the bottom wall at one or both of the end portions.

A preferred embodiment of the present invention includes a method of installing a trench for containing a cryogenic spill. The method includes the steps of constructing multiple sections, e.g., precast concrete sections, each section preferably having a bottom wall and spaced apart side walls connected to and extending up from the bottom wall. Each section can have end portions that enable connection to another concrete section. At the first location, multiple panels of polymeric concrete material can be prepared by filling one or more molds with a slurry or liquid polymeric concrete material and after time allowing the material to cure and harden. The mold can have a cavity that can be lined with a release material. At the first location, one or more of the panels can be adhered to the bottom wall and side walls of each concrete section preferably using an adhesive. The concrete sections can be transported from the first location to a second location. At the second location, the concrete sections can be connected together using connections of one end portion to another end portion. A sealing material, e.g., an epoxy grout can be applied to the connections at the second location. The connection preferably includes spacing the end portions apart to form a gap and preferably filling the gap with a seal.

In one preferred embodiment the panels can be made from a material that can enable forming a cryogenic seal or cryogenic protection between sections.

In one preferred embodiment, the sealing material can be a material that enables forming a cryogenic seal or cryogenic protection between sections.

In one preferred embodiment, the seal preferably includes a bellow structure.

A preferred embodiment of the present invention includes a method of installing a trench for containing a cryogenic spill. The method includes constructing multiple sections, e.g., precast concrete sections, each section preferably having a bottom wall and spaced apart side walls connected to and extending up from the bottom wall. Each section can have end portions that enable connection to another concrete section. At the first location, multiple panels can be prepared of polymeric concrete material by preferably filling one or more molds with a slurry or liquid polymeric concrete material and after time preferably allowing the material to cure and harden. At the first location, preferably the method includes adhering one or more of the panels to the bottom wall and side walls of each concrete section preferably using an adhesive. Preferably the concrete sections are then transported from the first location to a second location. At the second location, the method includes preferably connecting the concrete sections together using connections of one end portion to another end portion. Preferably, the method includes applying a sealer, e.g., a non-sag filler to the connections at the second location.

In one preferred embodiment, anchor bolts preferably extend through the openings into a foundation.

In one preferred embodiment, the foundation can be concrete.

In one preferred embodiment, the present invention preferably includes precast concrete.

In one preferred embodiment, the panels are preferably adhered in an upright or longitudinal position, or in a vertical position, or in an at least substantially vertical position.

In one preferred embodiment, the panels are preferably adhered in a lateral position or in a horizontal position, or in an at least substantially horizontal position.

In one preferred embodiment, the panels are preferably made of insulating polymer concrete material that can be self-leveling.

In one preferred embodiment, the seal preferably includes a non-sag sealing material.

In one preferred embodiment, the sealing material can be applied in a vertical application.

In one preferred embodiment, the sealing material can be applied in a horizontal application.

In one preferred embodiment, the panels and the sealing material preferably create continuous cryogenic protection between the concrete sections.

In one preferred embodiment, the seal preferably is an expansion joint.

In one preferred embodiment, the expansion joint seal is preferably a stainless steel bellow.

In one preferred embodiment, the precast concrete sections preferably have openings through the bottom wall at one or both of the end portions.

In one preferred embodiment, the seal can include a butyl rubber elastomer.

In one preferred embodiment, the seal can include an engineering cloth.

In one preferred embodiment, the seal can include one or more layers of the butyl rubber elastomer and the engineering cloth.

In one preferred embodiment, the present invention provides a method of installing a trough for containing a cryogenic spill, comprising the steps of:

a) constructing multiple sections that are preferably precast concrete sections, each section preferably having a bottom wall and spaced apart side walls connected to and extending up from the bottom wall;
b) wherein in step "a" each section preferably has end portions that enable connection to another section;
c) preferably applying a layer of cryogenic insulative material to the bottom wall and side walls of each section;
d) preferably transporting the sections from the first location to a second location;
e) at the second location, preferably connecting the sections together using connections of one end portion to another end portion;
f) preferably applying an epoxy grout to the connections of step "e" at the second location; and
g) wherein in step "e" the connection preferably includes spacing the end portions apart to form a gap and preferably filling the gap with a seal.

In one preferred embodiment, each layer can be between about one quarter to one inch thick.

In one preferred embodiment, the cryogenic insulating material can include polymeric concrete.

In one preferred embodiment, at least one of the side walls can have a side wall height and wherein the layers preferably extend vertically only part of the side wall height.

In one preferred embodiment, the present invention includes a method of installing a trench for containing a cryogenic spill, comprising the steps of:

a) constructing multiple sections that are preferably precast concrete sections, each section preferably having a bottom wall and spaced apart side walls preferably connected to and extending up from the bottom wall;
b) wherein in step "a" each section preferably has end portions;
c) preferably applying a layer of cryogenic insulating material to the bottom wall and side walls of each section;
d) preferably transporting the sections from the first location to a second location;
e) at the second location, preferably connecting the sections together using connections of one end portion to another end portion;
f) wherein in step "e" the connection preferably includes spacing the end portions apart to form a gap and filling the gap with a seal; and
g) wherein in step "e" the seal preferably includes a bellows structure.

In one preferred embodiment, the precast concrete sections can have openings through the bottom wall at one or both of the end portions.

In one preferred embodiment, the spacing can be between about one-half and three inches.

In another preferred embodiment the present invention includes a method of installing a trench for containing a cryogenic spill, comprising the steps of:

a) construction of multiple sections that are preferably precast concrete sections, each section preferably having a bottom wall and spaced apart side walls connected to and extending up from the bottom wall, each section having end portions;

b) at the first location, preferably applying a layer of polymeric concrete material to the bottom wall and side walls of each section;

c) preferably transporting the sections from the first location to a second location;

d) at the second location, preferably connecting the sections together using connections that join one end portion of a first section to an end portion of a second section;

e) preferably applying a non-sag filler to the connections of step "d" at the second location; and f) wherein the connections of step "e" preferably include an engineering cloth. In another preferred embodiment, the present invention includes a method of installing a trench for containing a cryogenic spill, comprising the steps of:

a) constructing multiple sections that are preferably precast concrete sections, each section preferably having a bottom wall and spaced apart side walls connected to and extending up from the bottom wall;

b) wherein in step "a" each section preferably has first and second end portions;

c) preferably applying a layer of cryogenic insulative material to the bottom wall and side walls of each concrete section;

d) at the second location, preferably connecting the sections together using connections of one end portion of a first section to an end portion of a second section;

e) preferably applying an epoxy grout to the connections of step "d" at the second location; and f) wherein in step "e" the connection preferably includes spacing the end portions apart to form a gap and filling the gap with a seal;

g) wherein sections preferably have openings through the bottom wall at one or both of the end portions; and h) wherein anchor bolts preferably extend through the openings into a foundation.

In one preferred embodiment, the foundation can be concrete.

In one preferred embodiment, the seal preferably includes a butyl rubber elastomer.

In one preferred embodiment, the seal preferably includes an engineering cloth.

In one preferred embodiment, the seal preferably includes one or more layers of the butyl rubber elastomer and the engineering cloth.

In one preferred embodiment, the connection of the layers and the seal preferably create continuous cryogenic insulative material throughout the connected concrete sections.

In one preferred embodiment, the cryogenic insulating material includes polymeric concrete.

In one preferred embodiment, the spacing can be between about one-half and three inches.

In another preferred embodiment, the present invention includes a method of installing a trench for containing a cryogenic spill, comprising the steps of:

a) constructing multiple sections that are preferably precast concrete sections, each section preferably having a bottom wall and spaced apart side walls preferably connected to and extending up from the bottom wall;

b) wherein in step "a" each section preferably has end portions that enable connection to another section;

c) preferably applying a layer of cryogenic insulative material to the bottom wall and side walls of each section;

d) preferably transporting the sections from the first location to a second location;

e) at the second location, preferably connecting the sections together using connections of one end portion to another end portion; and f) wherein the connection preferably includes spacing the end portions apart to form a gap and preferably filling the gap with a seal that includes cryogenic insulative material.

In another preferred embodiment, the present invention includes a method of installing a trench for containing a cryogenic spill, comprising the steps of:

a) constructing multiple sections that are preferably precast concrete sections, each section preferably having a bottom wall and spaced apart side walls connected to and extending up from said bottom wall;

b) wherein in step "a" each section preferably has end portions that enable connection to another section;

c) preferably applying a layer of cryogenic insulating material to the bottom wall and side walls of each section;

d) preferably transporting the sections from a first location to a second location;

e) at the second location, preferably connecting the sections together using connections of one end portion to another end portion; and f) preferably applying an epoxy grout to the connections of step "e" at the second location.

In one preferred embodiment, the layer can be between about one half and three inches thick.

In one preferred embodiment, the layer can be a polymeric concrete material.

In one preferred embodiment, the layer can be about ⅛ inch to 2 inches thick.

In another preferred embodiment, the present invention includes a method of installing a trench for containing a cryogenic spill, comprising the steps of:

a) constructing multiple sections that are preferably precast concrete sections, each section preferably having a bottom wall and spaced apart side walls connected to and extending up from the bottom wall;

b) wherein in step "a" each section preferably has end portions that enable connection to another section;

c) preferably applying a layer of cryogenic insulating material to the bottom wall and side walls of each section;

d) preferably transporting the sections from the first location to a second location;

e) at the second location, preferably connecting the sections together using connections of one end portion to another end portion;

f) preferably applying an epoxy grout to the connections of step "e" at the second location;

g) wherein in step "f" the connection preferably includes spacing the end portions apart to form a gap and filling the gap with a seal; and h) wherein in step "g" the seal preferably includes a bellow structure.

In another preferred embodiment, the present invention includes a method of installing a trench for containing a cryogenic spill, comprising the steps of:

a) construction of multiple sections that are preferably precast concrete sections, each section preferably having a bottom wall and spaced apart side walls connected to and extending up from the bottom wall;
b) wherein in step "a" each section preferably has end portions that enable connection to another said section;
c) preferably applying a polymeric concrete material to the bottom wall and side walls of each section;
d) preferably transporting the sections from the first location to a second location;
e) at the second location, preferably connecting the sections together using connections of one end portion to another end portion; and
f) preferably applying a non-sag filler to the connections of step "e" at the second location; and
g) wherein the connections preferably include an engineering cloth.

In another preferred embodiment, the present invention includes a method of installing a trench for containing a cryogenic spill, comprising the steps of:

a constructing multiple sections that are preferably precast concrete sections, each section preferably having a bottom wall and spaced apart side walls connected to and extending up from the bottom wall;
b) wherein in step "a" each section preferably has end portions that enable connection to another section;
c) preferably applying a layer of cryogenic insulating material to the bottom wall and side walls of each section;
d) preferably transporting the sections from the first location to a second location;
e) at the second location, preferably connecting the sections together using connections of one end portion to another end portion;
f) preferably applying an epoxy grout to the connections of step "e" at the second location; and
g) wherein in step "f" the connection preferably includes spacing the end portions apart to form a gap and filling the gap with a seal;
h) wherein the sections preferably have openings through the bottom wall at one or both of the end portions; and
i) wherein anchor bolts preferably extend through the openings into a foundation.

In one preferred embodiment, the non-sag filler preferably includes a butyl rubber elastomer.

In one preferred embodiment, the non-sag filler preferably includes an engineering cloth.

In one preferred embodiment, the non-sag filler preferably includes one or more layers of the butyl rubber elastomer and the engineering cloth.

In one preferred embodiment, the connection of the layers and the non-sag filler preferably create continuous cryogenic material throughout the connected concrete sections.

In another preferred embodiment, the present invention includes a method of installing a trench for containing a cryogenic spill, comprising the steps of:

a) constructing multiple precast concrete sections, each section preferably having a bottom wall and spaced apart side walls connected to and extending up from the bottom wall;
b) wherein in step "a" each section preferably has end portions that enable connection to another concrete section;
c) preferably applying a layer of cryogenic material to the bottom wall and side walls of each concrete section;
d) preferably transporting the concrete sections from the first location to a second location;
e) at the second location, preferably connecting the concrete sections together using connections of one end portion to another end portion; and
f) wherein in step "e" the connection preferably includes spacing the end portions apart to form a gap and filling the gap with a seal.

In another embodiment, the present invention includes a method of installing a trench for containing a cryogenic spill, comprising the steps of:

a) constructing multiple sections that are preferably precast concrete sections, each section preferably having a bottom wall and spaced apart side walls connected to and extending up from the bottom wall;
b) wherein in step "a" each section preferably has end portions that enable connection to another section;
c) preferably applying a polymeric concrete layer to the bottom wall and side walls of each section;
d) preferably transporting the sections from the first location to a second location;
e) at the second location, preferably connecting the sections together using connections of one end portion to another end portion;
f) wherein in step "e" the connection preferably includes spacing the end portions apart to form a gap and preferably filling the gap with a seal;
g) wherein the seal preferably includes a butyl rubber elastomer; and
h) wherein the seal of step "f" preferably includes an engineering cloth.

In one preferred embodiment, the seal preferably includes one or more layers of the butyl rubber elastomer and the engineering cloth.

In one or more preferred embodiments, the panels can be made by a molding tool having first and second separable sections. The first section can have a first interior surface and the second section can have a second interior surface, wherein the first interior surface can be positioned opposite of the second interior surface.

The first section can have a plate on the first interior surface. The plate can be a slick metal or highly polished steel or aluminum. The plate can have a release material coated on the plate surface.

The second section can include a mold cavity on the second interior surface. The mold cavity can be a slick metal or highly polished steel or aluminum.

During the molding process, the sections can be positioned upright, or longitudinally or vertically positioned, or at least substantially vertically positioned, and joined together, thereby preferably creating a space in between the plate on the first section and the mold cavity on the second section.

Preferably, liquid can be pumped into the space while the sections are joined together. The pump can be a commercially available positive displacement pump.

When the molding process is completed, the sections can be opened. The first section can be static and stationary. The second section can be moved laterally away from the first section.

Preferably, the second section can be rotated to a generally horizontal position in order to remove the cured panel. The panel can be manually pried out of the mold.

Preferably, a seal can be placed around the edge of the joined sections to prevent leakage of the liquid being pumped in between the section. The seal can be made of a polymeric material, such as material used to make O-rings.

Preferably, the mold cavity can be about ½ inch-¾ inch thick.

Preferably, the finished panel can be about ½ inch-¾ inch thick. More preferably, the finished panel can be about ¾ inch thick.

Preferably, the mold cavity can be smooth and preferably lined with a well-polished metal, such as aluminum.

Preferably the finished panel can be flexible enough to be removed from the mold cavity.

Preferably, a method of a preferred embodiment includes positioning the first and second sections upright or vertically, or at least substantially vertically, wherein the sections preferably butt up against each other. The first and second sections can be pushed together, for example with pneumatic cylinders.

Preferably, the mold can be prevented from leaking, e.g., by using a combination of pneumatic presses, O-ring material, and a cam locking arrangement.

Preferably, the mold can have an opening at the bottom where material is pumped into the mold via a hose. The bottom opening can be sealed around the hose. The mold can have an opening at the top of the mold. As the mold is being filled with material, the top opening can be a vent, allowing air to exit the mold. When the pumped material is seen exiting the top opening, then the mold is full.

Preferably, the panels can cure in about 40 minutes. More preferably, the panels can cure in about 20 minutes.

In one or more preferred embodiments, the panels can cure in about 20 to 40 minutes.

Preferably, fluid (e.g., water) can be pumped to each of the mold sections.

In one embodiment, the temperature of the water being pumped to the mold sections can be the same temperature. In one embodiment, cold water can be pumped to the first section having a flat surface and heated water can be pumped to the second section having a mold cavity.

Preferably, the section with the mold cavity can cure faster than the section with the flat surface.

Preferably, the heated water can be circulated to both sides of mold space.

Preferably, there can be two tanks holding materials to be mixed. The materials can be pumped to a tank or chamber, wherein microspheres can be added. The microspheres can be commercially available. The combined mixture can be pumped into the mold space. Preferably, the combined mixture includes microspheres and a resin. The mixing of the materials can occur in the pump.

Preferably a day tank can be filled by drawing resin from a bulk storage resin tank. This can be done by gravity flow or pulling a vacuum in the day tank to create a pressure difference.

An in-line pump can also be used to pump resin into a day tank.

The microspheres/beads can be mixed in the day tank.

The mixture can be pumped from the day tank to the mold. A catalyst can be in the pump. Resin/microspheres mixture can be pulled from the day tank.

In one or more preferred embodiments, the process of the present invention can include a resin, a catalyst, and glass microspheres/beads. The resin can be stored in bulk storage such as a 44,000 pound tank, or a container or tank of another desired capacity. The catalyst can be stored in a 55 gallon drum, or in a container or drum of another desired capacity. The microsphere beads can be stored in a 50 pound sack, or in a container or sack of another desired capacity. The resin can be a class 3 flammable. Nitrogen can be placed as a blanket on top of the resin tank to prevent ignition from possible static electricity. Another safety mechanism includes grounding the resin tank to prevent sparking. A metal rod can be connected with clamps and wire to the resin tank to ground the tank, for example.

The resin tank can be connected to a day tank, preferably using a fitting (e.g., 3 inch cam lock) and valve on the resin tank, a 1¼ inch suction line, and a fitting (e.g., 1¼ inch cam lock) and 1¼ inch ball valve on the day tank.

A day tank can be an 80 gallon tank, or a tank of another preferred capacity. A vacuum pump can be connected to the day tank to draw resin material from the resin storage tank to the day tank. An in-line pump can also be used to pump resin into a day tank. The day tank can be filled with resin material. The vacuum pump can be used to suction air out of the day tank and used to create a pressure difference in the day tank to pull the resin into the day tank. If the vacuum pump fails, gravity flow or head pressure from the resin tank will still fill the day tank, just more slowly.

Nitrogen can be placed as a blanket on top of the day tank to prevent ignition from possible static electricity. Another safety mechanism includes grounding the day tank to prevent sparking. Clamps can be connected to steel on a structure or building to ground the tank, for example.

Once the day tank is filled with resin, glass microspheres can be added to the day tank. The glass beads can be manually added to the tank with, for example, a bucket or other container. A preferred ratio of resin to beads is 15% beads by weight. For example, for 100 pounds of resin, 15 pounds of glass beads are added.

The resin and the glass beads can be mixed in the day tank preferably using a mounted agitator, drill and paddle mixer or another suitable mixer. Preferably, the resin and beads can be mixed until there is a uniform texture and uniform gray color.

After the resin and glass beads are mixed, the vacuum pump connected to the day tank can be turned on in order to remove all of the entrained air from the mixture. If the vacuum pump is not used after mixing, the air bubbles can create craters in the top of the molded product, which would need to be grinded off.

Nitrogen can be placed as a blanket in the day tank after the beads are mixed into the day tank. The nitrogen preferably is not provided during the same time as when the vacuum pump is working. The day tank can be connected to the mold with a pump. The pump can be a commercially available positive displacement pump. A catalyst tank can be connected to the pump and can be added to the pump. The pump can have an self-adjustable metering system that can select the desired ratio of resin/bead mixture to catalyst. A preferred ratio can be 50:1 by volume of resin/beads to catalyst. When the pump starts working, the catalyst can be added to the pump and the combined material is preferably added to the mold. Preferably the pump can have a static mixing head, including a steel tube with helical parts, to mix the materials together. Preferably, the materials can be mixed at the end of the pump. Preferably, the materials do not start curing until they meet each other at the end of the pump.

The mold can have a fill port and check port. O-ring seals and self locking clamps can be used to secure the mold during the filling and curing process.

The mold can be a temperature-controlled mold. Temperature can be controlled using fluid, such as water, on either side or section of the mold. The temperature can have a delta of 30-40 degrees Fahrenheit. Preferably, the temperature can be 90-120 degrees Fahrenheit. More preferably, the temperature can be 100-135 degrees Fahrenheit. The temperature is preferably kept under 140 degrees Fahrenheit for each mold section.

In one embodiment, the temperature of the fluid being pumped to the mold sections can be the same temperature. In another embodiment, the fluid being pumped to the mold sections can be different temperatures.

In one embodiment, cold water can be pumped to the to first section (fixed mold section) having a flat surface and heated water can be pumped to the second section (movable section) having the mold cavity. The fluid pumped to the first section having a flat surface can be about 100 degrees F. The fluid pumped to the second section having the mold cavity can be about 130 degrees F.

It should be understood that the molding process can cure without this cooling or heating fluid. Use of the fluid (e.g., water) circulation helps control how the mold cures and the time frame to cure. The fluid (e.g., water) circulation creates uniform heat distribution. The fluid can be circulated by a snake of tubing, which can run through the metal or through holes. The fluid can be the same temperature throughout the mold. The fluid being pumped to the mold sections can be different temperatures. The fluid can run in parallel through both molding plates.

A chilled water tank can be connected to an internal water system. A chilled water tank can be a 1,000 gallon tank, or a tank of another desired capacity. The temperature of the chilled water tank can be set to a desired temperature based on the ambient temperature. Preferably, the temperature of the chilled water tank can be about 40-90 degrees F., and more preferably about 60 degrees F. Temperature control unit(s) (e.g., thermolator™ temperature control unit(s)) can pull from the water line and send the water to the mold to keep each side of the mold at a desired set temperature. Hot water returning from the process can be pumped into a water return line to be chilled.

An alternative preferred embodiment includes a method of installing a trough for containing a cryogenic spill, comprising the steps of:

a) constructing multiple sections, preferably precast concrete sections, each section having a bottom wall and spaced apart side walls connected to and extending up from said bottom wall;
b) wherein in step "a" each section has end portions that enable connection to another said section;
c) applying a layer of cryogenic insulative material to the bottom wall and side walls of each said section, wherein each layer is a panel cast in a mold having first and second mold sections that move relative to one another between opened and closed positions, at least one of said mold sections having a mold cavity;
d) connecting the sections together using connections of one end portion to another end portion;
e) applying an epoxy grout to the connections of step "d"; and
f) wherein in step "d" the connection includes spacing the said end portions apart to form a gap and filling the gap with a seal.

In one or more embodiments, in step "c" each layer is between about one quarter and one-half inch thick.

In one or more preferred embodiments, the cryogenic insulating material includes polymeric concrete.

In one or more preferred embodiments, at least one of the side walls has a side wall height and wherein the layers extend upright, or vertically, or at least substantially vertically, along only part of said side wall height.

In one or more preferred embodiments, further comprising the step of cooling at least one of the mold sections during step "c".

In one or more preferred embodiments, further comprising the step of heating at least one of the mold sections during step "c".

In one or more preferred embodiments, in step "c" the mold sections are in an inclined position and further comprising rotating one of the mold sections to a less inclined position after step "c".

In one or more preferred embodiments, further comprising removing the panel when the mold section is in the less inclined position.

In one or more preferred embodiments, at least one of the panels is rotatable in said opened position and further comprising rotating the rotatable panel after step "c".

An alternative preferred embodiment includes a method of installing a trench for containing a cryogenic spill, comprising the steps of:

a) constructing multiple sections that are preferably precast concrete sections, each section having a bottom wall and spaced apart side walls connected to and extending up from said bottom wall;
b) wherein in step "a" each section has end portions that enable connection to another said section; and
c) applying a panel of cryogenic insulative material to the bottom wall and side walls of each said section, wherein each panel is cast in a mold comprised of first and second mold sections that can move relative to each other between opened and closed positions, wherein at least one of the mold sections has a mold cavity that is configured to be filled with liquid cryogenic insulative material.

In one or more preferred embodiments, the cryogenic insulating material can include polymeric concrete.

In one or more preferred embodiments, further comprising the step of cooling at least one of the mold sections during step "c".

In one or more preferred embodiments, further comprising the step of heating at least one of the mold sections during step "c".

In one or more preferred embodiments, in step "c" the mold sections can be in an inclined position and further comprising rotating one of the mold sections to a less inclined position after step "c".

In one or more preferred embodiments, further comprising removing the panel when the mold section is in the less inclined position.

In one or more preferred embodiments, at least one of the panels can be rotatable in said opened position and further comprising rotating the rotatable panel after step "c".

An alternative preferred embodiment includes a method of installing a trench for containing a cryogenic spill, comprising the steps of:

a) constructing multiple sections that preferably precast concrete sections, each section having a bottom wall and spaced apart side walls connected to and extending up from said bottom wall;
b) wherein in step "a" each section has end portions that enable connection to another said section;
c) applying a panel of cryogenic insulating material to the bottom wall and side walls of each said section, said panel being cast in a mold comprised of first and second mold sections that move relative to one another between opened and closed positions, one of said mold sections being rotatable between upright and generally horizontal positions, said panel being removed when a said mold panel is in the generally horizontal position;
- d) transporting the sections from a first location to a second location;
- e) at said second location, connecting the sections together using connections of one end portion to another end portion; and
- f) applying an epoxy grout to the connections of step "e" at said second location.

In one or more preferred embodiments, the panel can be between about one half and three inches thick.

In one or more preferred embodiments, the panel can be a polymeric concrete material.

In one or more preferred embodiments, at least one of the side walls can have a side wall height and wherein in step "c" the panel extends vertically only part of said side wall height.

In one or more preferred embodiments, the precast concrete sections can have openings through the bottom wall at one or both of said end portions.

In one or more preferred embodiments, the panel can be about ⅛ inch-2 inches thick.

An alternative preferred embodiment includes a method of installing a trench for containing a cryogenic spill, comprising the steps of:
- a) constructing multiple sections that preferably precast concrete sections, each section having a bottom wall and spaced apart side walls connected to and extending up from said bottom wall;
- b) wherein in step "a" each section has end portions that enable connection to another said section;
- c) applying a panel of cryogenic material to the bottom wall and side walls of each said section;
- d) wherein the panel of step "c" is cast in a mold having a plurality of mold sections and a cavity wherein the panel is formed by filling the mold with a resin mixed with a catalyst and multiple microspheres.
- e) transporting the sections from a first location to a second location; and
- f) at said second location, connecting the sections together using connections of one end portion to another end portion.

In one or more preferred embodiments, the sections can be formed from a material that is flowable and can harden and set, and which enables cryogenic protection of a trench under one or more embodiments of the method of the present invention.

In one or more preferred embodiments the sections can be formed from a material which enables cryogenic protection of a trench under one or more embodiments of the method of the present invention.

In one or more preferred embodiments of the present invention, a mold for forming a cryogenic panel for use in a cryogenic trench, the mold comprising:
- a) a first mold section and a second mold section;
- b) a track system enabling the first mold section and the second mold section to move relative to one another between opened and closed positions;
- c) at least one of said first mold section or second mold section having a mold cavity that is configured to be filled with liquid cryogenic insulative material to form the cryogenic panel; and wherein
- d) said at least one mold section having a mold cavity is rotatable along a generally horizontal axis to allow the cryogenic panel to be removed after formation.

In one or more preferred embodiments of the present invention, at least one mold section having a mold cavity is rotatable between 0 and 90 degrees.

In one or more preferred embodiments of the present invention, the first and second mold sections include channels for receiving a fluid for heating or cooling the mold sections.

In one or more preferred embodiments of the present invention, a cryogenic trench or trough comprises:
- a) at least two sections, each section having:
  - i) a bottom wall and spaced apart side walls connected to and extending up from said bottom wall; and
  - ii) an end portion that enables connection to another end portion of another cryogenic section;
- b) a plurality of panels of cryogenic material, wherein said panels are coupled along the bottom wall and each side wall;
- c) wherein each said panel is cast in a mold having one or more mold sections and a cavity wherein the panel is formed by filling the mold with the cryogenic material that includes a resin mixed with a catalyst and multiple microspheres;
- d) a connection connecting the end portions of the at least two sections together, the connection including a space between the end portions of said sections, wherein the space is filled with a sealing material.

In one or more preferred embodiments of the present invention, the panels are coupled to the bottom wall and each sidewall of a said section using an adhesive material.

In one or more preferred embodiments of the present invention, the sealing material is an epoxy grout.

In one or more preferred embodiments of the present invention, the bottom wall and each sidewall is formed from a concrete material.

In one or more preferred embodiments of the present invention, a cryogenic section for use in a cryogenic trench or trough comprises:
- a) a bottom wall and spaced apart side walls connected to and extending up from said bottom wall;
- b) an end portion that enables connection to another cryogenic section, wherein the end portion is adapted to be positioned adjacent to another end portion of another section with a space therebetween, wherein a sealing material can be applied in the space inbetween said end portions;
- c) a plurality of panels of a cryogenic material, wherein said panels are coupled along the bottom wall and each side wall;
- d) wherein each said panel is cast in a mold having one or more mold sections and a cavity wherein the panel is formed by filling the mold with the cryogenic material that includes a resin mixed with a catalyst and multiple microspheres.

In one or more preferred embodiments of the present invention, one or more of the mold sections can have channels for receiving a fluid for heating or cooling the mold section.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 6:
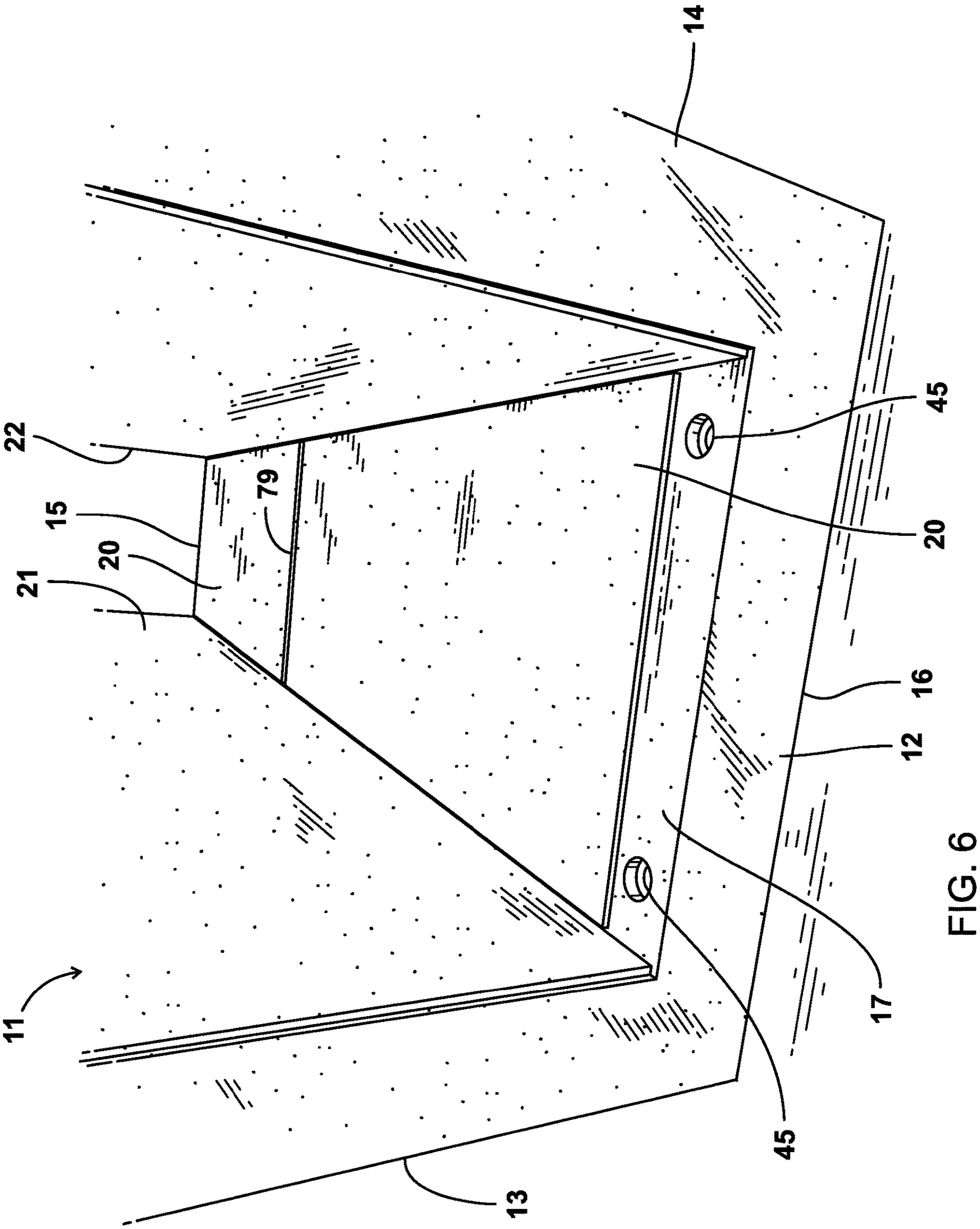
FIG. 6 is a partial perspective view of a preferred embodiment of the apparatus of the present invention and showing part of a method of the present invention.
Figure 7:
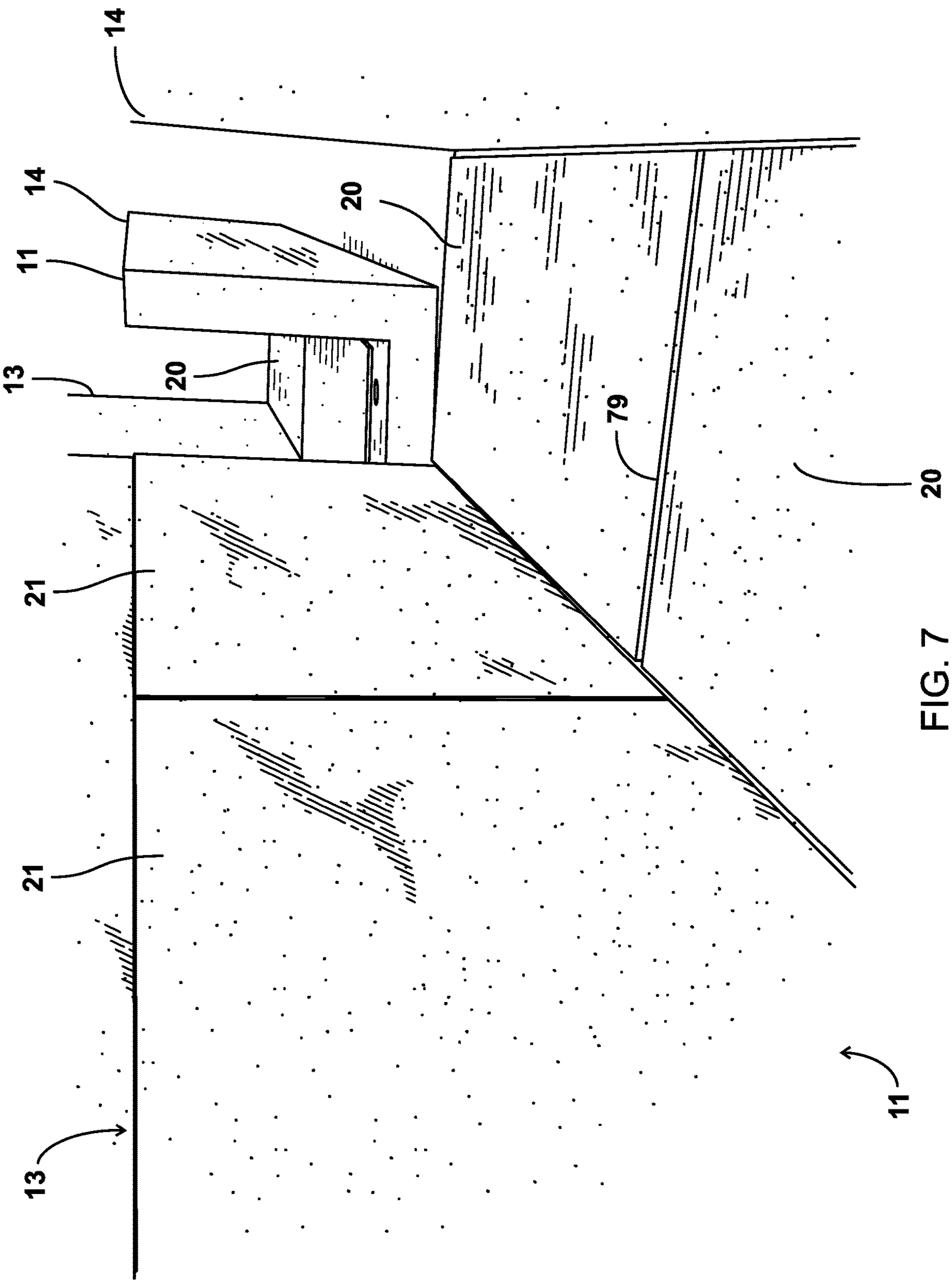
FIG. 7 is a partial perspective view of a preferred embodiment of the apparatus of the present invention and showing part of a method of the present invention.
Figure 8:
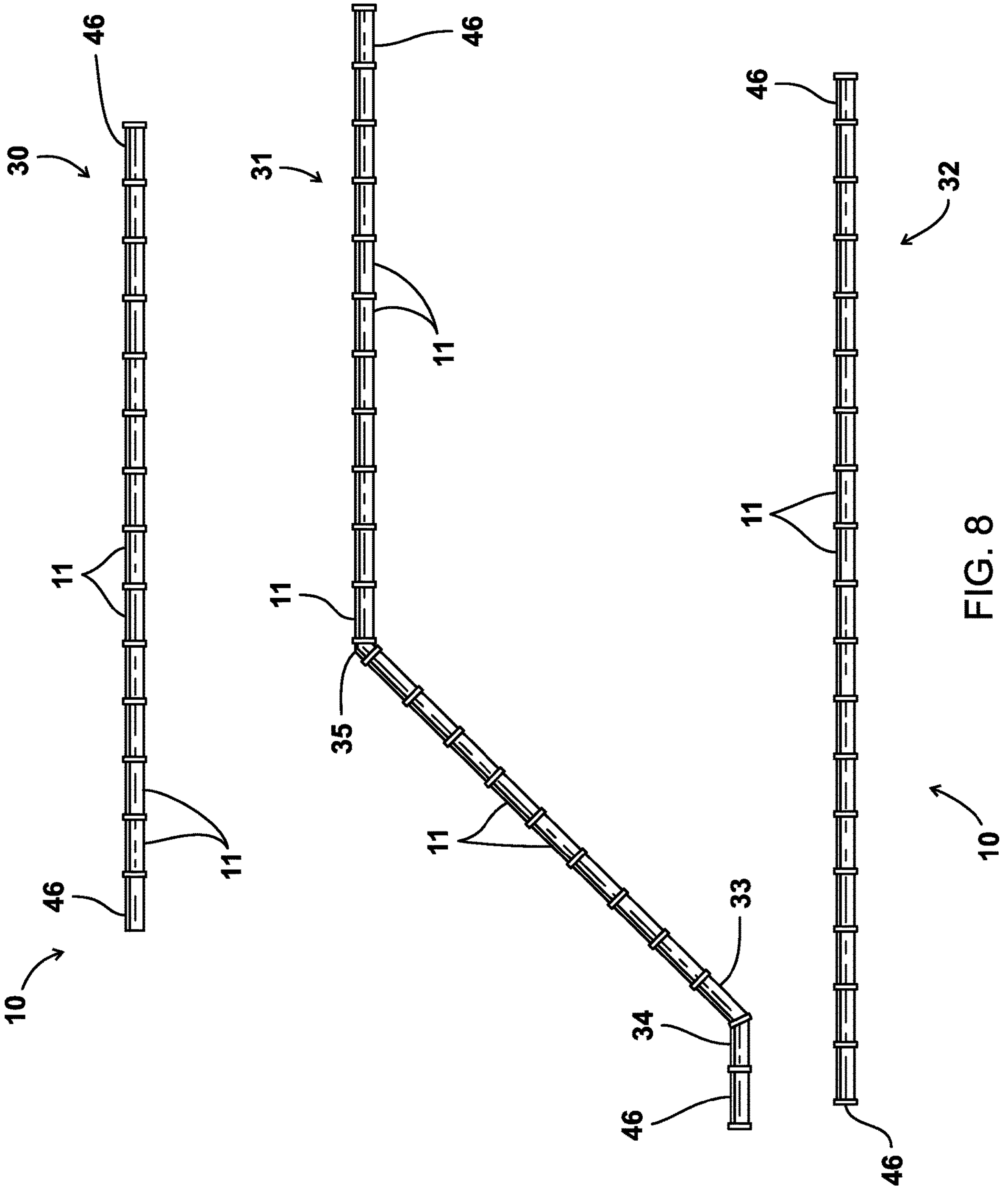
FIG. 8 is a schematic diagram of a preferred embodiment of the apparatus of the present invention.
Figure 11:
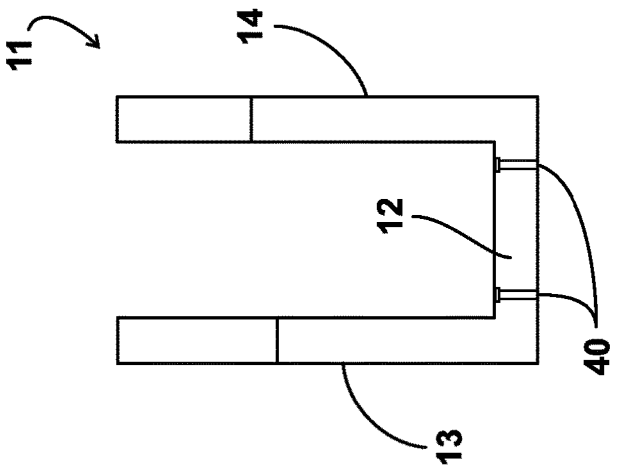
FIGS. 9-11 are diagrams of a straight trough portion of a preferred embodiment of the apparatus of the present invention.
Figure 12:
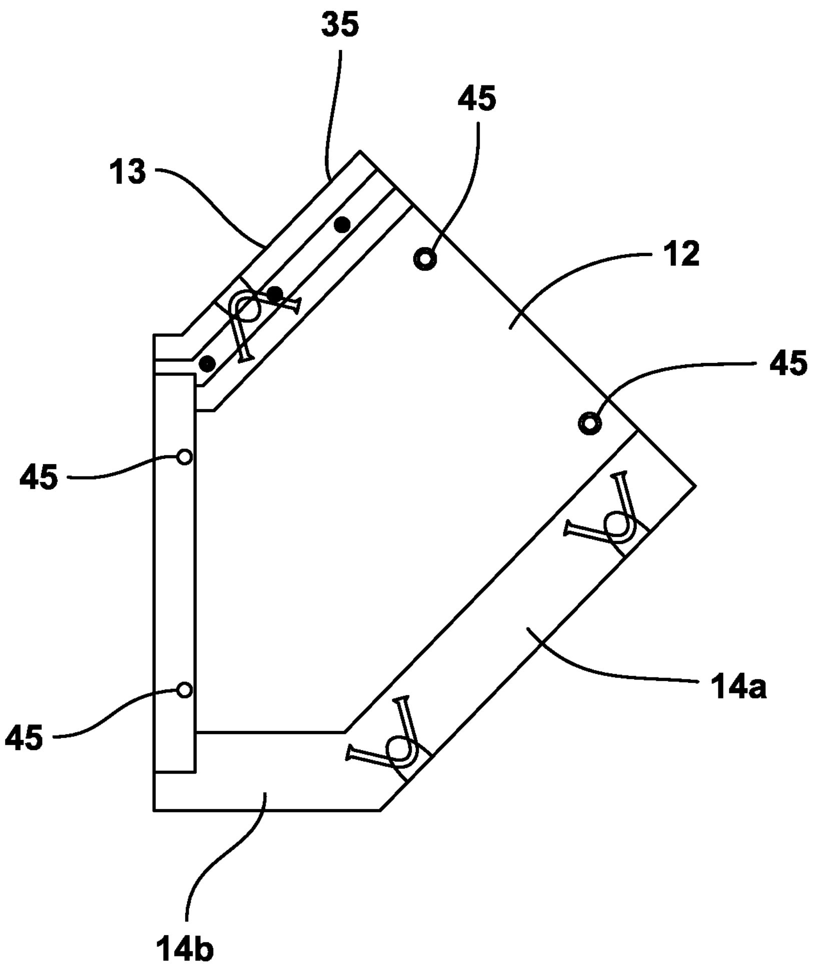
FIG. 12 is a fragmentary plan view of a preferred embodiment of the apparatus of the present invention showing a trough section for a turn or bend.
Figure 13:
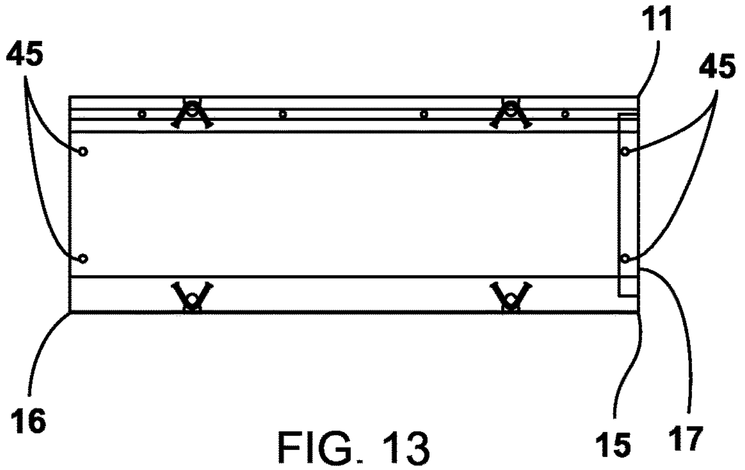
FIGS. 13-16 are top, side and end views of a straight trough portion of a preferred embodiment of the apparatus of the present invention.
Figure 15:
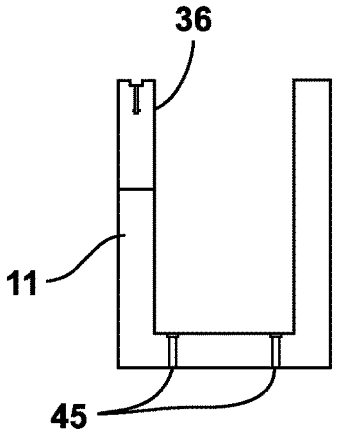
Figure 14:
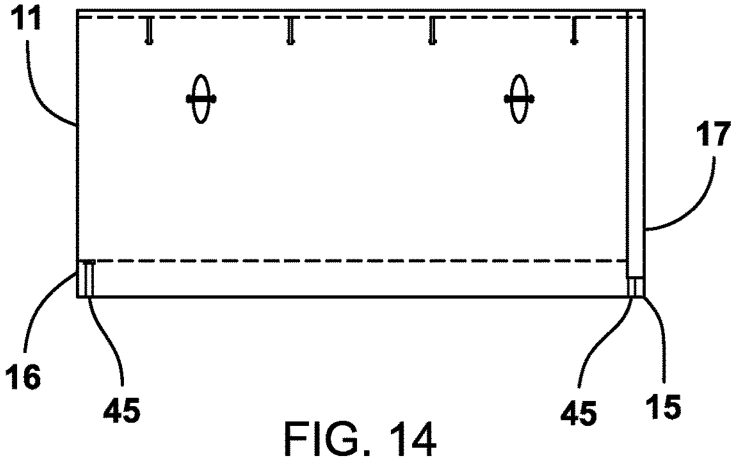
Figure 16:
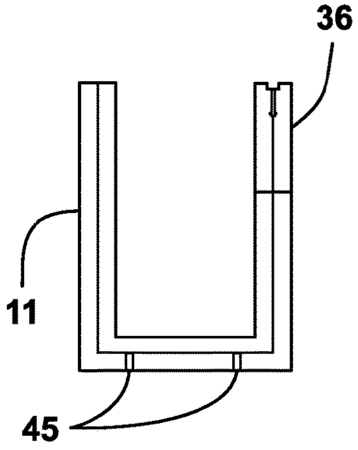
Figure 19:
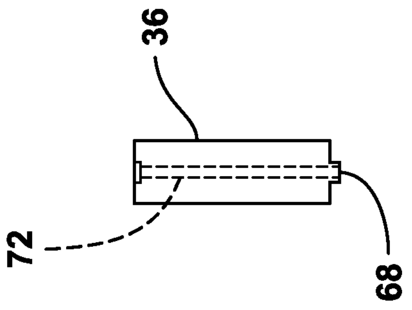
FIGS. 17-19 are top, side and end views of a trough riser portion of a preferred embodiment of the apparatus of the present invention.
Figure 18:
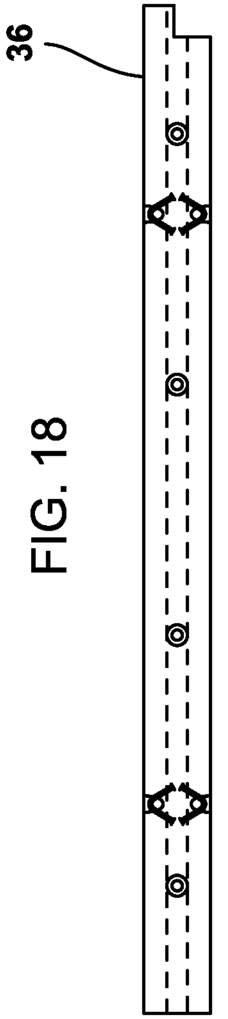
Figure 17:
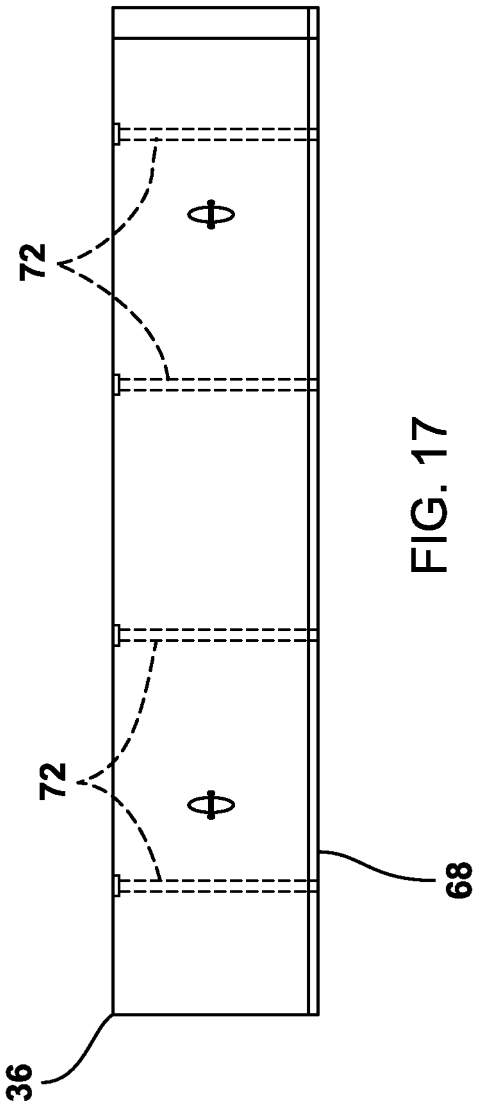
Figure 24A:
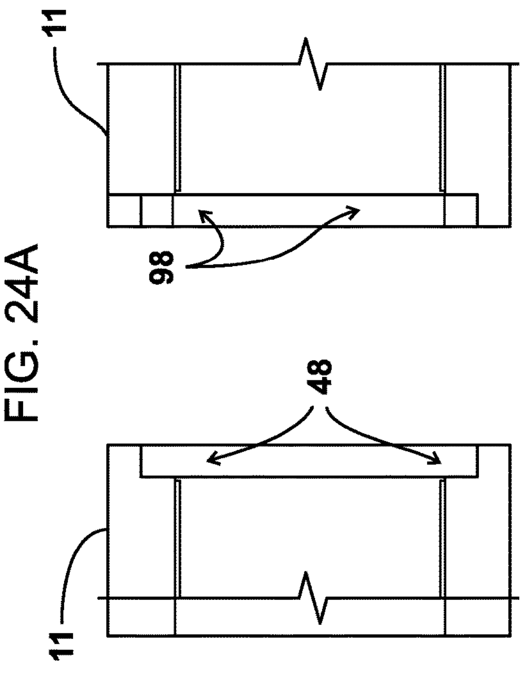
FIGS. 24A-24D are schematic diagrams of a trough expansion joint detail before and after assembly.
Figure 24B:
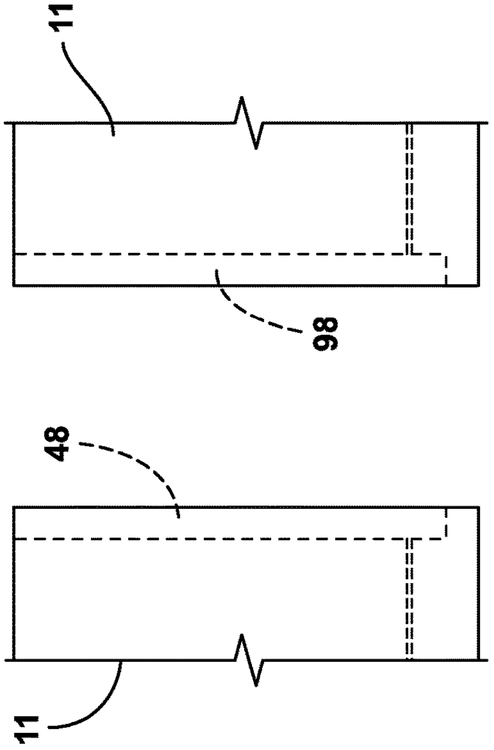
Figure 24C:
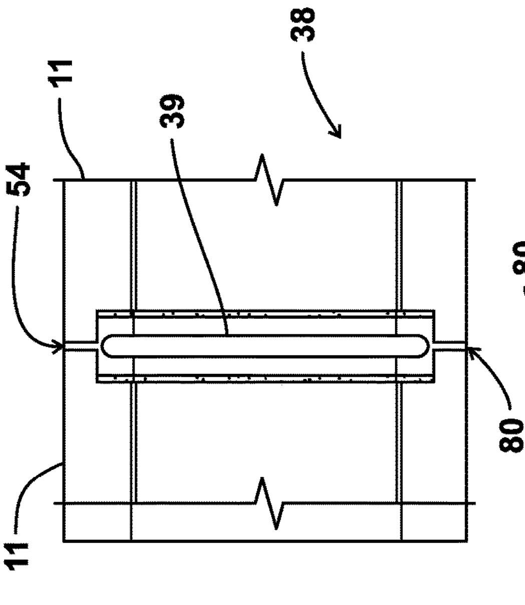
Figure 24D:
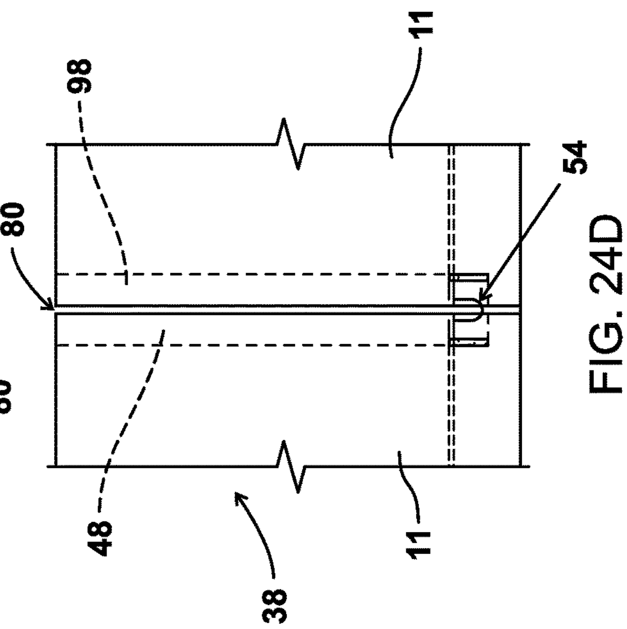

FIGS. 1-43 show preferred embodiments of the apparatus of the present invention designated generally by the numeral 10. Cryogenic containment trough or trench apparatus 10 preferably provides multiple, connectable trench or trough sections 11 connected end to end (see FIGS. 7 and 8). Each trough section 11 preferably has a bottom wall 12 and side walls 13, 14. Each trench or trough section 11 has opposing end portions 15, 16. Two or more such sections 11 are preferably connectable end to end using interlocking connections 17 (e.g., tongue and groove). In some cases, the sections 11 are preferably spaced apart (e.g., one inch) to provide a gap or joint 80 that can be filled with a seal or sealer (see FIGS. 24A, 24D, 26). FIGS. 2-11 show examples of straight trough sections 11. Some trough sections can be corner trough sections 33, 34, 35. Corner trough section detail examples are seen in FIGS. 8 and 12.

Panels 20, 21, 22 are preferably applied (with adhesive such as a bonder paste commercially available from Chemco Systems of Redwood City, California) to the sections 11. Panels 20, 21, 22 are preferably made of a cryogenic grade insulating material 28. The material 28 can be for example from Chemco Systems of Redwood City, California sold under the trademark InsulPOX. Panels 20 are preferably applied to bottom wall 12. Panels 21 are preferably applied to side wall 13. Panels 22 are preferably applied to side wall 14. Panels 20-22 are preferably spaced away from each end portion 15, 16 of a section 11 so as not to interfere with the interlocking connection 17. These panels 20-22 can be insulative when subjected to contact with a cryogenic temperature such as the cryogenic temperature of LNG (about −260° F., −162° C.).

Figure 1:
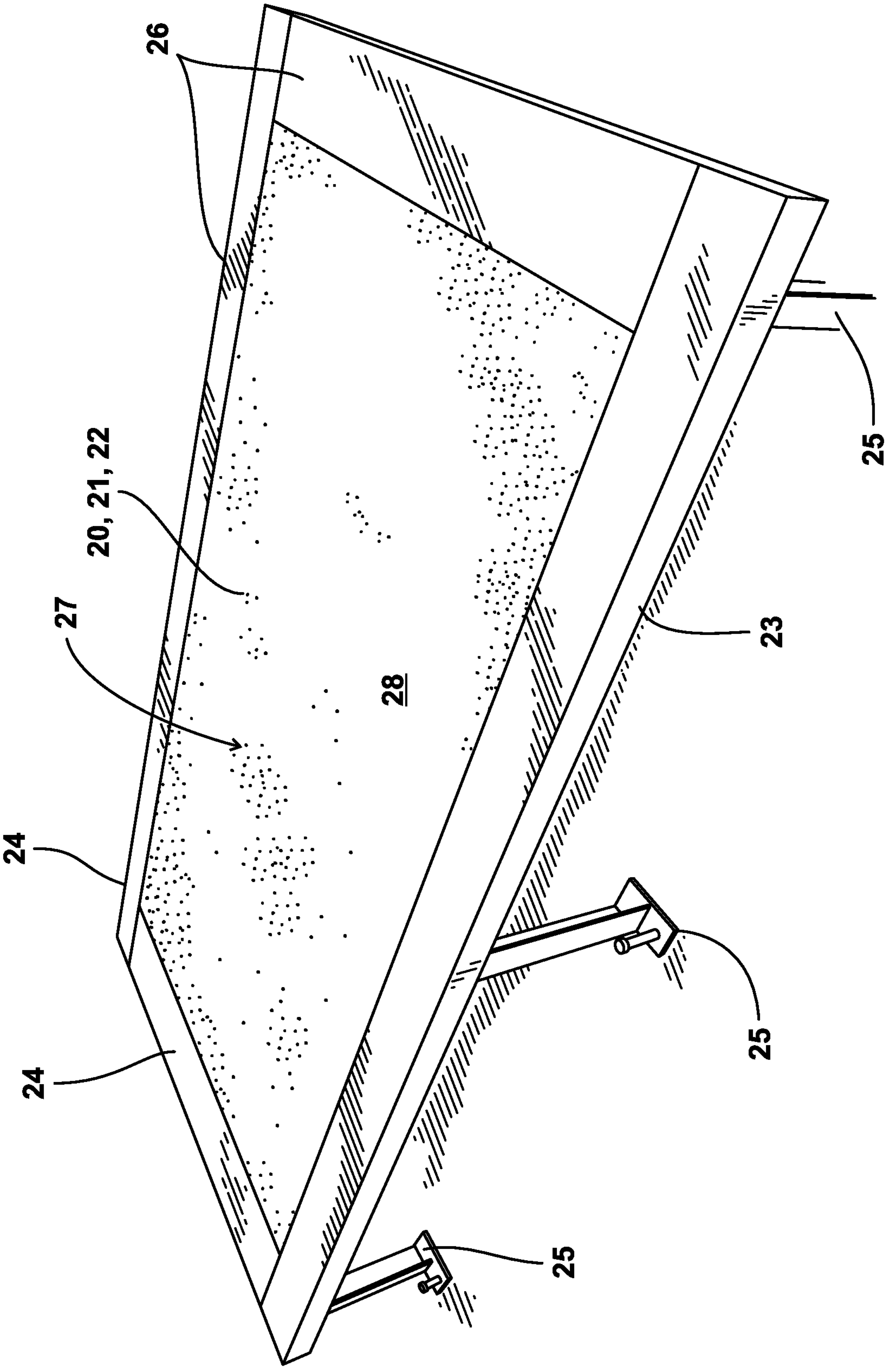
FIG. 1 is a partial perspective view of a preferred embodiment of the apparatus of the present invention and showing part of a method of the present invention.
Figure 2:
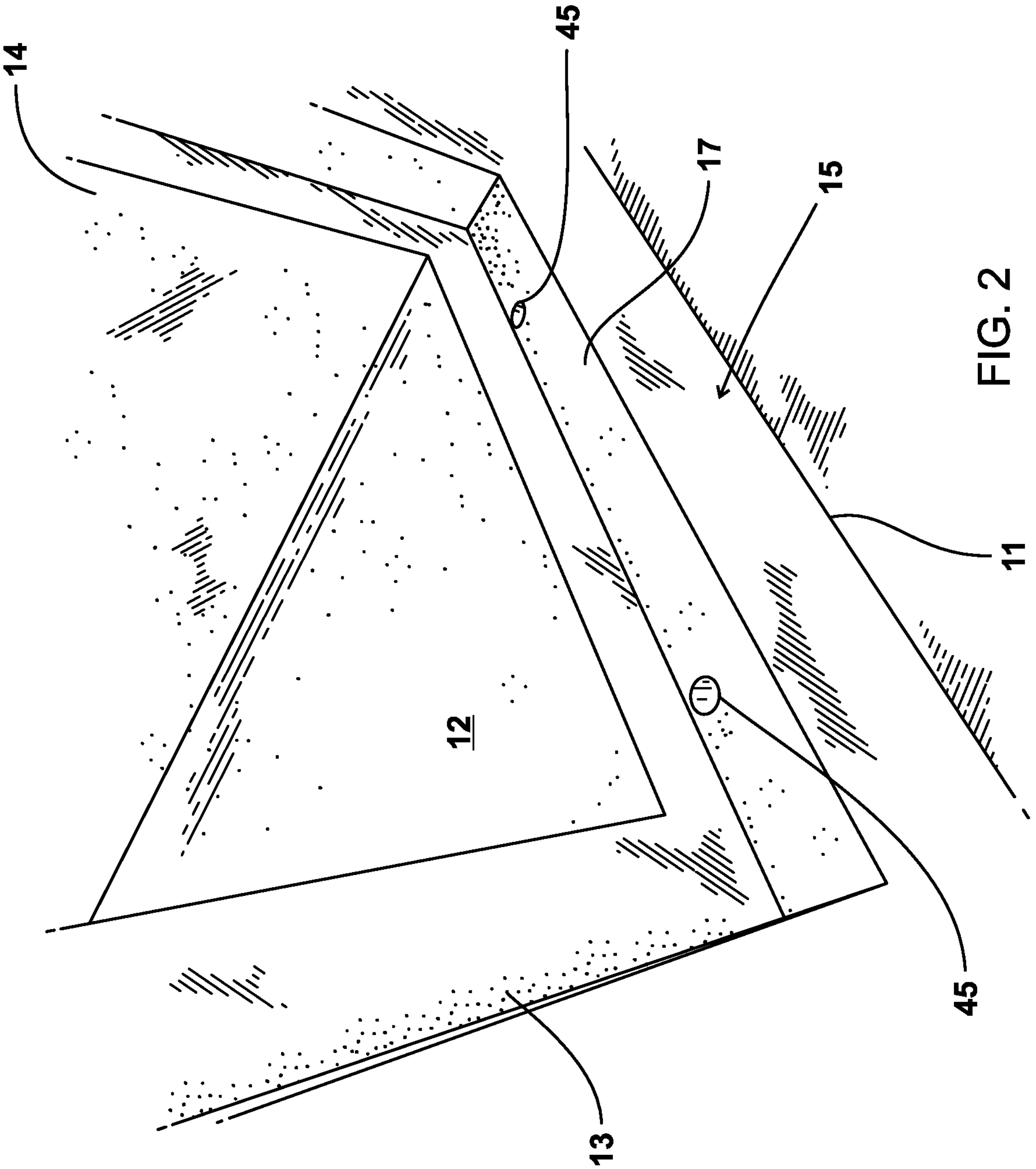
FIG. 2 is a partial perspective view of a preferred embodiment of the apparatus of the present invention and showing part of a method of the present invention.

In FIG. 1, panels 20-22 are fabricated in molds 23. Each mold 23 has a frame 24 that can include legs 25 and rectangular periphery 26. Frame 24 also includes a bottom panel. Panels 20-22 can be about one to three inches thick. Each mold 23 has a mold cavity 27 that is preferably filled with a cryogenic grade insulating polymer concrete material 28 such as, for example, sold under the trademark InsulPOX. Before adding the insulating polymer concrete material 28 to cavity 27, the cavity 27 is preferably coated with a release material, preferably lard (commercially available, sold under the trademark Armour®).

The insulating polymer concrete material 28 can be initially a liquid or slurry. After addition to cavity 27, it preferably hardens to form a rigid panel or solid panel 20, 21, 22. In mold 23, the material 28 is preferably self leveling. Because the mold 23 has a horizontally extending cavity 27, a panel 20, 21, 22 is preferably formed of uniform thickness (e.g., about 1-3 inches). The trough or trench section 11 to which panels 20, 21, 22 are applied are of precast concrete, preferably reinforced concrete.

Figure 3:
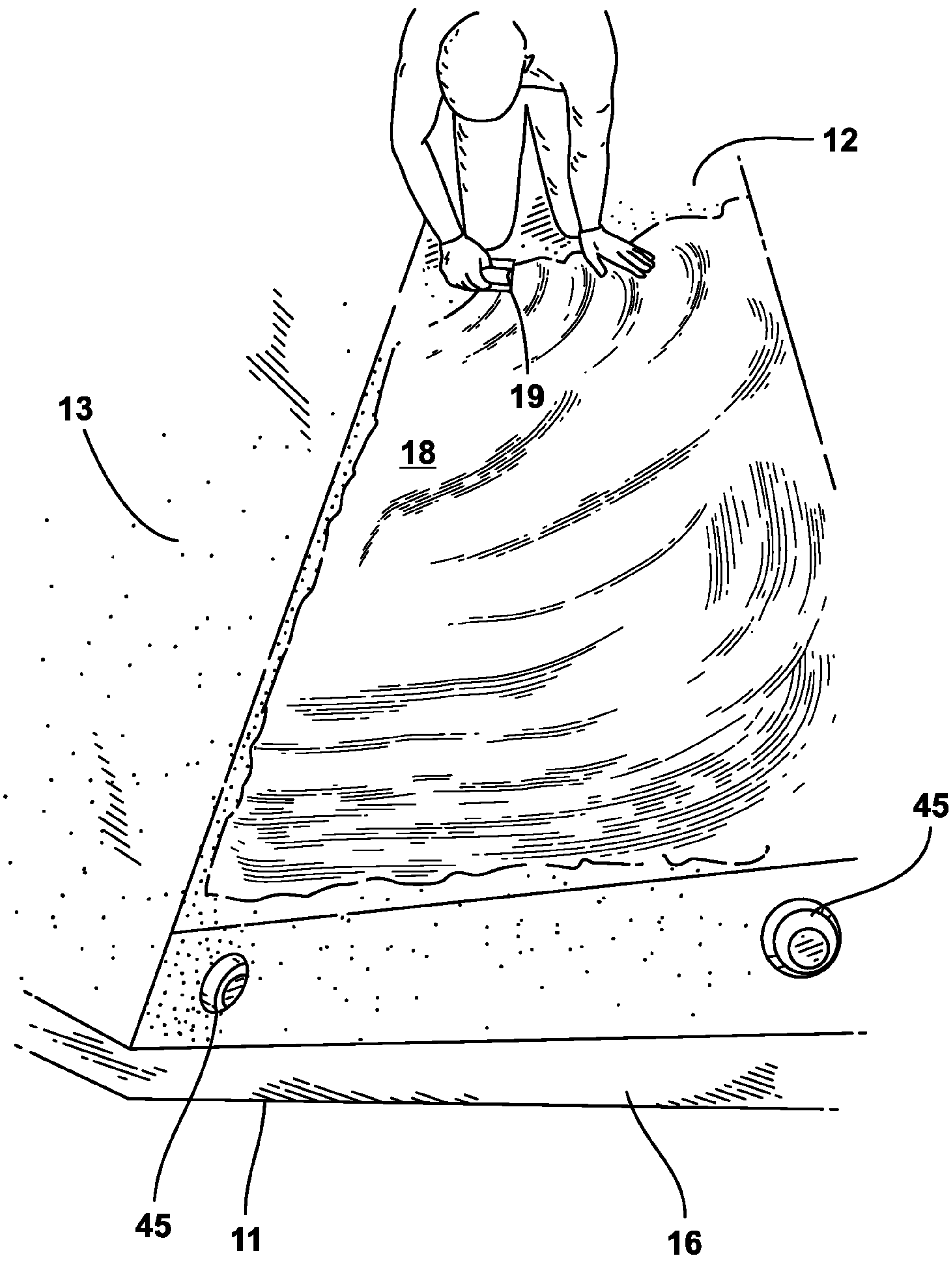
FIG. 3 is a partial perspective view of a preferred embodiment of the apparatus of the present invention and showing part of a method of the present invention.
Figure 4:
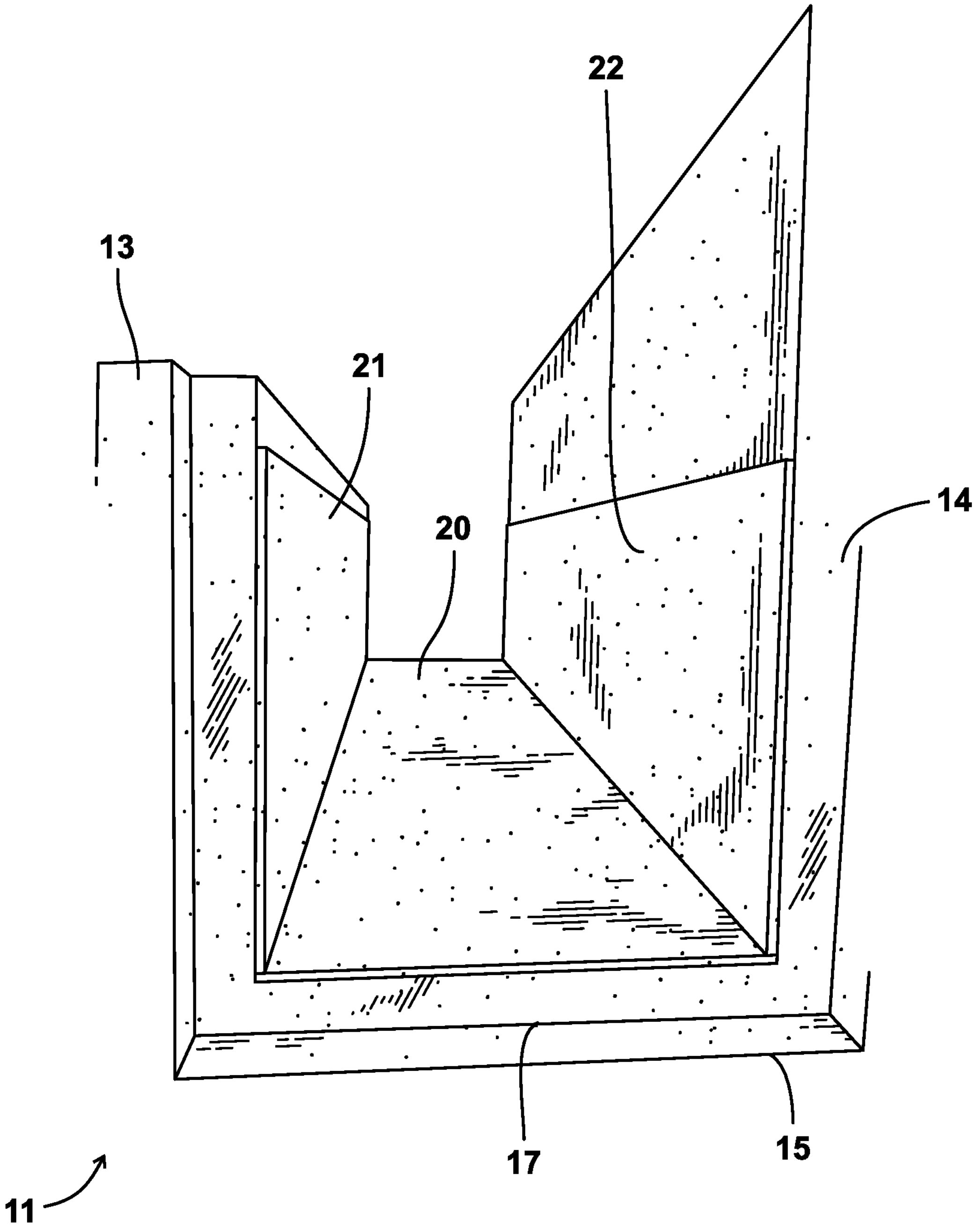
FIG. 4 is a partial perspective view of a preferred embodiment of the apparatus of the present invention and showing part of a method of the present invention.
Figure 5:
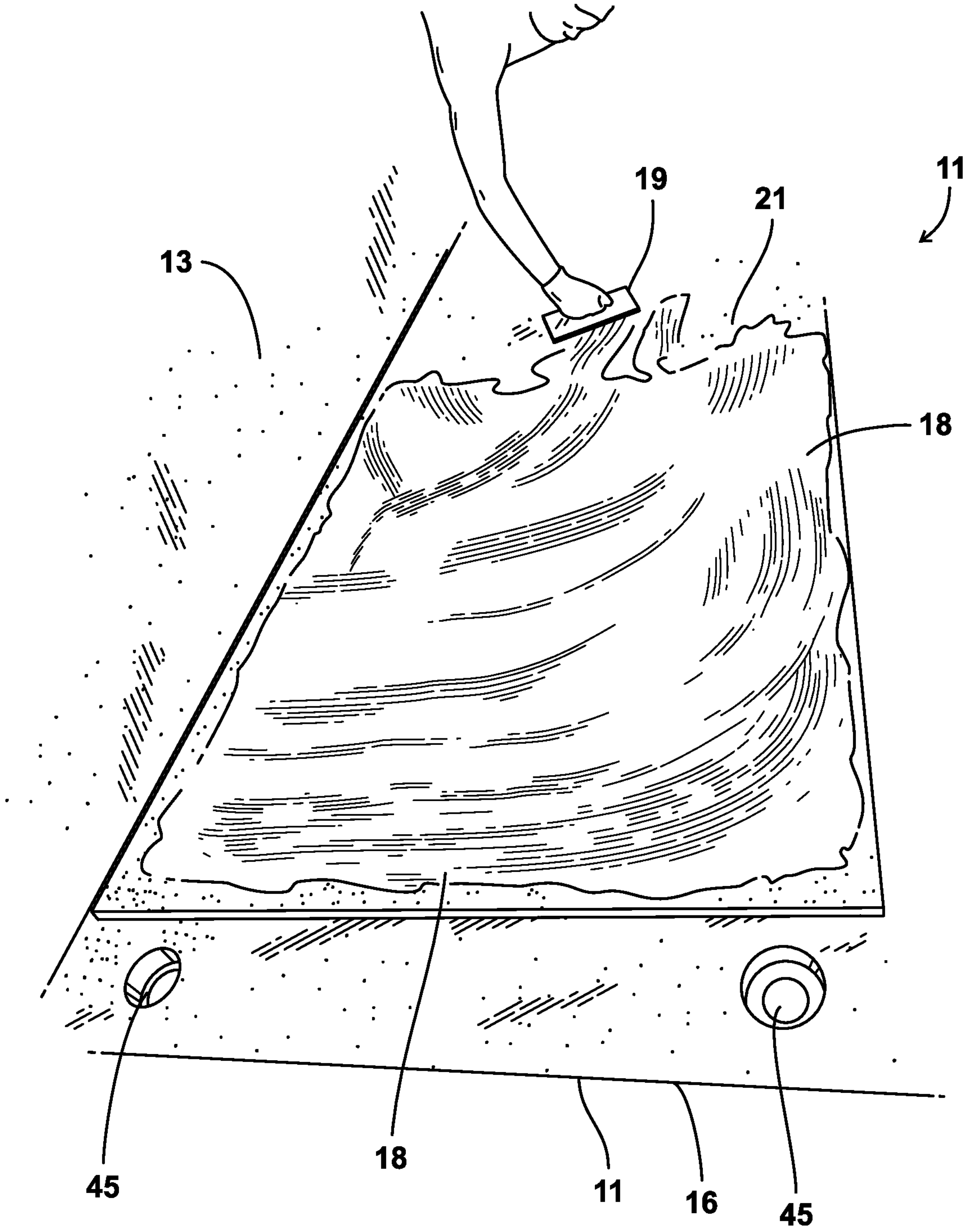
FIG. 5 is a partial perspective view of a preferred embodiment of the apparatus of the present invention and showing part of a method of the present invention.

To apply a panel 20, 21, 22 to a precast concrete trench section 11, the lower surface of the panel 20, 21, 22 is preferably first cleaned of the lard (e.g., power washed). The opposite or upper side of the panel is preferably covered with adhesive 18 as seen in FIG. 3. Adhesive 18 can be hand applied with a tool (i.e., trowel) 19. Bottom wall 12 and side walls 13, 14 can also be covered with adhesive 18 to adhere panels 20, 21, 22. Multiple panels 20, 21, 22 may be used on a wall 12, 13, 14 of section 11. Preferably, a non-sag sealant 82 can be used in gap 79 in between multiple panels 20, 21, 22, as seen in FIGS. 6 and 7.

When two sections 11 are connected end to end at the interlocking connection 17 (e.g., tongue and groove), the end portions 15 or 16 of two sections 11 may need to be sealed with a sealed non-sag sealing material 82, as this area at the joint is not always not covered with a panel 20, 21 or 22. Sealant 82 can be a sealant in between insulation panels for LNG spill containers. Such non-sag sealer 82 for use with cryogenic temperatures can be commercially available from Chemco Systems of Redwood City, California sold under the trademark InsulPOX, or a butyl rubber elastomer available from Valpac, Inc. sold as Cryo-bond 837 Butyl Rubber Elastomer. Sealing material 82 is preferably a non-sag material that can preferably withstand cryogenic temperatures. Sealing material 82 is preferably resistant to mechanical and thermal shocks. Sealing material 82 preferably creates a liquid tight seal in between panels 20, 21, 22. Panels 20, 21, 22 are preferably not positioned next to another panel 20, 21, 22, as experimental sections showed that the panels 20, 21, 22 cracked under thermal expansion and contraction.

Preferably the joint or gap 80 in between end portions 15 or 16 of two sections 11 can be sealed with a combination of one or more layers of a mesh or woven material 81 and non-sag sealer 82. Preferably, there are two layers of the mesh or woven material 81 and the non-sag sealer 82. Once the layers of mesh 81 and sealer 82 are in place, cryogenic sealing material 82 can be painted over the filled joint 80. Preferably, there is about 40 mils in thickness of the non-sag sealant 82 in joint or gap 80.

Preferably, panels 20, 21, 22 are sized and shaped to cover the entire wall 12, 13, 14 that it is adhered to. If a panel 20, 21, 22 does not extend to the end of section walls 12, 13, 14, an extender strip is preferably used. The extender strip can be made of the same cryogenic material as the panels 20, 21, 22. Preferably, end portions 15 or 16 of two sections 11 can be sealed horizontally in between the bottom walls 12 of each section 11. Preferably, end portions 15 or 16 of two sections 11 can be sealed vertically in between the side walls 13 and 14 of each section 11. The combination of the panels 20, 21, 22 and the sealed joint 80 using mesh 81 and sealer 82 at interlocking connection 17 preferably creates continuous cryogenic material from panels 20, 21, 22 of one section 11 to the panels 20, 21, 22 of the connecting section 11. Preferably, the cryogenic sealed joint 80 bonds or bridges panels 20, 21, 22 of each adjacent section 11.

Mesh or woven material 81 can be an engineering fabric or polymeric mesh material, such as polypropylene, such as ITW Engineered Polymers Type Y-4"-Crack Repair Tape, or white polyester fabric such as sold by Carlisle Coatings & Waterproofing Incorporated under the brand DCH Reinforcing Fabric Cloth. The mesh or woven material 81 preferably provides a more viscous seal than adhesive alone. The mesh or woven material 81 preferably allows for any thermal contraction and expansion of concrete walls 12, 13,14 and panels 20, 21, 22.

In some experimental sections, InsulPOX was used in gap or joint 80 in between two sections 11, however InsulPOX developed cracks and appeared to be ineffective under thermal conditions and elongation properties of concrete and cryogenic material. In some experimental sections, 3M brand products (2216NS-modified Tan (epoxy)) were used, however they appeared ineffective. Testing showed that Valpac, Inc. Cryo-bond 837 Butyl Rubber Elastomer could preferably be used as the sealant for gap or joint 80.

A thixotrope can be added into the non-sag sealer Cryo-bond 837 to preferably thicken the non-sag sealer Cryo-bond 837. The thixotrope can preferably shorten the pot life of the non-sag sealer Cryo-bond 837.

The present invention also includes a method of installing a trench 10 for containing a cryogenic spill, comprising the steps of:

a) construction multiple precast concrete sections 11, each section preferably having a bottom wall 12 and spaced apart side walls 13, 14 connected to and extending up from said bottom wall 12;

b) wherein in step "a" each section 11 can have end portions 15, 16 that enable connection to another said concrete section 11;

c) at the first location, preparing multiple panels 20, 21, 22 of polymeric concrete material 28 by filling one or more molds 23 with a slurry or liquid polymeric concrete material 28 and after time allowing the material to cure and harden;

d) wherein in step "c" the mold 23 has a cavity 27 that is preferably lined with a release material;

e) at the first location, preferably adhering one or more of said panels 20, 21, 22 of step "c" to the bottom wall 12 and side walls 13, 14 of each said concrete section 11 using an adhesive 18;

f) after step "e", preferably transporting the concrete sections 11 from the first location to a second location;

g) at said second location, preferably connecting the concrete sections 11 together using connections 17 of one end portion 15 to another end portion 16; and h) preferably applying a sealant 82, such as an epoxy grout or a butyl rubber elastomer, to the connections 17 of step "g" at the second location.

Preferably, prior to adding a sealant 82 in step "h", one or more seals 62 preferably made of a polyethylene extruded closed cell foam (e.g., Backer Rod such as SSI brand polyethylene extruded closed-cell foam backer rod, or other suitable material) can be placed at the bottom of the gap or joint 80 in between concrete sections 11. Seals 62 can be round or other suitable shape. Seals 62 can have compressible properties. A Polyurethane Non-Sag Joint Sealant 83, such as Sikaflex 1A brand polyurethane elastomeric non-sag sealant, can be applied in the joint space 80 on top of seals 62. Polyurethane Non-Sag Joint Sealant 83 can preferably fill joint or gap 80 to a point that it is preferably flush with the top surface. Polyurethane Non-Sag Joint Sealant 83 can be a mechanical backing for cryogenic material and is preferably a liquid seal.

In one embodiment, the Polyurethane Non-Sag Joint Sealant 83 can be installed in the joint space 80 over seal 62 (i.e., backer rod), then a base coat of sealant 82 (i.e., Cryo-bond 837). A mesh or cloth material 81 can be layered on top of sealant 82, wherein the mesh material 81 is preferably saturated, and then top-coated with sealant (i.e., Cryo-bond 837).

Preferably, in step "h" a joint or gap 80 in between end portions 15 or 16 of two sections 11 can be sealed with a combination of one or more layers of a mesh or woven material 81 and non-sag sealer 82.

Preferably, a xylene solvent cleaner can be applied on top of the sealed joint of step "h". The xylene solvent cleaner can evaporate off in time.

Preferably, each panel 20, 21, 22 can have an upper surface and a lower surface and further comprising applying the adhesive 18 in step "e" to the upper surface.

Preferably, after step "d" the lard is removed from the lower surface of each panel 20, 21, 22.

Preferably, each panel 20, 21, 22 is between about one half and three inches thick.

Preferably, each panel 20, 21, 22 can have a generally rectangular periphery.

Preferably, the liquid polymeric concrete material 28 can be a cryogenic insulating material.

Preferably, the release material can include animal fat.

Preferably, the release material can include lard.

Preferably, at least one of the side walls 13, 14 has a maximum side wall height and wherein the panels 21 or 22 extend vertically only part of the maximum side wall height.

Preferably, the precast concrete sections 11 have openings 45 having recess 40 through the bottom wall 12 at one or both of said end portions 15, 16.

Figure 9:
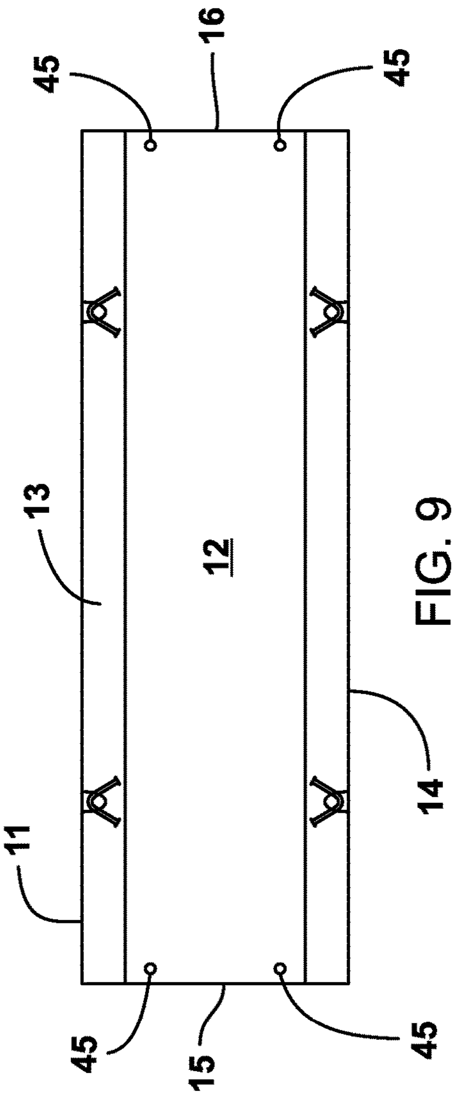
Figure 10:
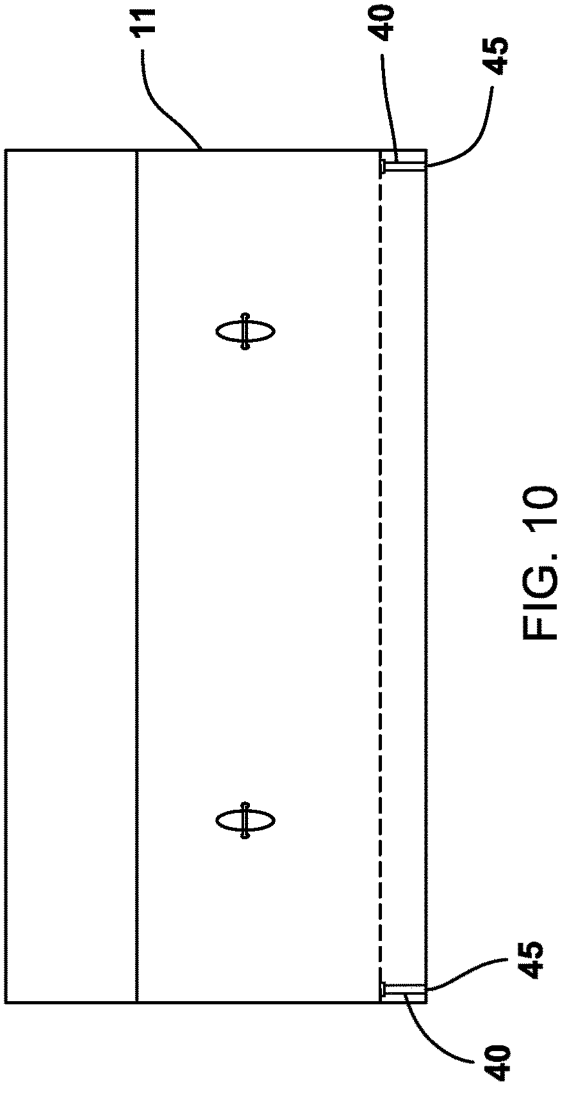

FIG. 8 shows an exemplary diagram for the overall trough system 10 as well as samples of individual trough sections. In FIGS. 9-11, walls 13, 14 are of the same height. In one or more embodiments of section 11, one side wall can be taller than the other side wall (e.g., see FIG. 4). In one or more embodiments, a side wall 13, 14 of a section 11 can be fitted with a riser section 36 to increase side wall height (see FIG. 25).

In FIG. 8, sections 30, 32 shows a straight trough 11. In FIG. 8, the section 31 can have a bend (or bends or turns) in the overall LNG trench or trough 10 at 33, 34 and at 35. The bend or turn at 33, 34 is formed by joining section 33 to section 34. As shown, each trough section 33, 34 has an angled end portion that engages the angled end portion of the other to provide the orientation of FIG. 8. The trough section 35 has end portions that are angled relative to one another as seen in FIGS. 8 and 12 so that when section 35 is connected to section 11 as seen in FIG. 8 a bend is provided to the overall trench or trough 10.

In FIG. 8, end sections or end troughs 46 can be provided to each section 30, 31, 32.

Figure 20:
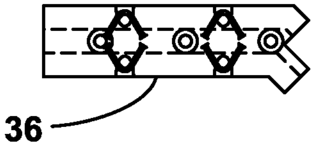
FIGS. 20-22 are top, side and end views of a trough riser portion of a preferred embodiment of the apparatus of the present invention.
Figure 22:
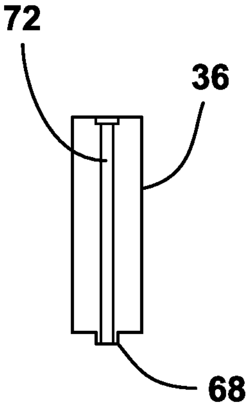
Figure 21:
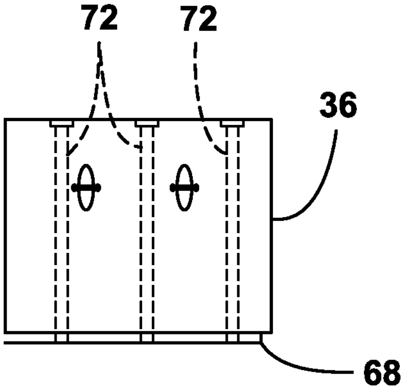
Figure 23A:
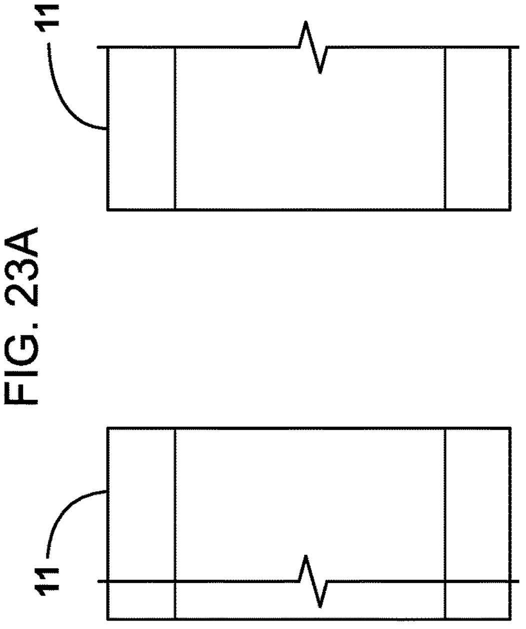
FIGS. 23A-23D are schematic diagrams of a trough lap joint detail before assembly and after assembly.
Figure 23B:
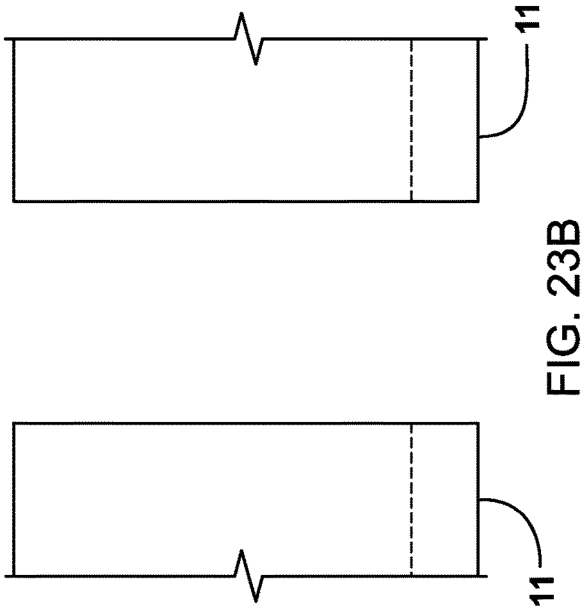
Figure 23C:
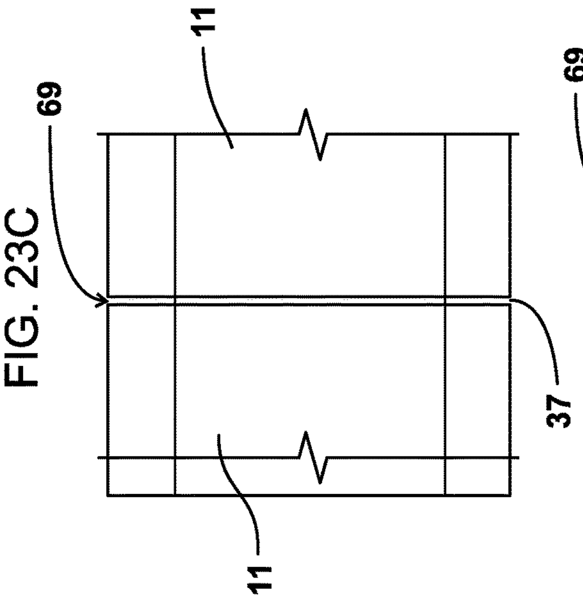
Figure 23D:
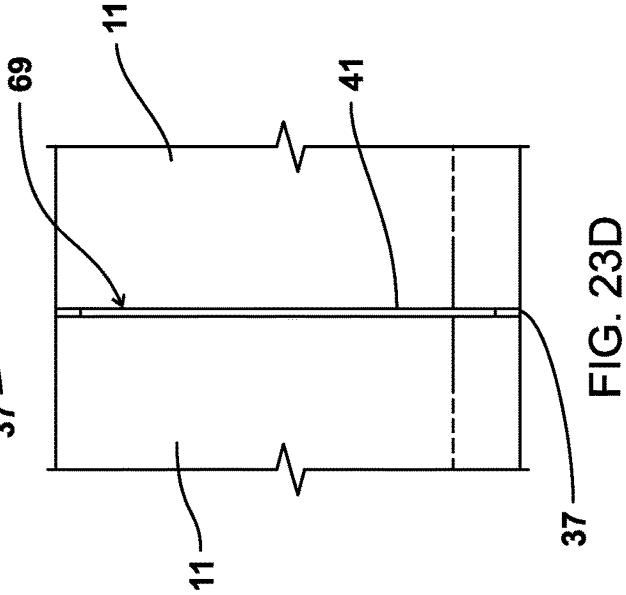
Figure 25:
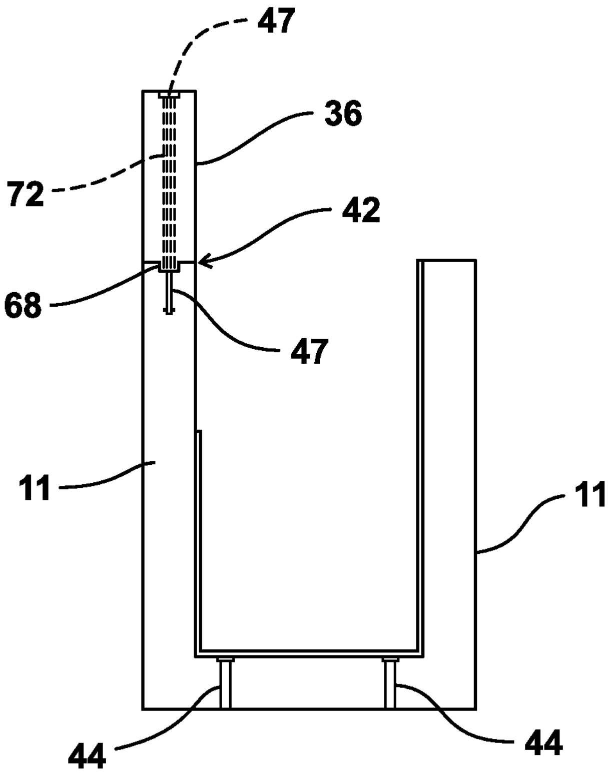
FIG. 25 is a schematic diagram of a riser to trough connection detail.
Figure 26:
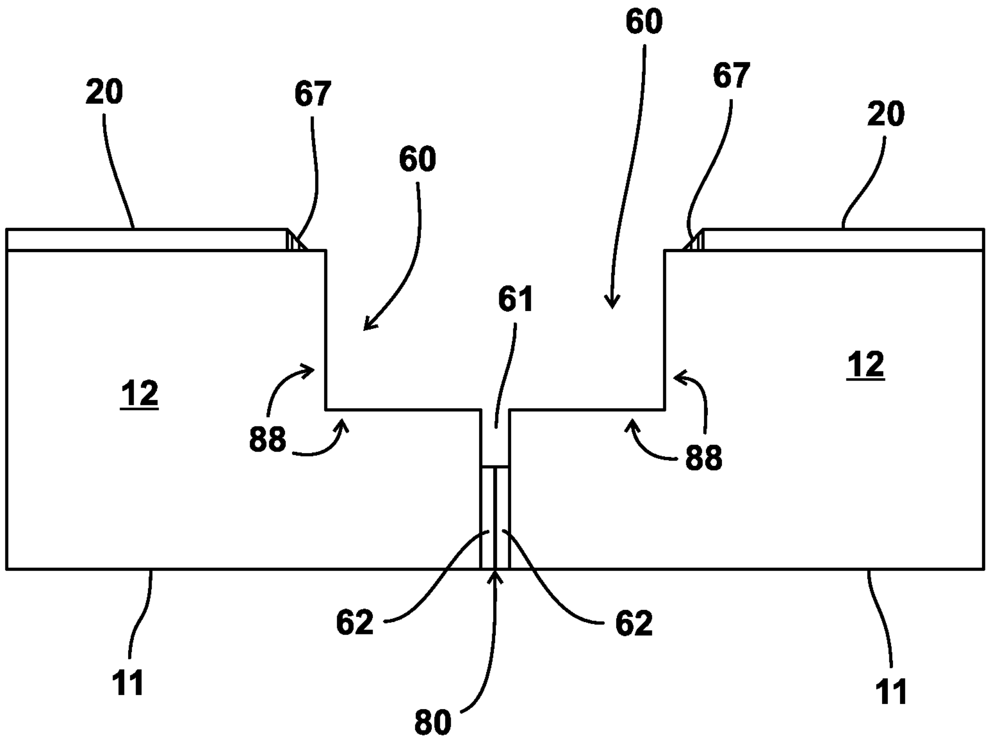
FIG. 26 is a fragmentary view that illustrates installation of a bellow joint at the interface of two precast concrete trough sections.

Wall riser sections 36 are seen in FIGS. 17-22. Wall riser 36 as seen in FIGS. 20-22 can be placed on top of wall 13 of corner trough section 35 seen in FIG. 12. FIG. 25 shows a riser 36 to trough section 11 connection detail 42. Riser 36 can have a tongue and groove connection 68 preferably at the bottom end for connection with side wall 13 or 14 of trough section 11, 35, as seen in FIGS. 12, 22, 25. A pin or pins or rod or rods or other fastener 47 can form a connection between each riser 36 and a side wall 13 or 14 of trough section 11 or 35. Each pin, rod, or fastener 47 can extend through a vertical opening or channel 72 in riser 36 (see FIG. 25). Pins, rods or fasteners 47 can connect with a section 11 by being embedded in section 11 or with a threaded connection to an internally threaded member embedded in section 11 or with an adhesive or bonding material.

Figure 39:
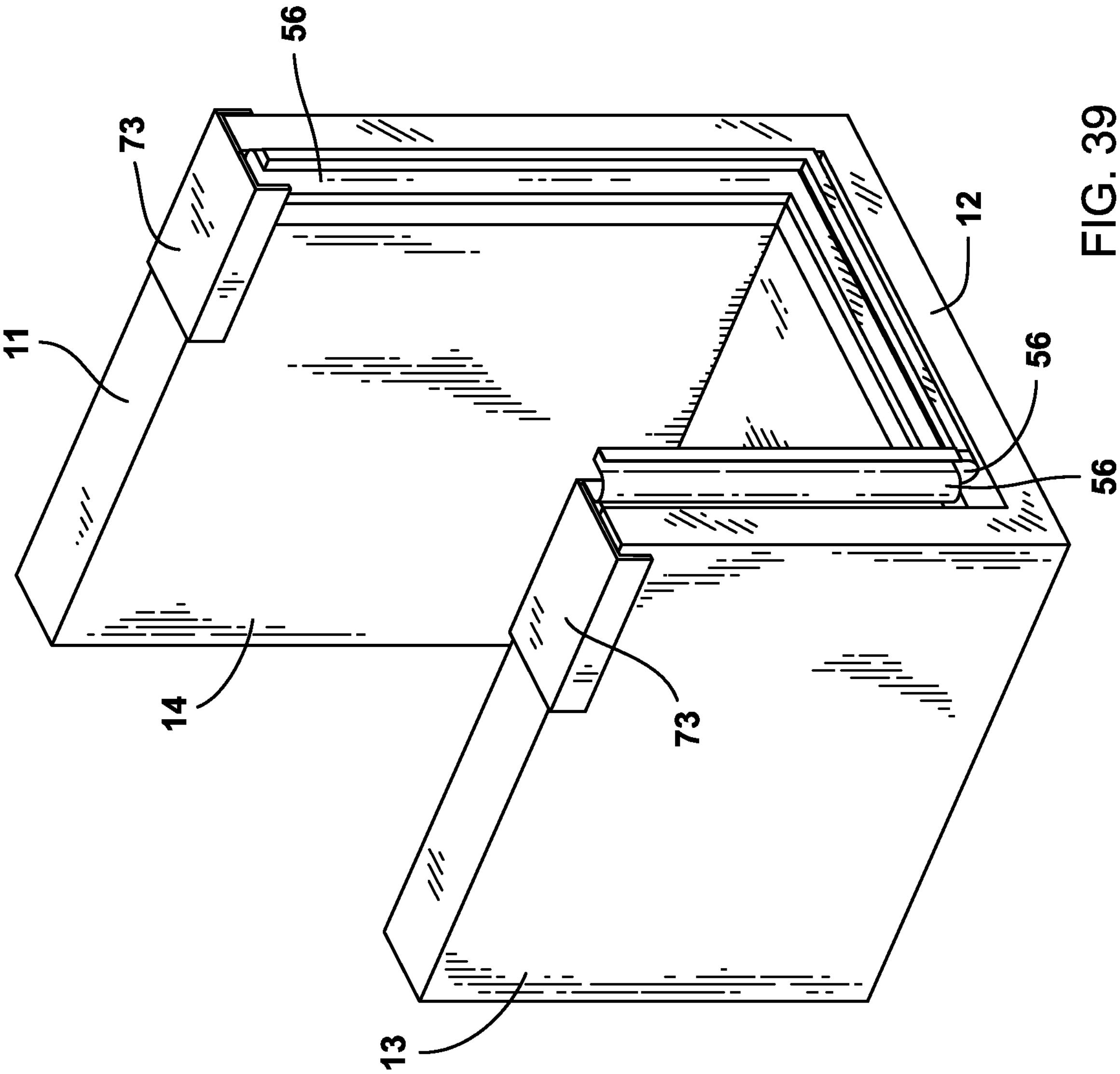
FIG. 39 is a fragmentary view that illustrates installation of a bellow joint at the interface of two precast concrete trough sections.
Figure 40:
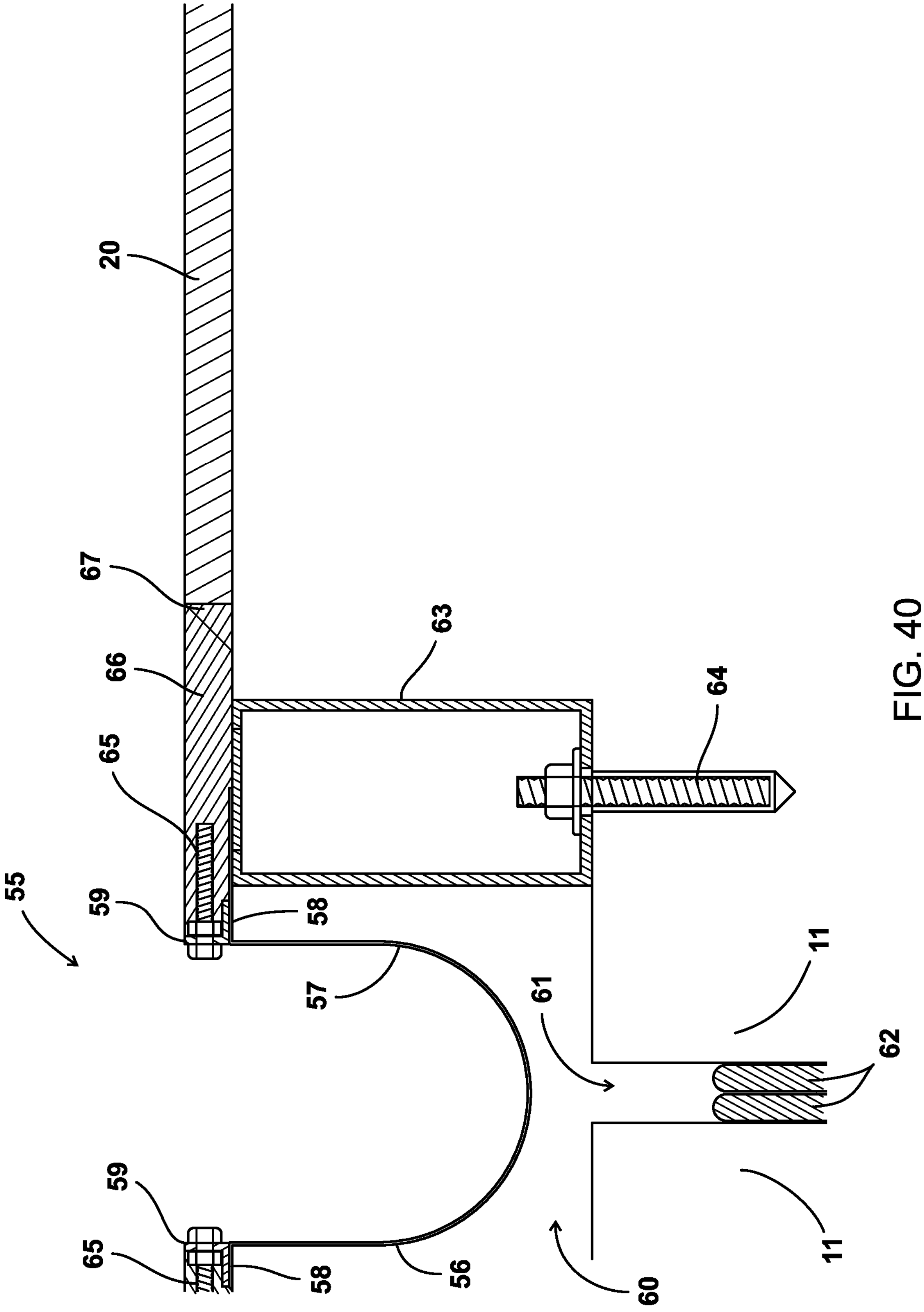
FIG. 40 is a fragmentary view that illustrates installation of a bellow joint at the interface of two precast concrete trough sections.
Figure 41:
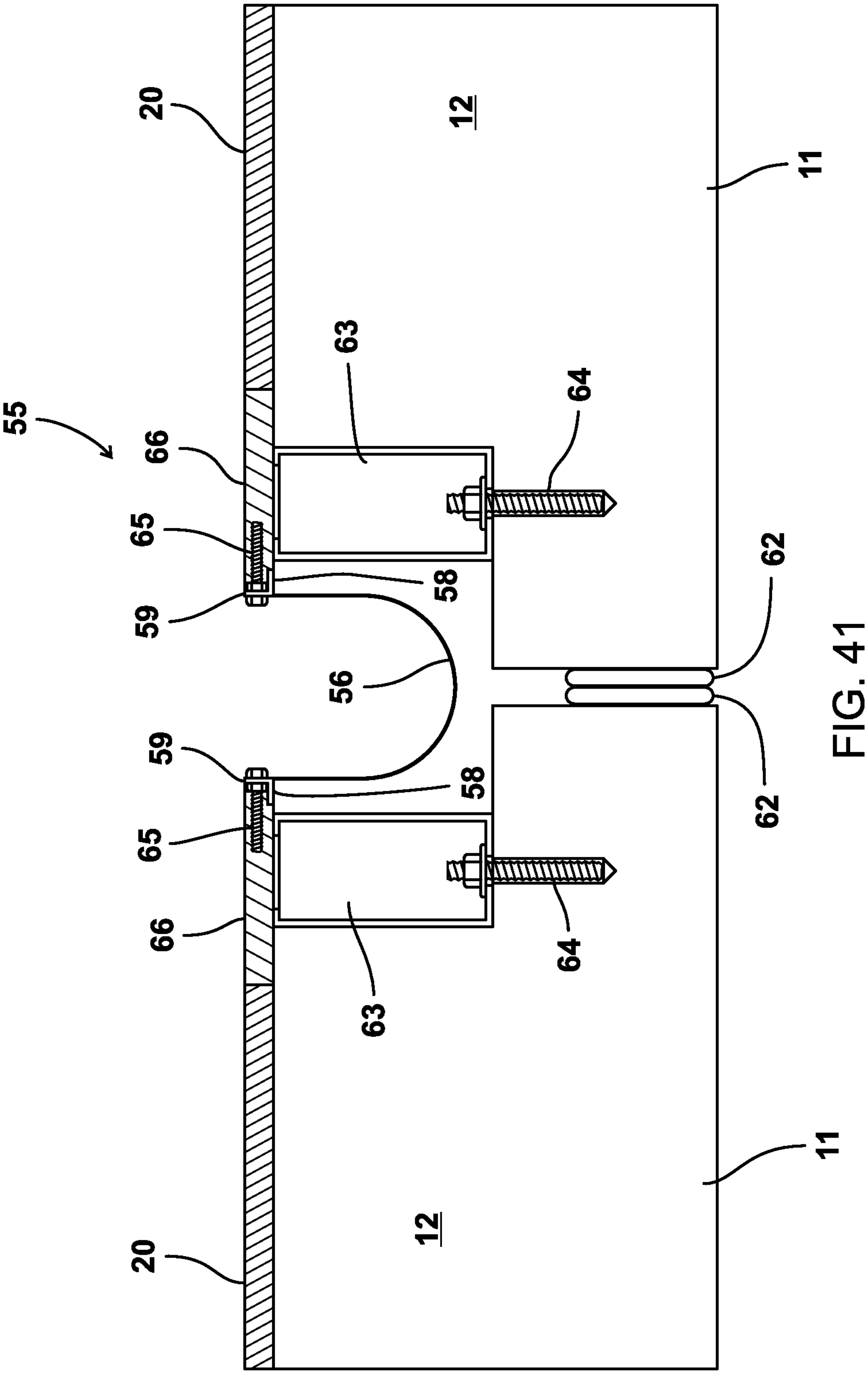
FIG. 41 is a fragmentary view that illustrates installation of a bellow joint at the interface of two precast concrete trough sections.

Gap or joint 80 in between two sections 11 can be bridged preferably with an expansive joint, such as bellow joints 54, 55, 56 seen in FIGS. 24A-D, 41, 42. Bellow joints are preferably used to bridge the bottom walls 13 of each section 11, and preferably used to bridge side walls 13, 14 of each section 11, as seen in FIG. 39.

Figure 42:
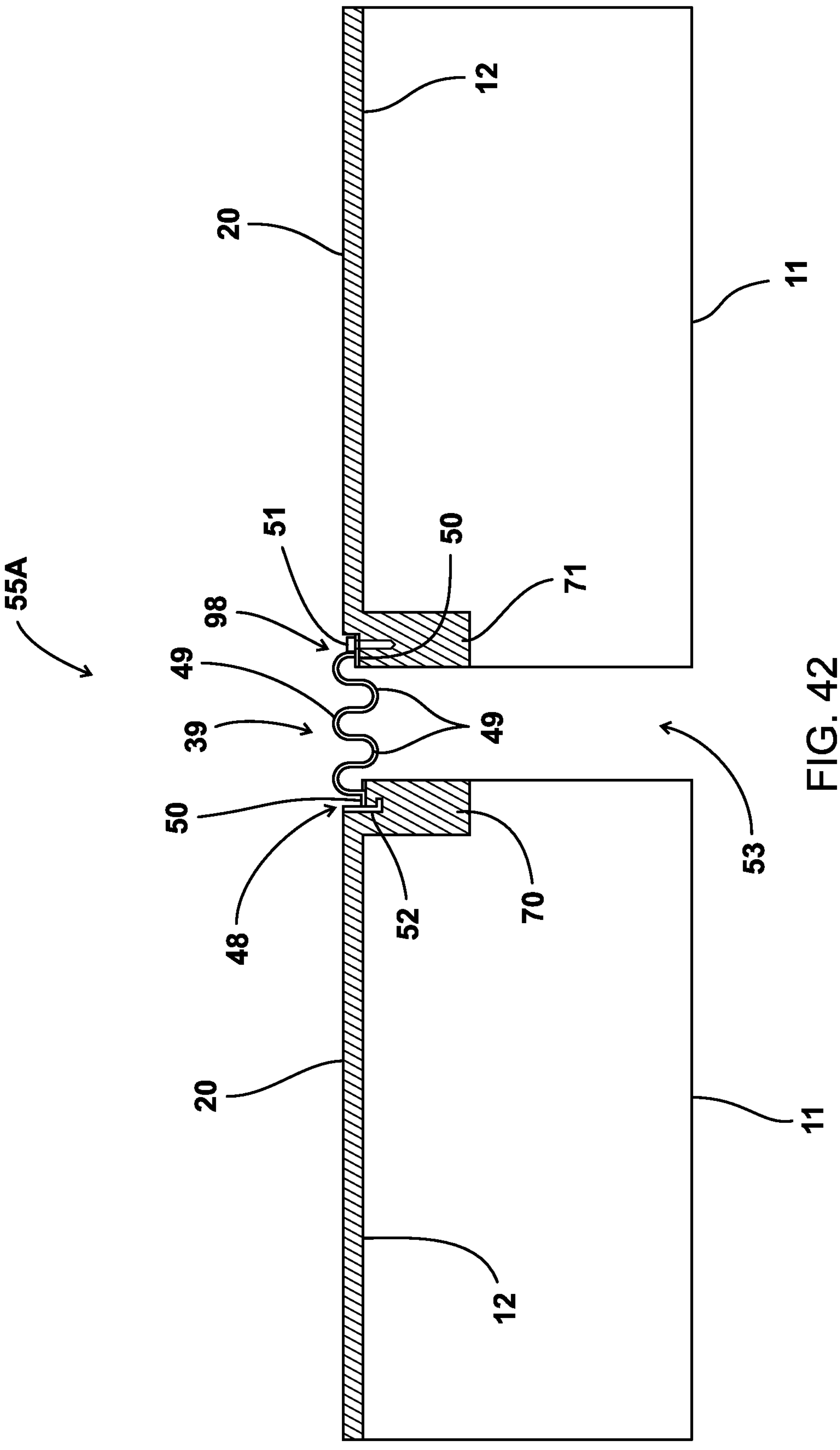
FIG. 42 is a fragmentary view that illustrates installation of a bellow joint at the interface of two precast concrete trough sections.

FIGS. 23A-23D show a trough lap joint at 37. A gap 69 (e.g., about one inch) can be provided and filled with a watertight, fire-resistant seal 41 (e.g., EMSHIELD® sold by EmShield Joint Systems). Each section 11 can have openings 45 that are receptive of anchors or anchor bolts 44 in recess 40 which anchor the section 11 to a foundation (e.g., reinforced concrete). FIGS. 24A-24D show schematic diagrams of a trough expansion joint detail 38 before and after assembly. FIGS. 24A-24D show use of a bellow joint 54 in between two selected trough sections (e.g., two sections 11). The bellow 39 can be located in a void space or recess 98 at one end of a section 11 as well as in a recess 48 of another, adjacent section 11 as seen in FIGS. 24A-24D. In FIG. 42, the bellow joint 55A can include bellow 39 preferably of metal (e.g., stainless steel). In FIG. 42, the bellow joint 55A is shown as an interface between two (2) straight trough sections 11 at the bottom wall 12 of each section 11. Each section 11 provides a void space 48 or 98 for attachment to bellow 39.

Bellow 39 can have one or more curved sections 49 and opposed end portions with flanges (e.g. flat flanges) 50. Each section 11 bottom wall 12 can be fitted with a panel 20, 21, 22, adhered to the wall 12, 13, 14 with a cryogenic non-sag adhesive 18. Void spaces 48, 98 are preferably filled in the field (i.e., after delivery of precast section 11 and attached panels 20-22 to a selected locale) with a cryogenic non-sag adhesive 18. The bellow 39 is preferably secured with non-sag cryogenic sealer at 70, 71 in FIG. 42 that fills each cavity 48, 98 and with a drilled stainless steel anchor or anchor bolt 51 or stainless steel tab 52 connected to flange 50. In FIG. 42 that there is a gap 53 between the two (2) sections 11.

Figure 27:
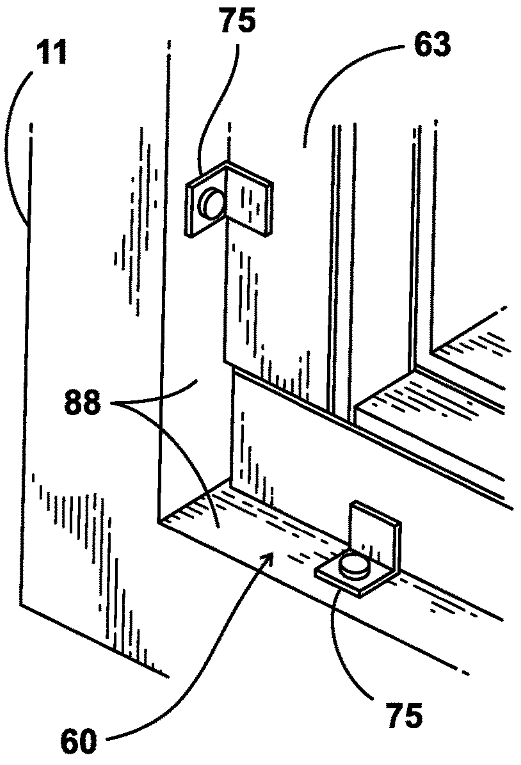
FIG. 27 is a fragmentary view that illustrates installation of a bellow joint at the interface of two precast concrete trough sections.
Figure 28:
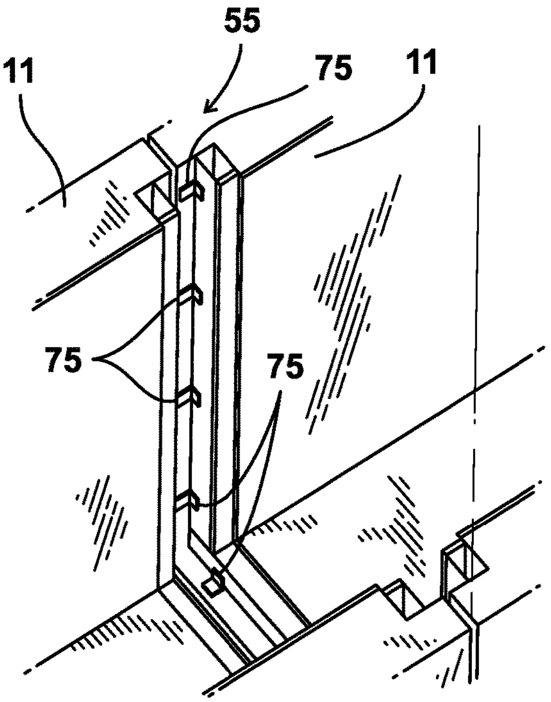
FIG. 28 is a fragmentary view that illustrates installation of a bellow joint at the interface of two precast concrete trough sections.
Figure 29:
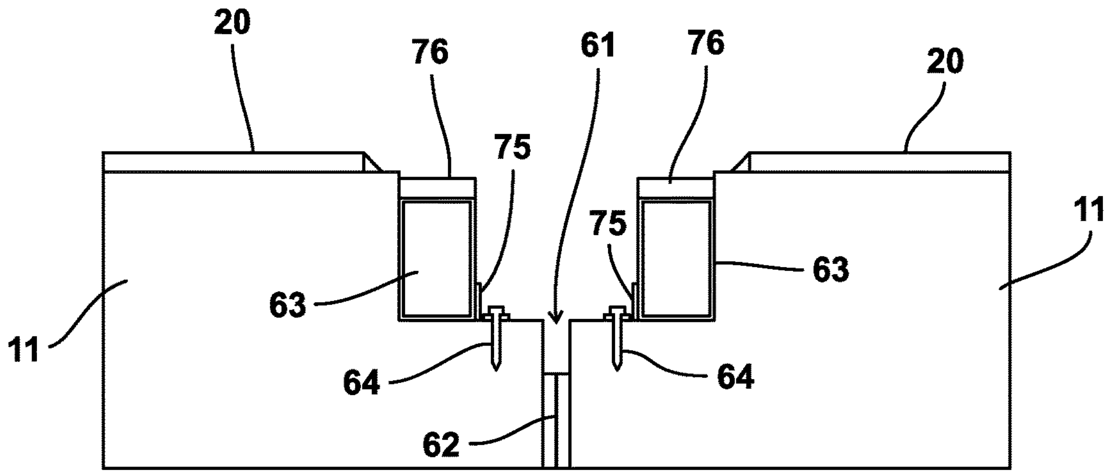
FIG. 29 is a fragmentary view that illustrates installation of a bellow joint at the interface of two precast concrete trough sections.

FIGS. 26-41 show alternate bellow joints 55. FIGS. 26-29 shows trough sections 11 having a gap 80 connected without a bellow 56. Each section 11 bottom wall 12 can be fitted with panel 20 having nosing 67. Each section 11 side walls 13, 14 can be fitted with panel 21, 22 having nosing 67. Panels 20, 21, 22 and nosing 67 are preferably made of a cryogenic material. FIG. 32 shows an alternate embodiment without nosing 67 on panels 20. Each trough section 11 can have a connecting portion 88 that preferably creates void space 60 (see FIGS. 27-29, 40-41). FIGS. 27-29 show galvanized tubing sections 63 placed in void space 60 and preferably on connecting portion 88 of each section 11. Anchors or anchor bolts 64 and angle plate/tab 75 preferably secure tubing sections 63 to trough sections 11 at void space 60. A non-sag filler 76 (e.g., commercially available under Insulpox name) can be placed over tubing sections 63 (see FIGS. 29, 31).

Figure 30:
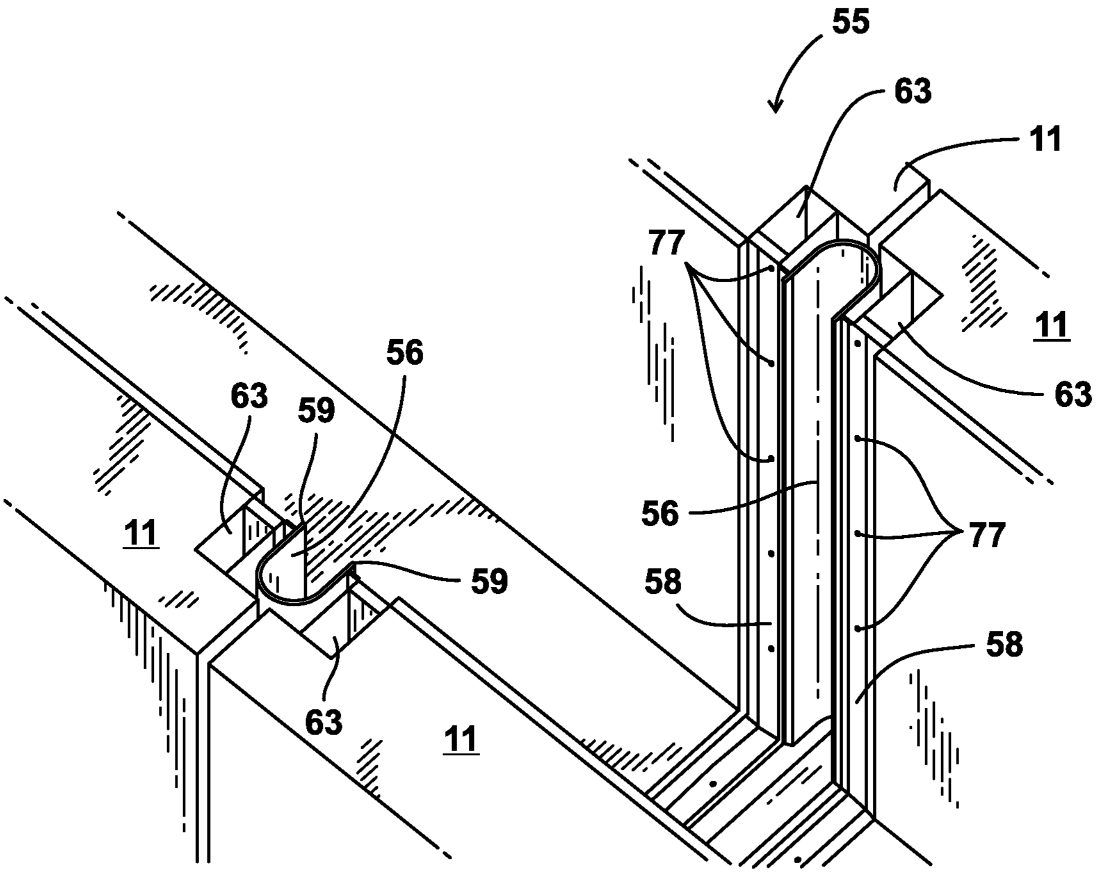
FIG. 30 is a fragmentary view that illustrates installation of a bellow joint at the interface of two precast concrete trough sections.
Figure 31:
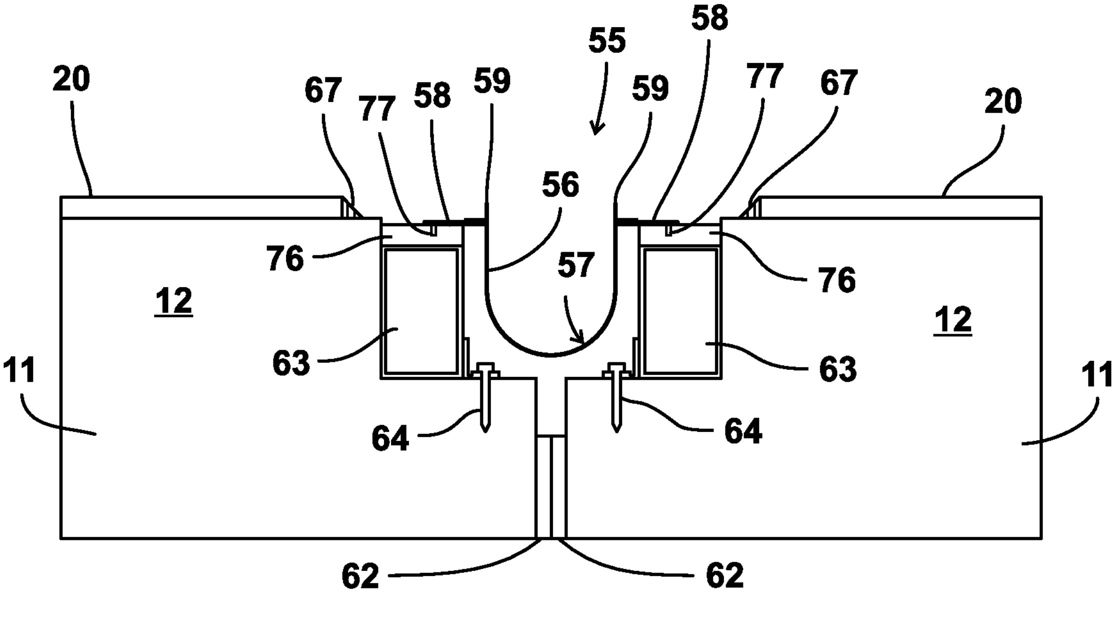
FIG. 31 is a fragmentary view that illustrates installation of a bellow joint at the interface of two precast concrete trough sections.
Figure 32:
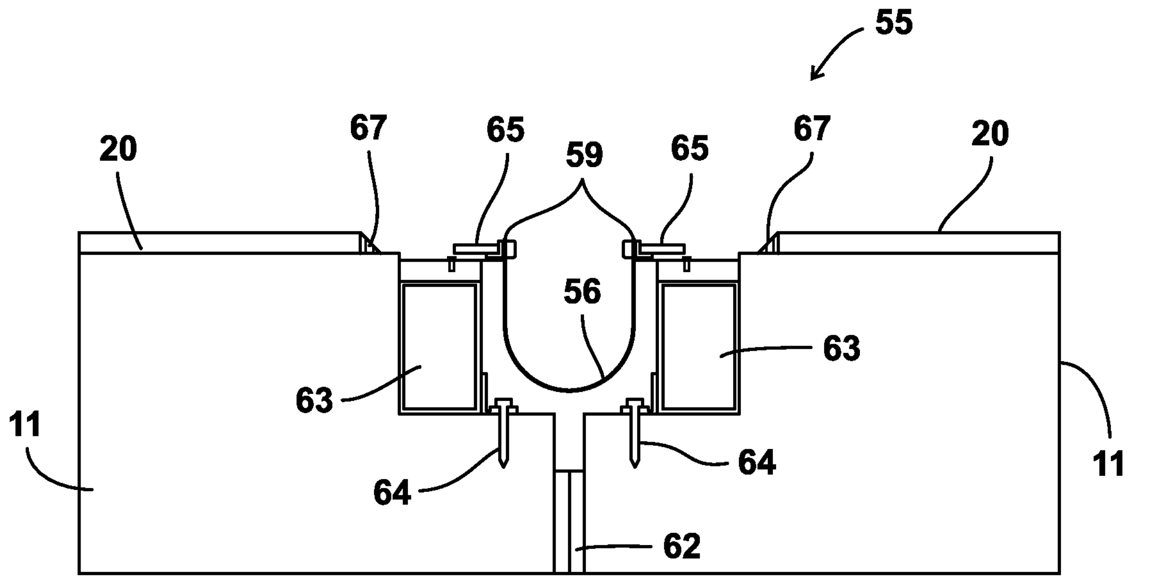
FIG. 32 is a fragmentary view that illustrates installation of a bellow joint at the interface of two precast concrete trough sections.
Figure 33:
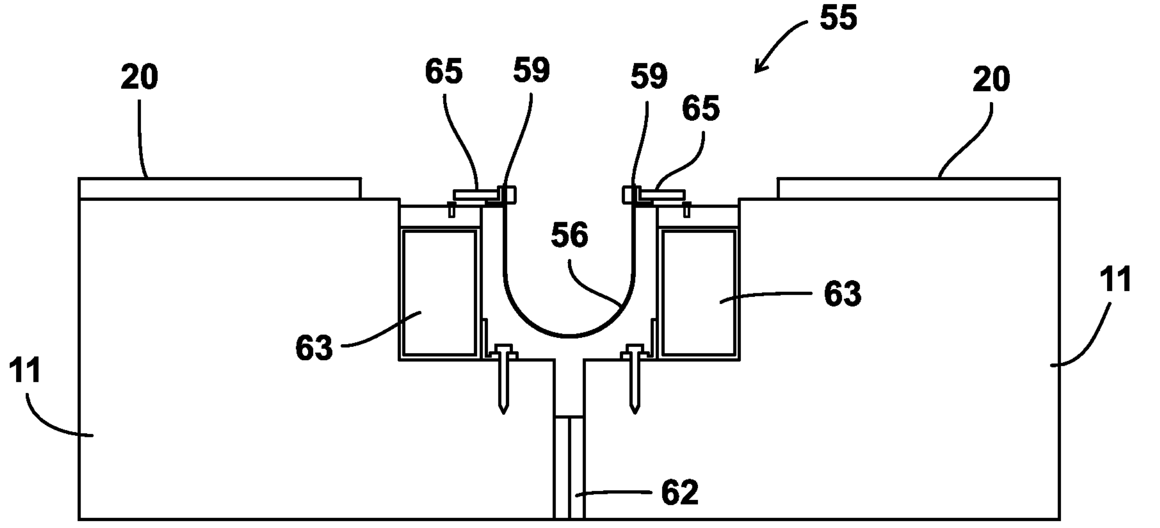
FIG. 33 is a fragmentary view that illustrates installation of a bellow joint at the interface of two precast concrete trough sections.
Figure 34:
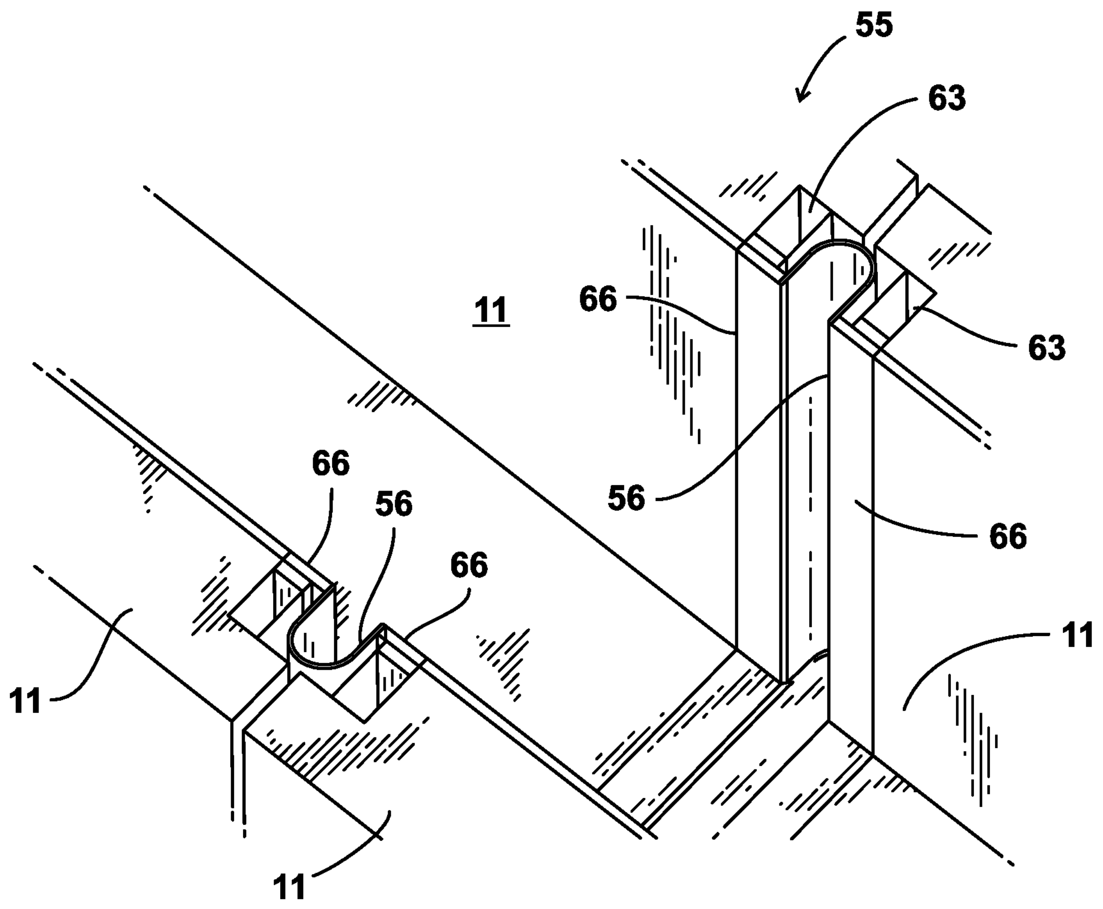
FIG. 34 is a fragmentary view that illustrates installation of a bellow joint at the interface of two precast concrete trough sections.

In FIGS. 30-41, the bellow joint 55 utilizes a bellow 56 having one curved section 57 and opposed flanges 58, each fitted with a steel angle beam 59. Fasteners 77 can be used to connect bellow flanges 58 to non-sag filler sections 76 as seen in FIGS. 30-31. Void space 60 at an end of section 11 (FIG. 26) is preferably fitted with galvanized tubing section 63 (FIG. 29). One or more seals 62 that are preferably a polyethylene extruded closed cell foam (e.g., Backer Rod such as SSI brand polyethylene extruded closed-cell foam backer rod, or other suitable material) are preferably placed in gap 61 as seen in FIGS. 26, 29, 31-33, 35, and 40-41. Seals 62 can be round or other suitable shape. Seals 62 can have compressible properties.

Figure 35:
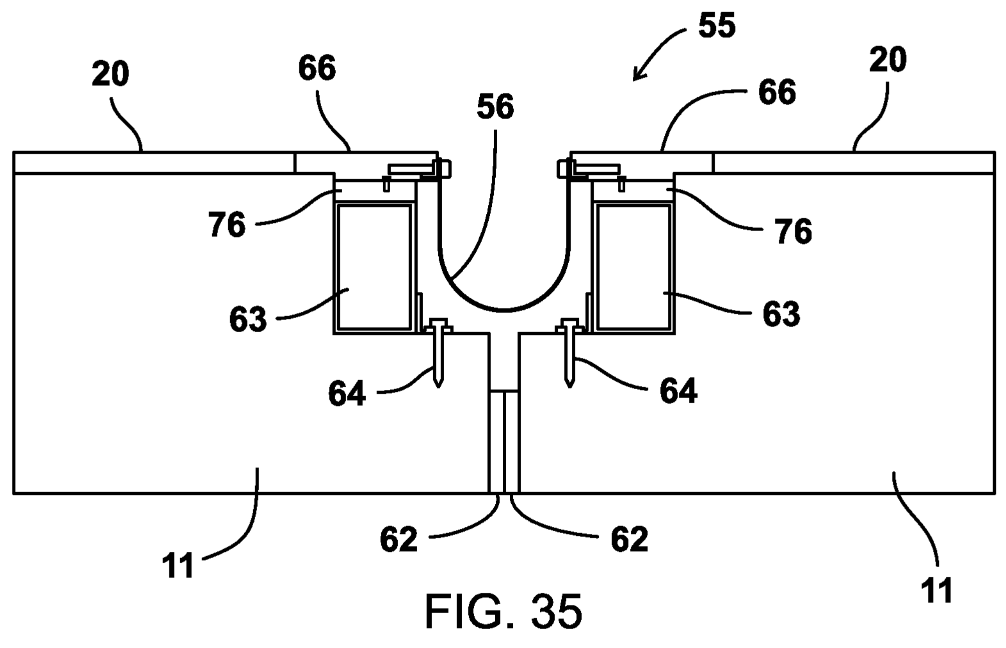
FIG. 35 is a fragmentary view that illustrates installation of a bellow joint at the interface of two precast concrete trough sections.
Figure 36:
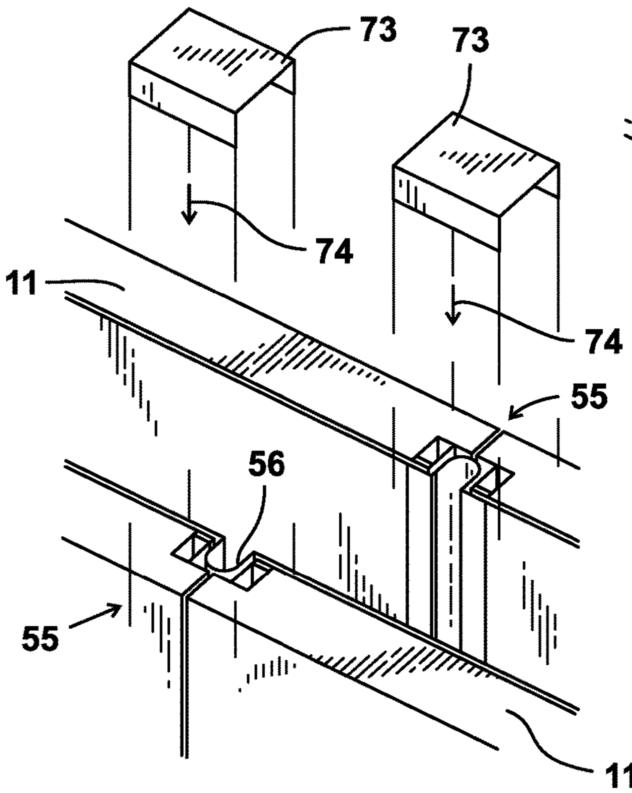
FIG. 36 is a fragmentary view that illustrates installation of a bellow joint at the interface of two precast concrete trough sections.
Figure 37:
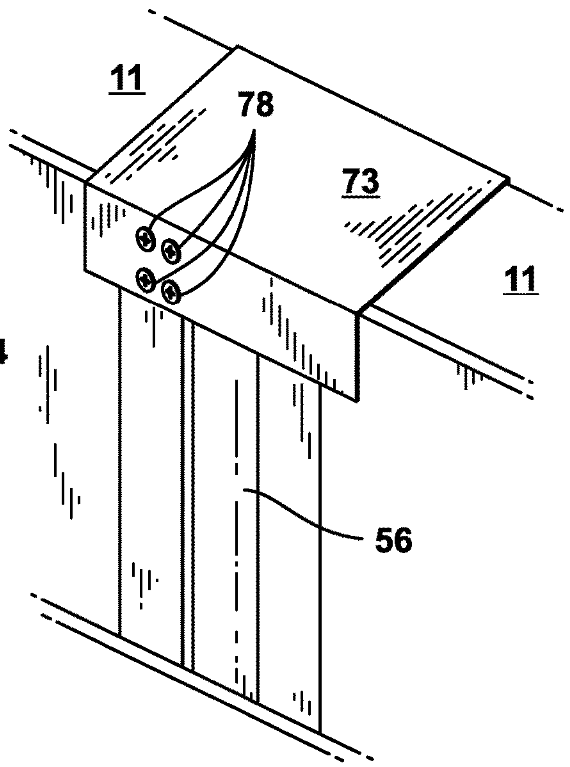
FIG. 37 is a fragmentary view that illustrates installation of a bellow joint at the interface of two precast concrete trough sections.
Figure 38:
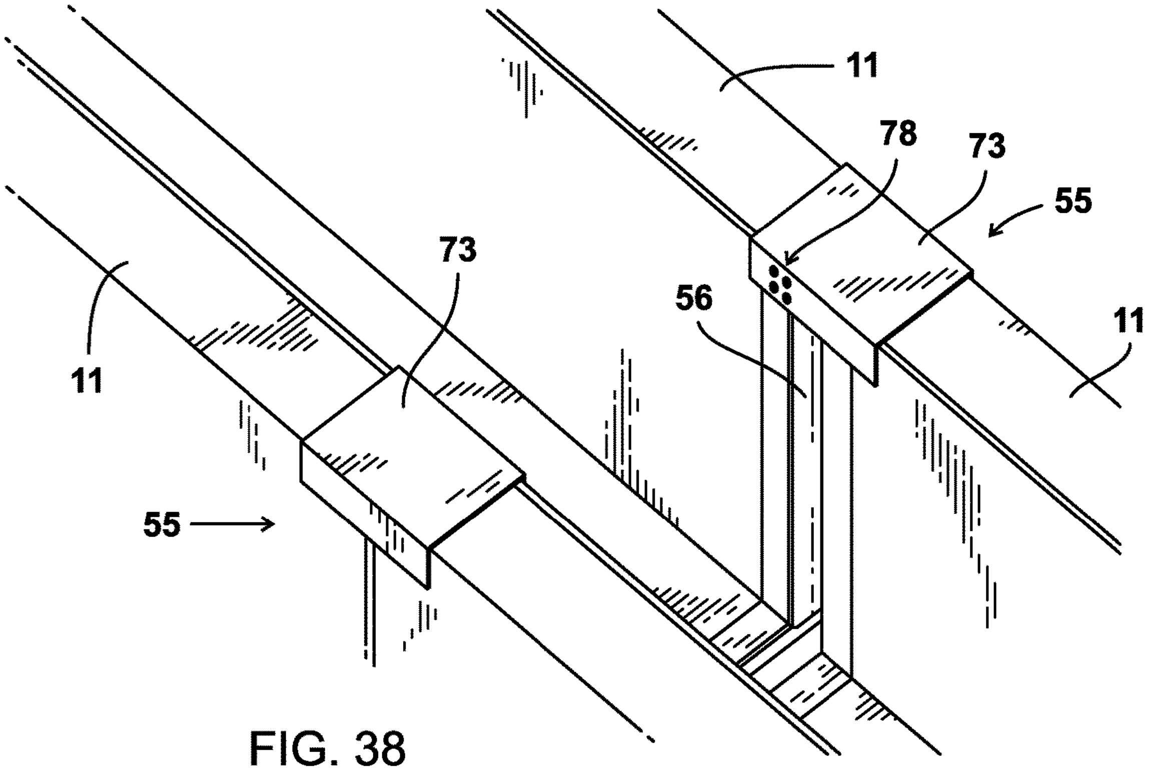
FIG. 38 is a fragmentary view that illustrates installation of a bellow joint at the interface of two precast concrete trough sections.

In FIGS. 32-41 anchor bolts or bolts 65 are preferably attached to angle beams 59 of bellows 56 before installation of non-sag filler 66 (e.g., commercially available under Insulpox name). Non-sag filler 66 is placed on top of bolts 65 and preferably filled until it is flush with the top of the adjacent panel 20, 21, 22, as seen in FIG. 35. Cover plates 73 can be used to cover joints 55, 55A (see FIGS. 36-39 and arrows 74). Bolts 78 can be used to secure plate 73.

Figure 43:
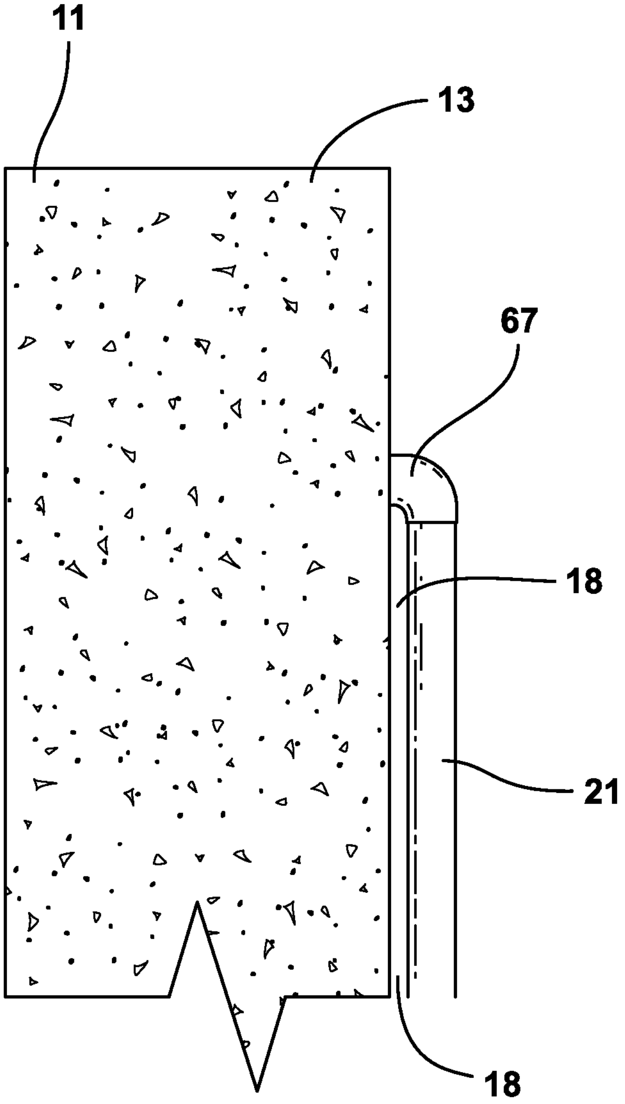
FIG. 43 is a fragmentary view of a preferred embodiment of the apparatus of the present invention showing a detail of the connection of a panel to a concrete trough or trench section.
Figure 44:
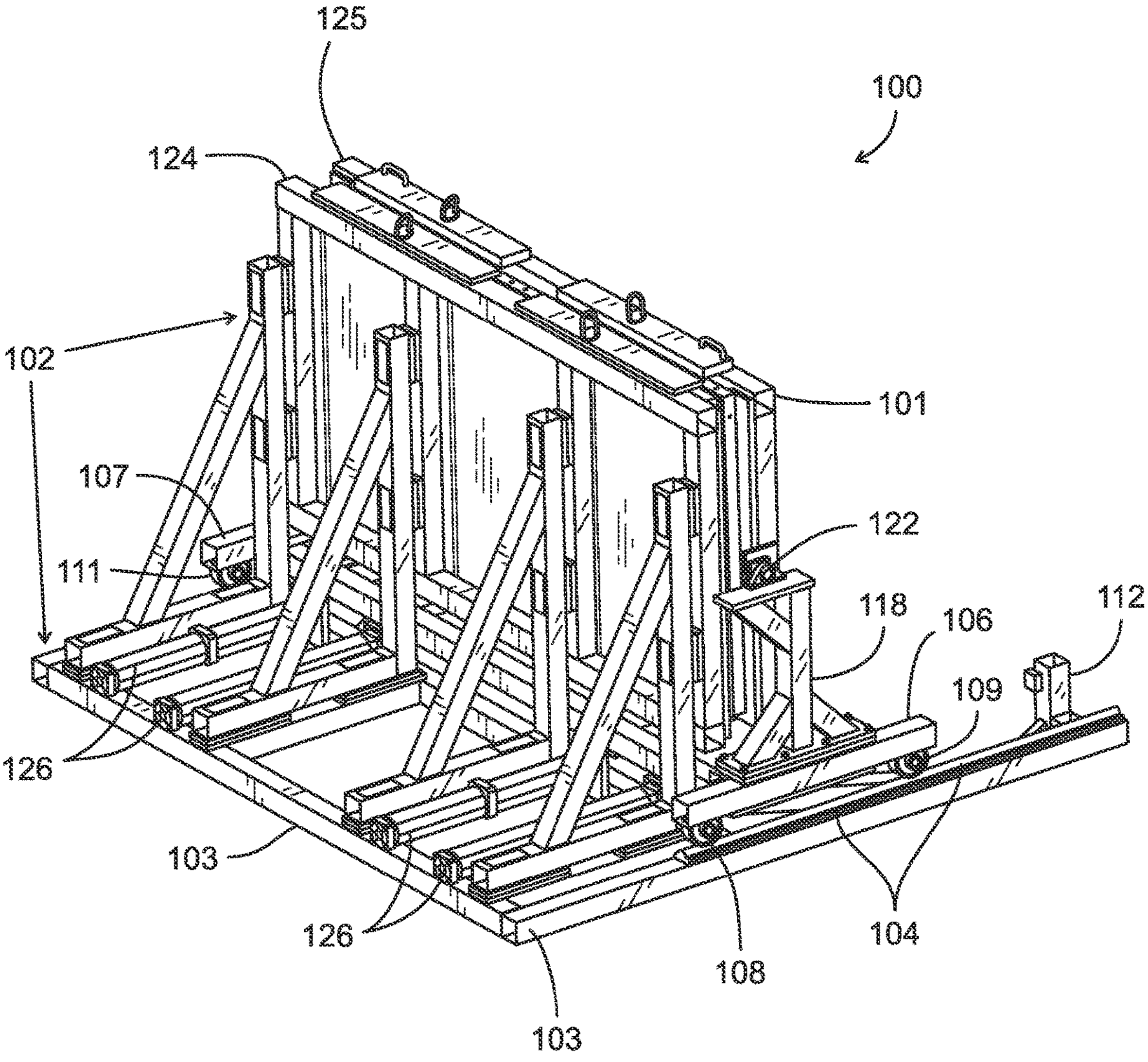
FIG. 44 is a perspective view of an alternate preferred embodiment of the method and apparatus of the present invention showing a mold in a closed position.
Figure 45:
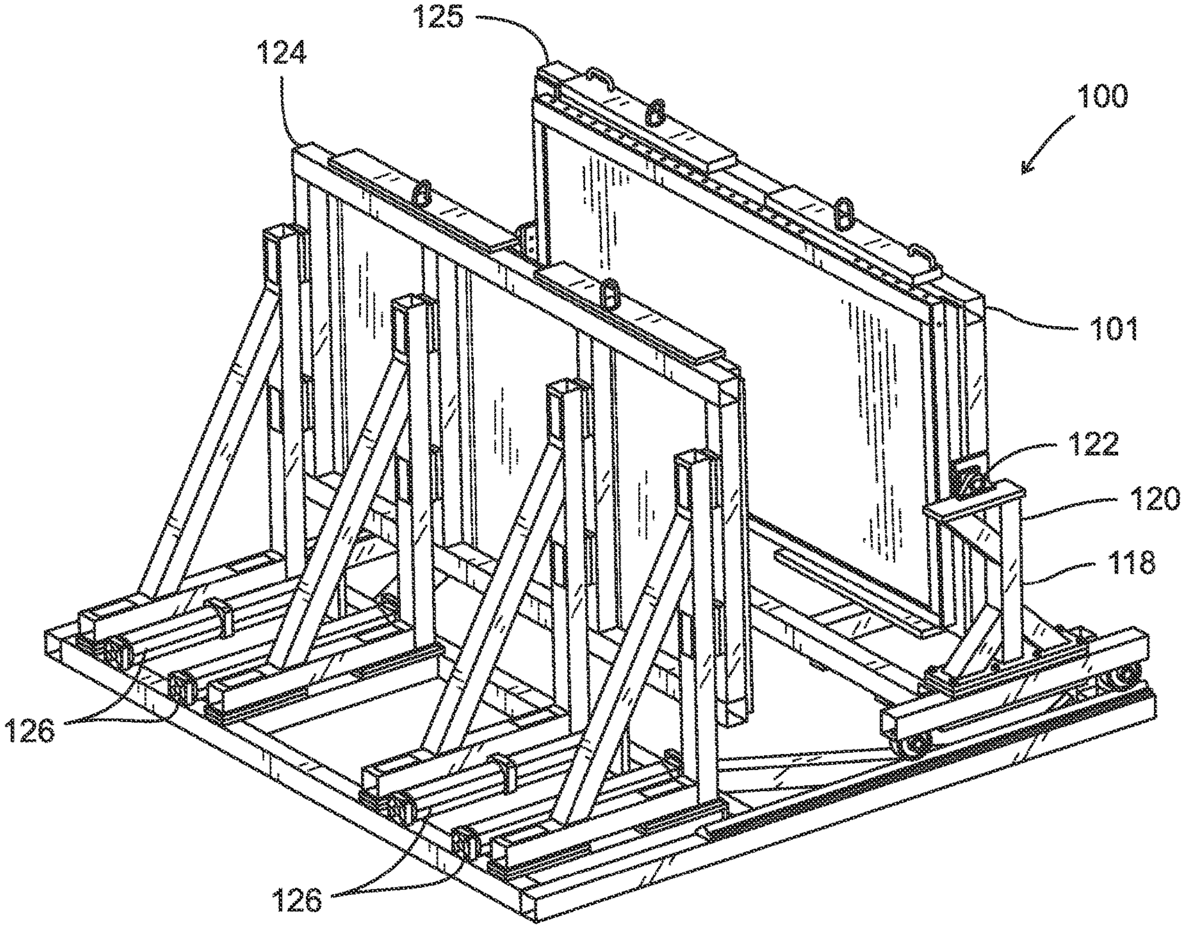
FIG. 45 is a perspective view of an alternative preferred embodiment of the method and apparatus of the present invention showing a mold in an extended position.
Figure 45A:
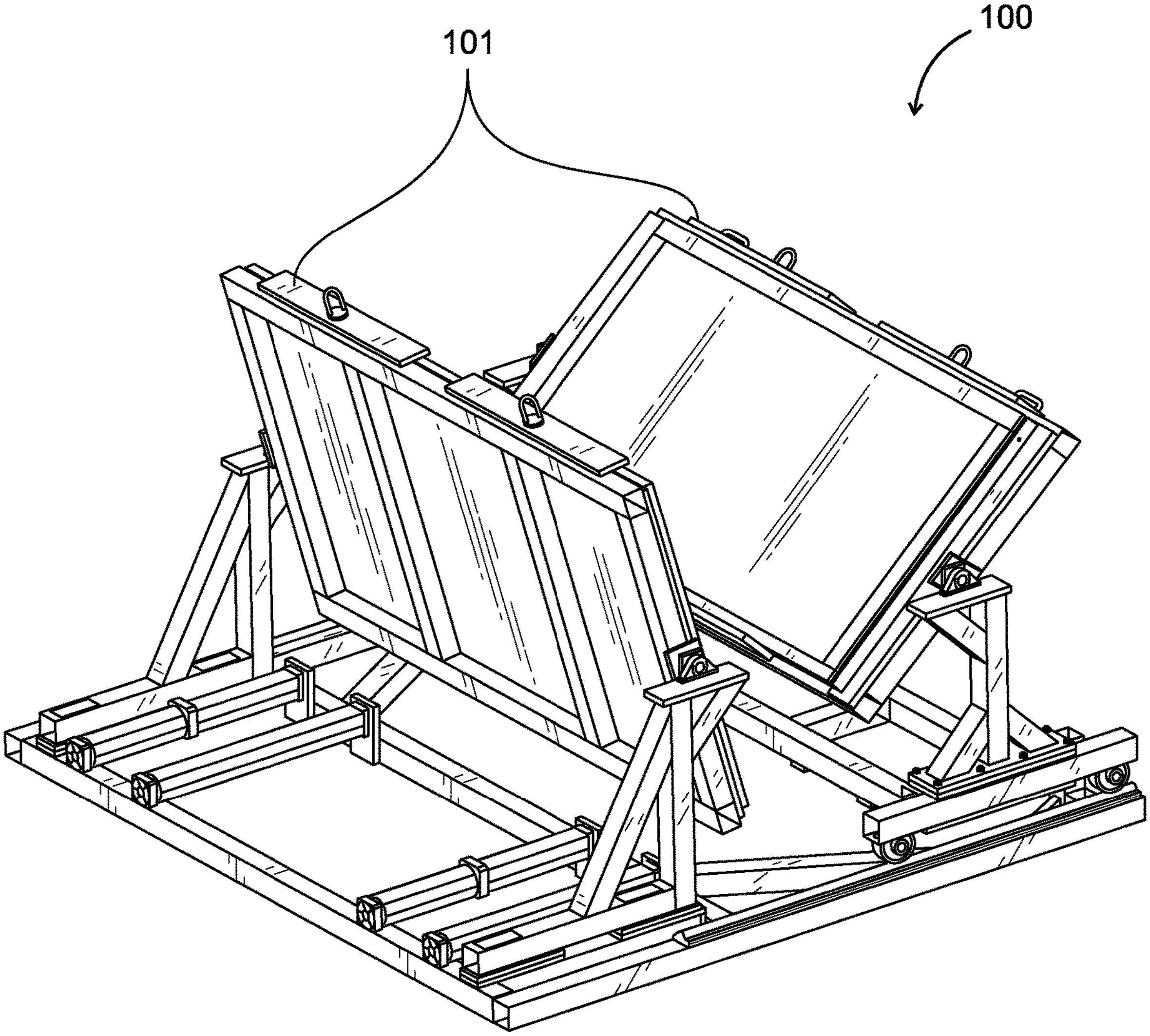
FIG. 45A is a perspective view of an alternative preferred embodiment of the method and apparatus of the present invention showing a mold in an extended, inclined position.

In FIG. 43, a detail of one embodiment of the assembly of a panel 21 to a trough section 11 wall 13 is seen. Panel 21 is shown adhered to wall 13 of section 11. Bonder paste or adhesive 18 is preferably in between panel 21 and wall 13. Non sag (e.g., Insulpox) nosing 67 is preferably applied to the top of panel 21 as shown.

1. General

The method and apparatus of the present invention repairs joints in the LNG trenches that exhibit signs of cracking. The repairs preferably bring the cryogenic lining system back into a structurally sound, yet flexible, watertight joint for the precast troughs that will withstand a minimum 10 minutes of exposure of Liquid Natural Gas.

Materials 3.1. Cryobond 837 Joint Overlay 3.2. Polyurethane Non-Sag Joint Sealant (such as Sikaflex 1A brand polyurethane elastomeric non-sag sealant)

3.3. Backer Rod (such as SSI brand polyethylene extruded closed-cell foam backer rod)

3.4. Engineered Fabric Cloth (such as an engineering fabric or polymeric mesh material, such as ITW Engineered Polymers Type Y-4"-Crack Repair Tape or Carlisle Coatings & Waterproofing Incorporated brand DCH Reinforcing Fabric cloth)

3.5. Solvent Cleaner (such as xylene solvent cleaner)

In one embodiment, layers can be as follows: first 3.3, then 3.2 (preferably not cryogen), then preferably two layers engineered fabric cloth 3.4 with 3.1, then 3.5.

Recommended Installation Sequencing 4.1. Measure, locate and mark for joint line allowing an area of a minimum 3" of width over centerline of this joint. If crack varies in width or spread, surface shall be prepared 1½" past crack on furthest extent, each side.

4.2. Mechanically abrade full vertical and horizontal surface of liner for the minimum 3" wide strip.

4.3. Vacuum, wipe and clean prepared surface to remove dust, dirt, debris.

4.4. If joint or crack is more than ½" wide install backer rod into opening to a depth of ½" of the width.

4.5. Install Polyurethane sealant into the joint flush to the InsulPOX liner outermost face surface.

4.6. Mix in accordance with manufacturer's data sheet.

4.7 Apply basecoat of Cryobond 837 at 20 mils, embed minimum 3" wide engineered fabric into basecoat and saturate, preferably by applying more of Cryobond 837.

4.8. Apply topcoat of Cryobond 837 at 20 mils thickness over the basecoat.

4.9. After curing, the joint system repair is now complete.

The outside of the concrete sections 11 can be sealed with a watertight system, such as Emshield WFR2 System, EMSHIELD® sold by EmShield Joint Systems.

As an alternate method of applying an insulative layer to the concrete trough 11 (instead of using panels 20, 21, 22), a cryogenic insulating material can be applied or sprayed on the concrete walls 12, 13, 14. The method can thus include spray applying of a polymeric concrete material to the precast trenches/troughs 11 for the purposes of cryogen protection/LNG containment. The material to be applied/sprayed can be, for example, a product from Carboline Company sold as Carbotherm 730 or can be, for example, a cryogenic grade insulating polymer concrete material/non-sag sealer, such as, for example, commercially available from Chemco Systems of Redwood City, California sold under the trademark InsulPOX.

The Carbotherm 730 product can be sprayed on the trough bottom wall 12 and side walls 13, 14 of the concrete trough 11. The cryogenic insulating layer can be about ⅛ inch-2 inches thick, more preferably ¼ inch-½ inch thick. The cryogenic insulating layer is preferably at least ⅛ inch thick; more preferably at least ¼ inch thick; even more preferably at least ½ inch thick. The joint systems previously described (embodiments of FIGS. 1-43) can be used in this alternate method to join one precast concrete section 11 to another precast concrete section 11 wherein application of cryogen protection is by spraying of a material (e.g., Carbotherm 730) instead of using precast panels.

The following is a preferred procedure in using a spray material, e.g. Carbotherm 730, on a joint:

1.1. If necessary, mechanically abrade full vertical and horizontal surface along either side of joint.

1.2. Vacuum, wipe and clean prepared surface to remove dust, dirt, debris.

1.3 Secure overlay material to either side or joint.

1.4 Apply cryogenic insulation material in the same sprayable manner as used on all vertical and horizontal concrete surfaces. Multiple passes may be necessary to ensure proper millage.

1.5. Joints overlay material can be sprayed simultaneously with the adjoining surfaces.

1.6. After curing, the joint system repair is now complete.

An alternative method of making panels 20, 21, 22, preferably made of cryogenic insulating material, can be by a pump and mold process as seen in FIGS. 44-59. Panels 20, 21, 22 can be thermoset polymer panels. An alternative material for the panels 20, 21, 22 can be, for example, Materia HPR Resin (DCPD) and Proxima CT Catalyst. Data sheets for Materia® Catalyst Suspension manufactured by Materia, Inc. (a suspension of ring-opening metathesis polymerization catalyst(s) in a carrier oil for use as a curative with Proxima® resins) and Proxima® HPR 2102 manufactured by Materia, Inc. (resin for use with Proxima® CT catalysts to make thermoset polymers) are attached herewith and incorporated herein by reference.

Proxima resins can be two-part thermosetting systems preferably comprising a liquid-based monomer mixture (Part A) and liquid-based catalyst hardener (Part B). The monomers can be preferably comprised of a family of norbornenes such as dicyclopentadiene (DCPD).

Proxima resins are not epoxies or polyurethanes; they belong to a class of thermoset resins called Thermoset Polyolefins.

SUMMARY

A Materia HPR Resin (DCPD) and Proxima CT Catalyst panel system can be a three-component system that preferably uses ceramic glass microsphere filler to provide both superior toughness performance and long-term weather resistance. The thermoset polymer panel can be used for exterior LNG applications such as trenches, sumps, etc. Thermoset panels can be made using a pump and mold system 100 (also referred to herein sometimes as molding apparatus 100) as seen in FIGS. 44-59 to ensure a high quality and dependable product is manufactured while experiencing recognized efficiencies through a rapid curing process. Thermoset polymer panels can offer a long-life cycle for cryogenic applications due to their excellent thermal insulative properties to go along with resistance to degradation in cured material from exposure to weather cycling and any repeated thermal shock.

Mixing/Molding/Curing:

Materia HPR Resin (DCPD) and Proxima CT Catalyst can be supplied in drums, e.g., preferably in 55 gallon steel drums, and can be nitrogen blanketed from manufacture. The recommended storage temperatures are about 50-100 degrees F. for the resin and the catalyst, and the resin and the catalyst can be stored in an air-conditioned room. If long term storage of the catalyst is required, then storage can be in a refrigerator or freezer to improve shelf life. Open containers should be blanketed with an inert gas (e.g., Nitrogen or Argon) to prevent contamination from air and moisture.

The resin system is classified as a flammable liquid and thus storage and handling precautions should be taken to reduce the risk of fire such as: (1) blanketing vessel head-spaces with an inert gas, e.g., nitrogen; (2) ensuring ALL vessels are grounded to prevent static electricity dissipation; and (3) maintaining adequate ventilation to prevent the build-up of vapors. These are examples of some of the basic precautions.

In one preferred embodiment, the present invention preferably uses a formulation that can be based on an HPR Resin and Proxima CT Catalyst system with glass microspheres added as a filler. These components can be mixed in a vacuum-rated vessel with an agitator using a batch process to ensure the manufacturing and quality demand of the panels.

Resin can be added to the vessel, then the microspheres can be added under very low agitation. Once the glass microspheres have been added, the vessel can be put under vacuum and de-gassed concurrently with agitation to thoroughly mix the materials and preferably remove entrained air bubbles. Once the materials are uniformly mixed, pressure can be introduced preferably using nitrogen to supply material with minimal entrained air to the meter/mix/dispense machine. The meter/mix/dispense system can be fed by the mix vessel for the HPR Resin, and Proxima CT Catalyst can be added to the tank located on the machine, which can also be pressurized. The meter/mix/dispense machine can supply mixed material on demand.

Figure 50:
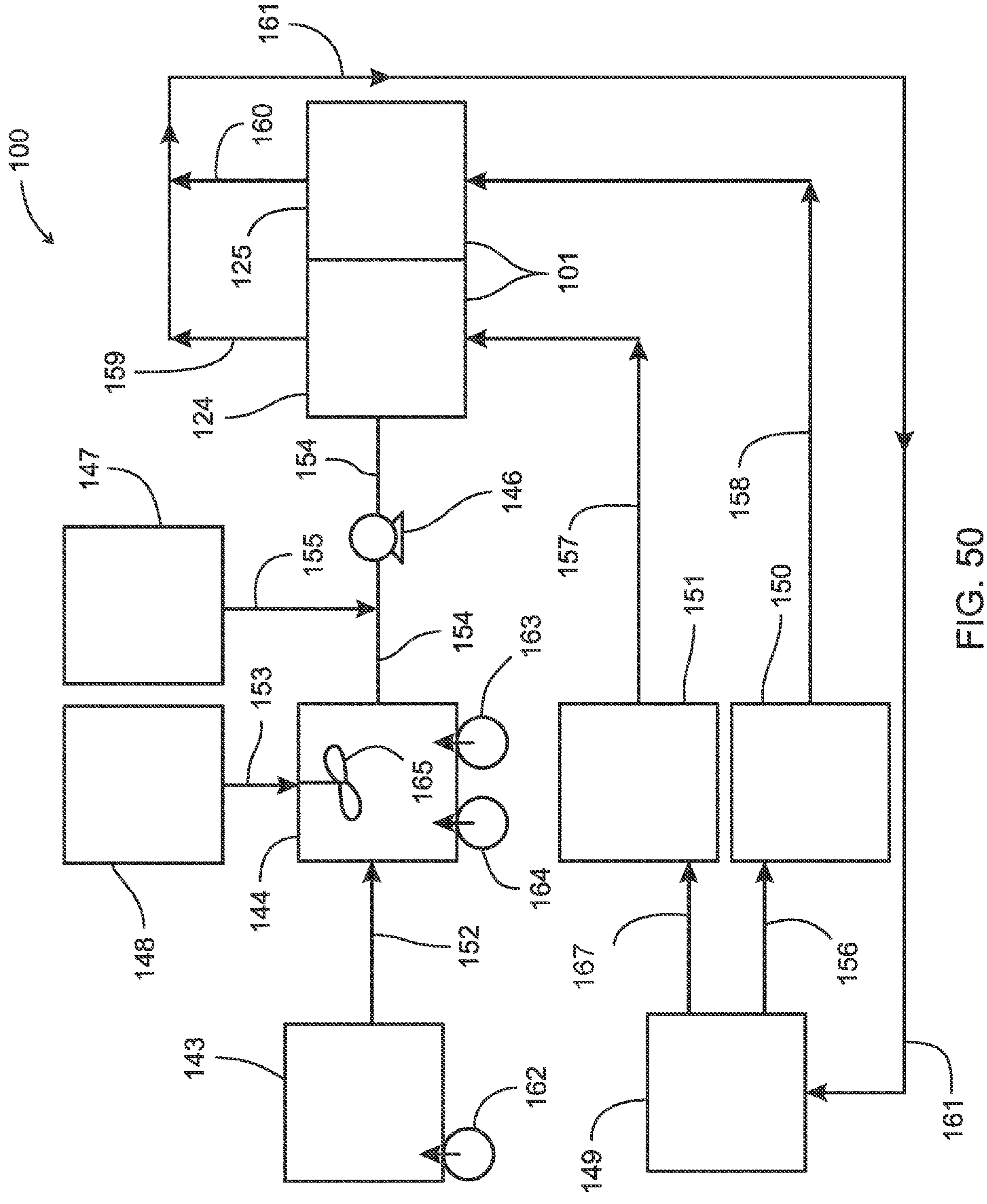
FIG. 50 is a flow chart for the alternate embodiment of FIGS. 44-49.
Figure 51:
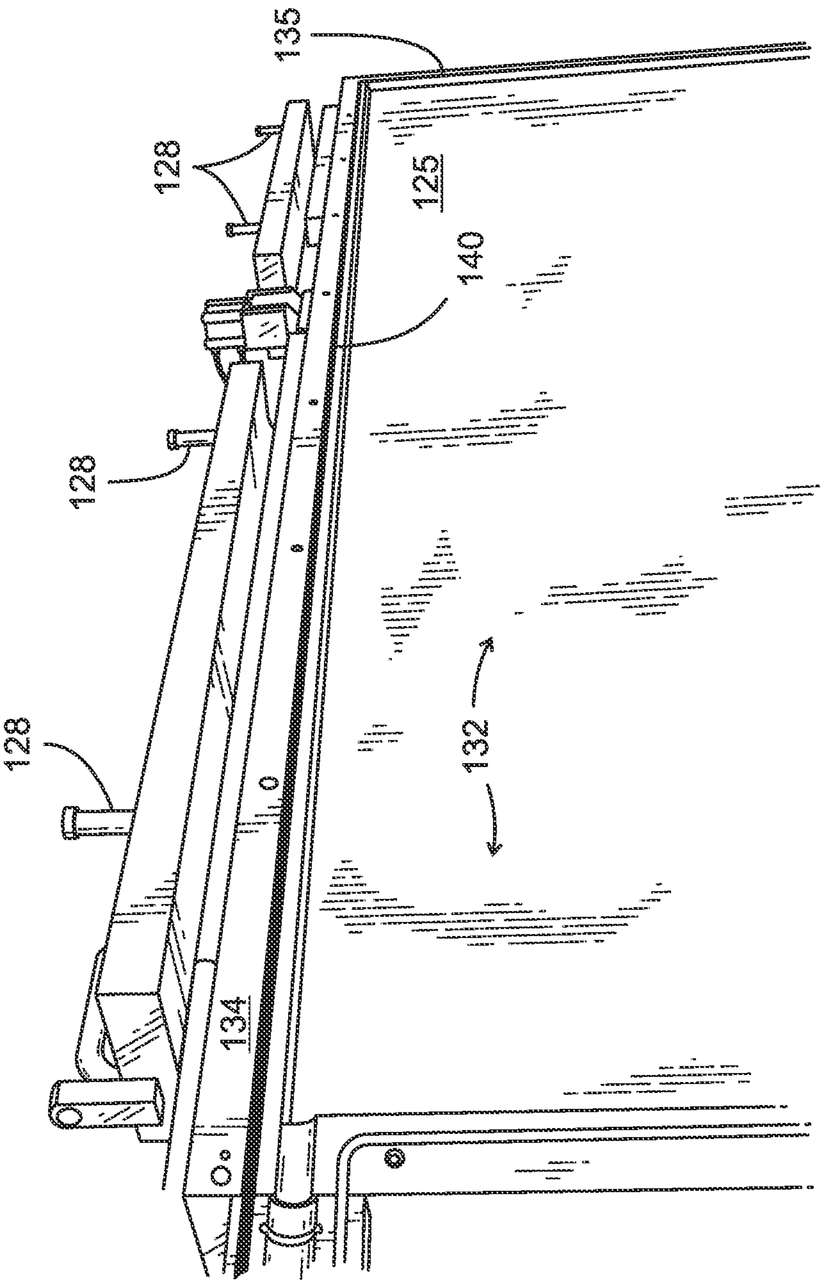
FIG. 51 is a fragmentary view of the alternate embodiment of FIGS. 44-49.
Figure 52:
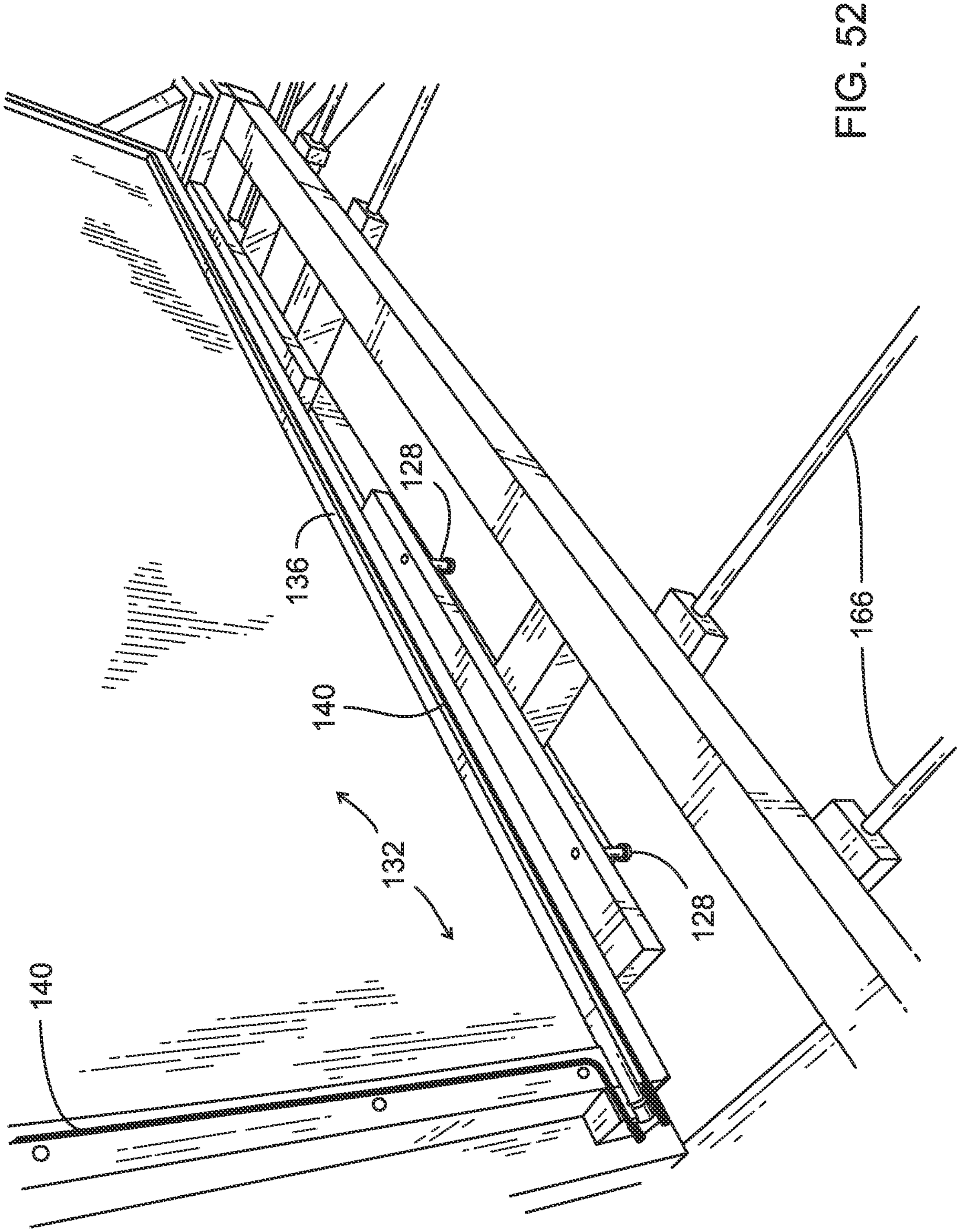
FIG. 52 is a fragmentary view of the alternate embodiment of FIGS. 44-49.
Figure 53:
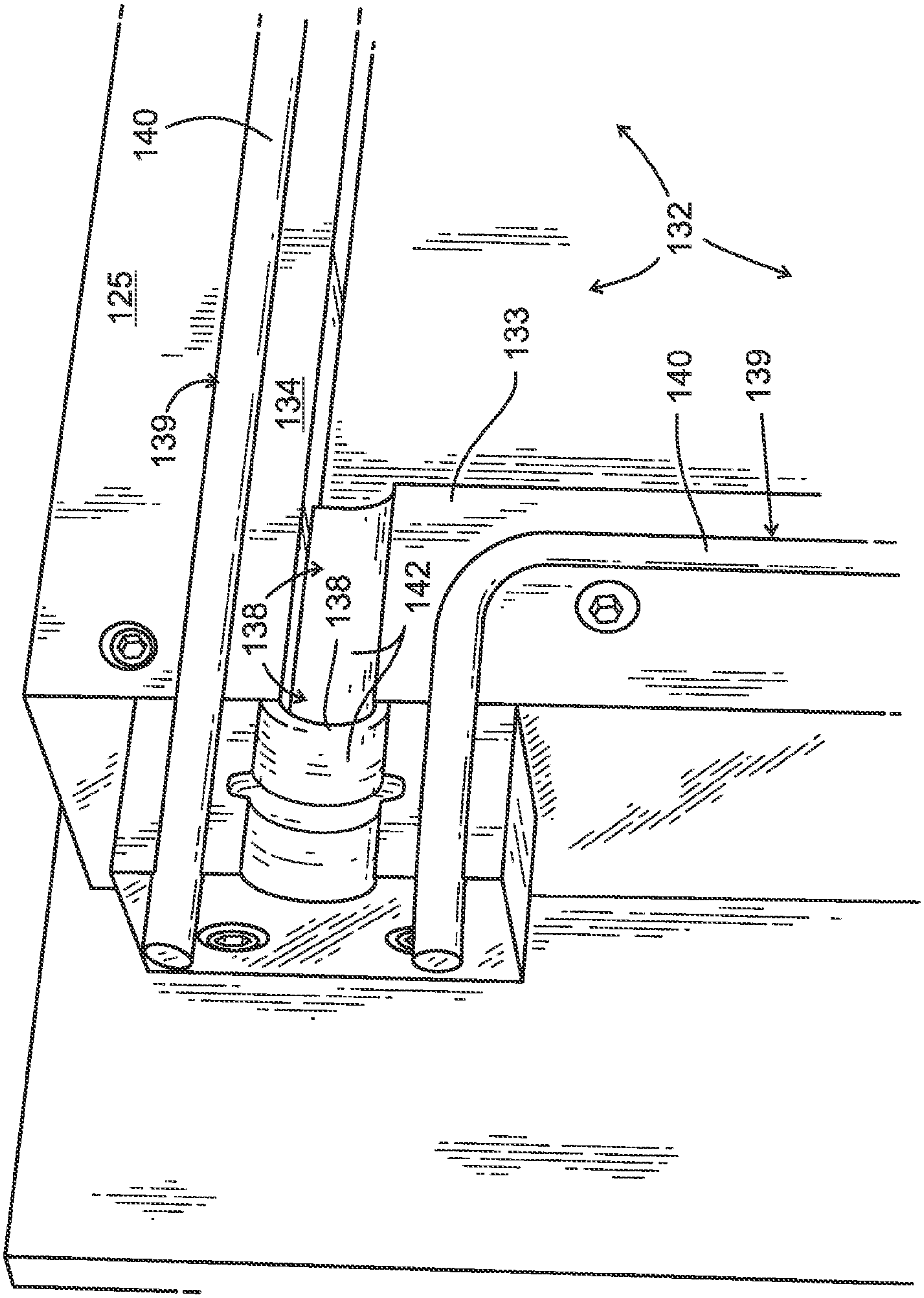
FIG. 53 is a fragmentary view of the alternate embodiment of FIGS. 44-49.
Figure 54:
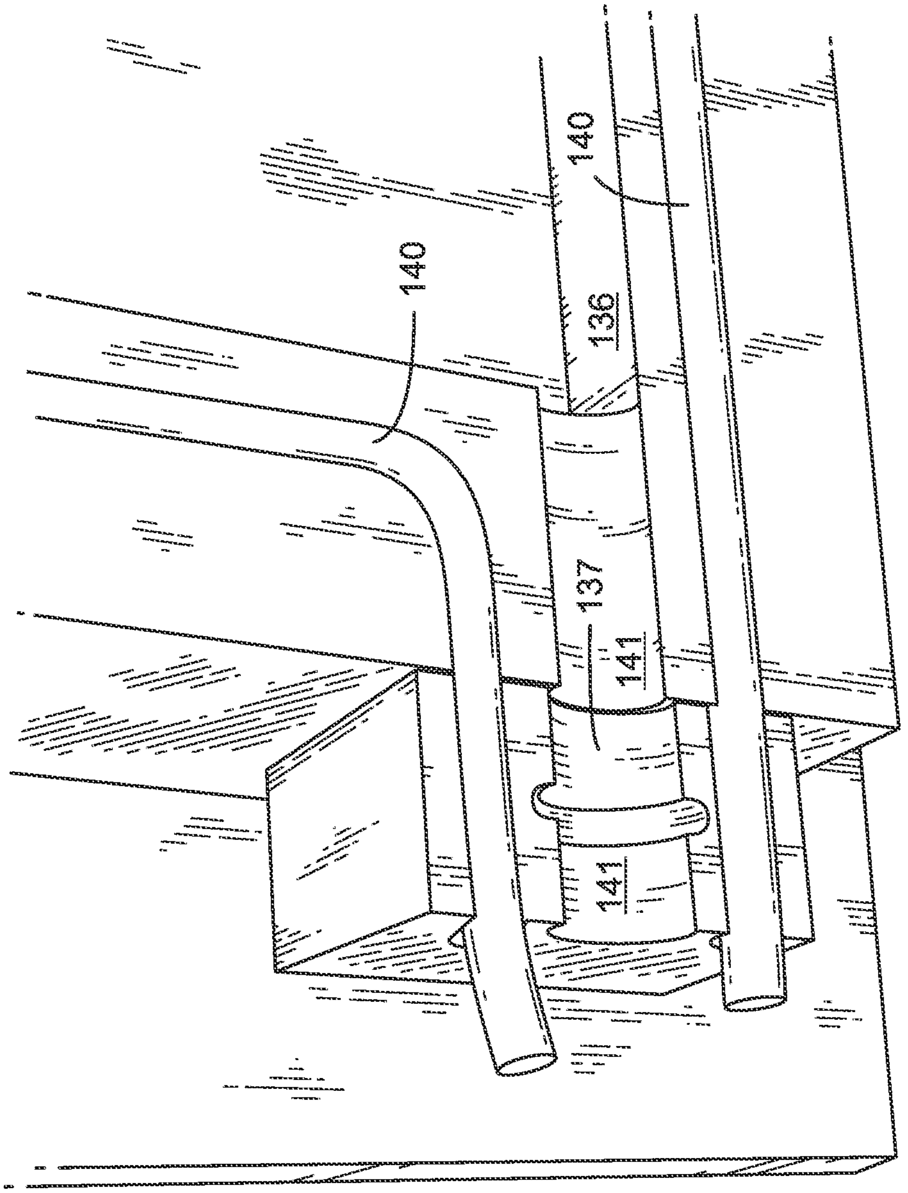
FIG. 54 is a fragmentary view of the alternate embodiment of FIGS. 44-49.
Figure 55:
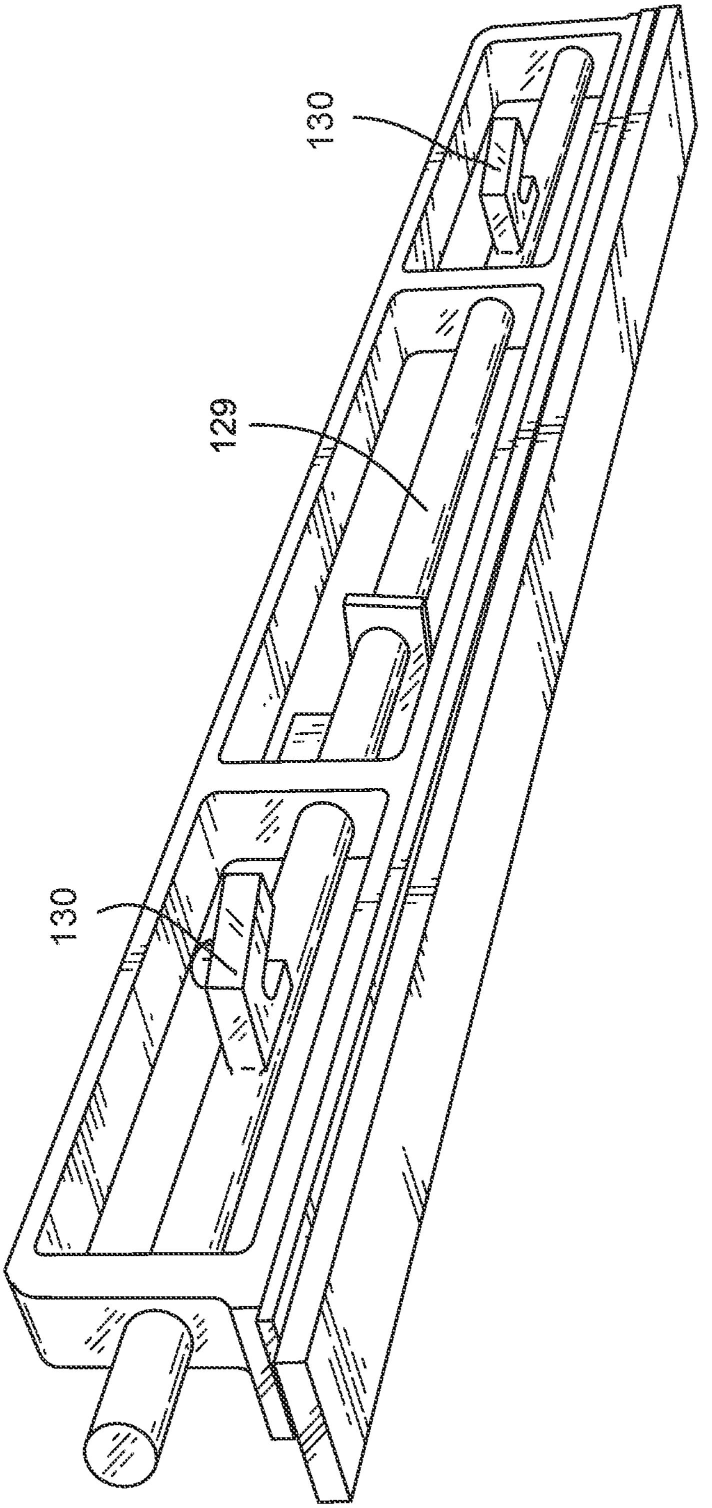
FIG. 55 is a fragmentary view of the alternate embodiment of FIGS. 44-49.
Figure 56:
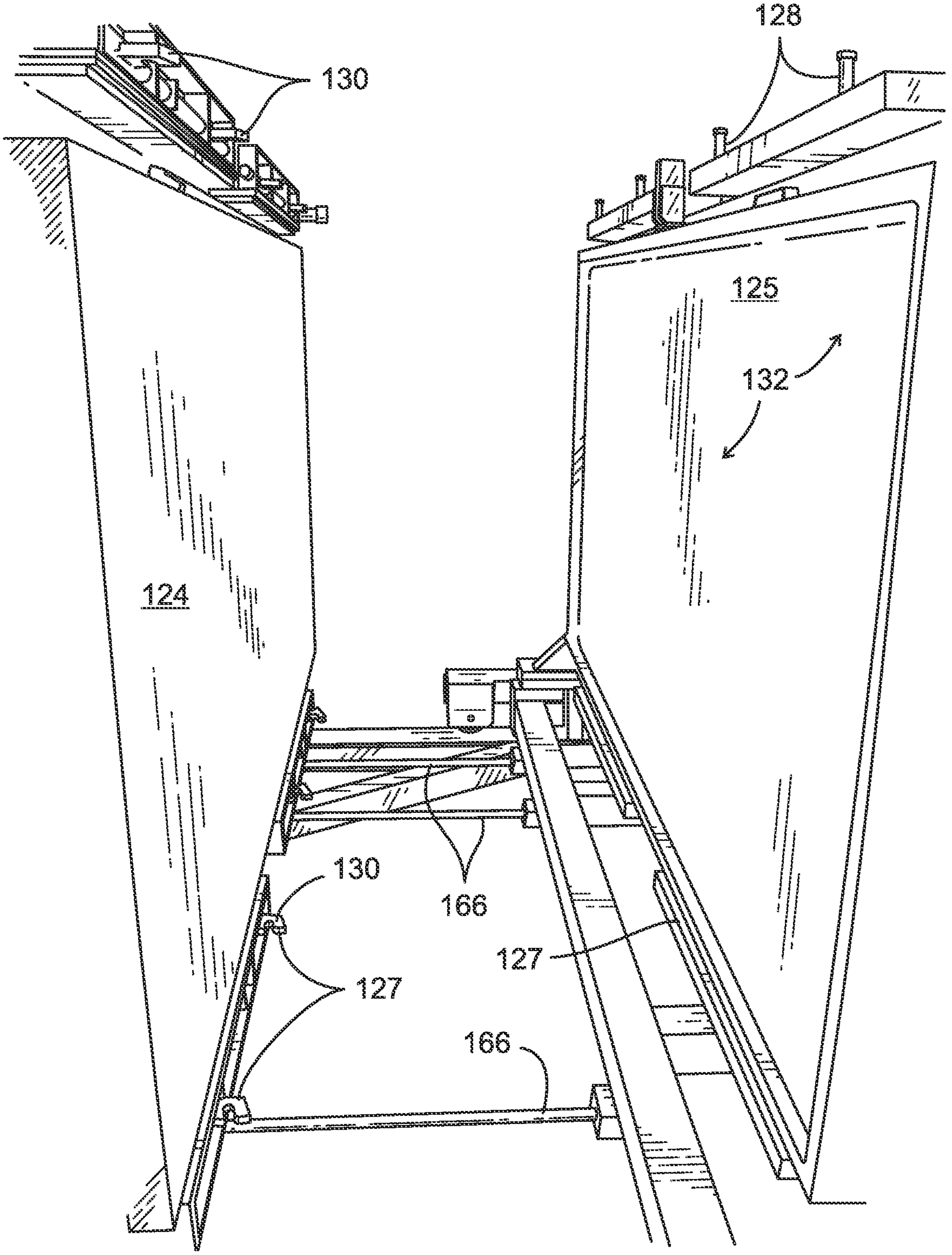
FIG. 56 is a fragmentary view of the alternate embodiment of FIGS. 44-49.
Figure 57:
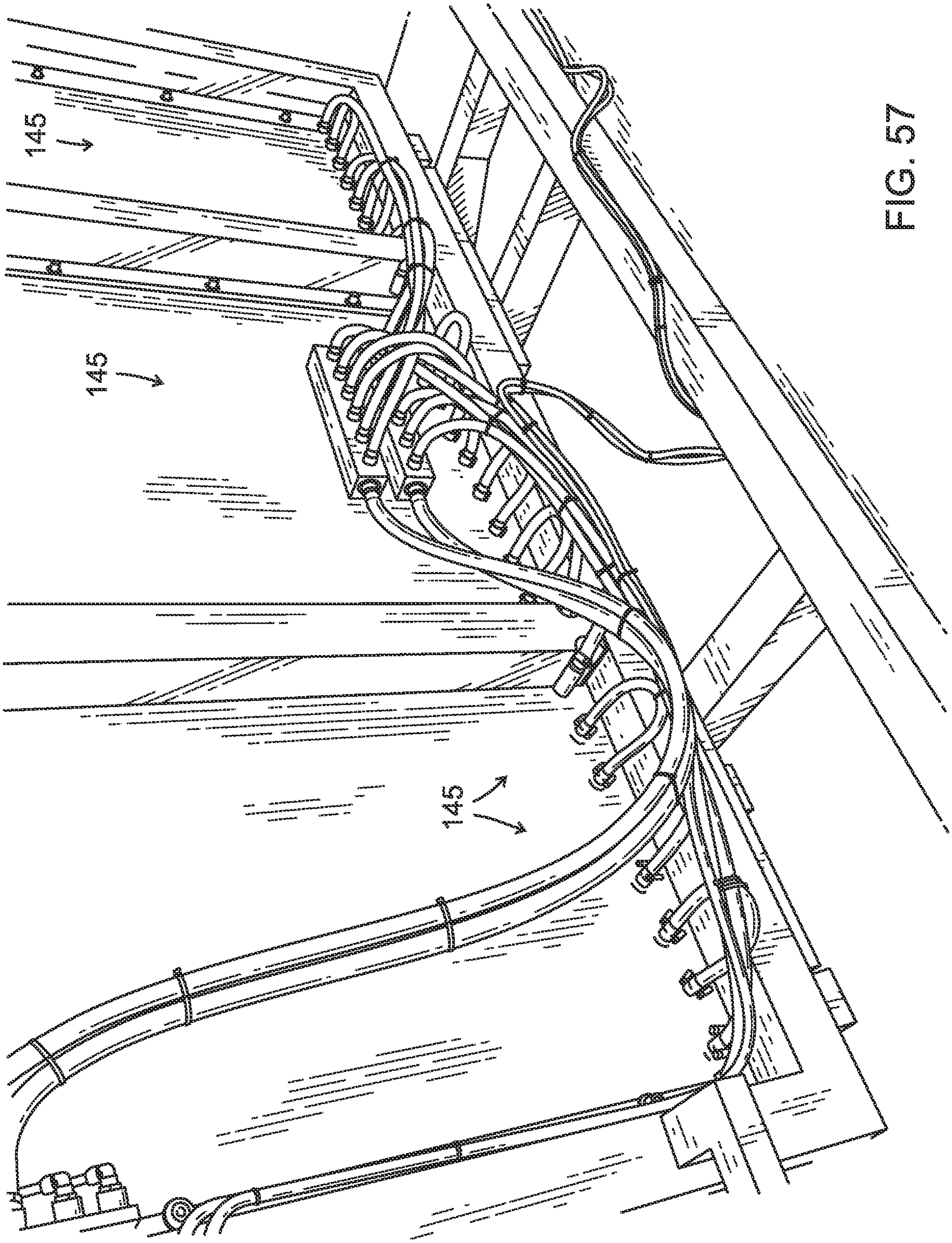
FIG. 57 is a fragmentary view of the alternate embodiment of FIGS. 44-49.
Figure 58:
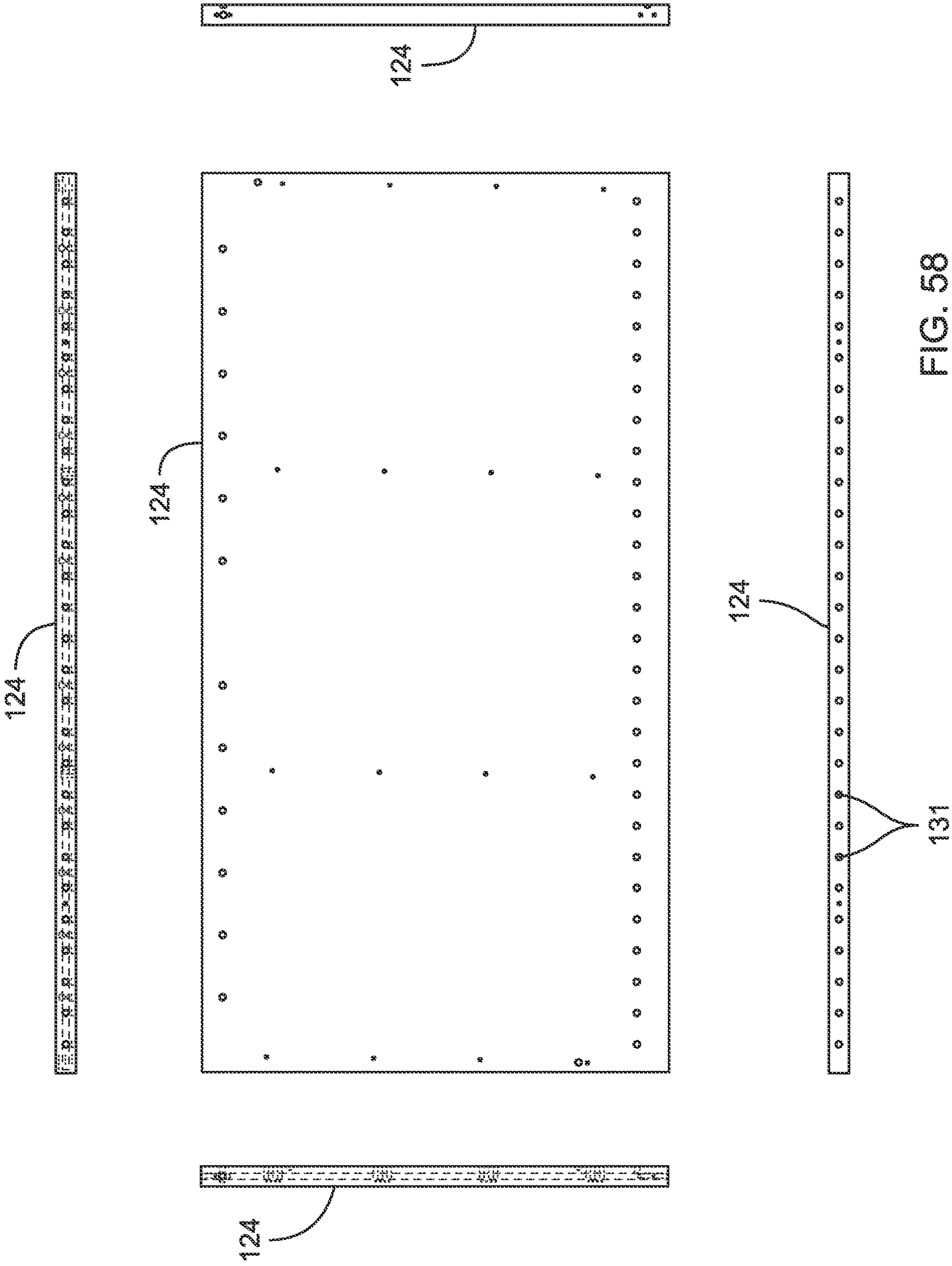
FIG. 58 is a fragmentary view of the alternate embodiment of FIGS. 44-57 showing internal water courses or flow channels.
Figure 59:
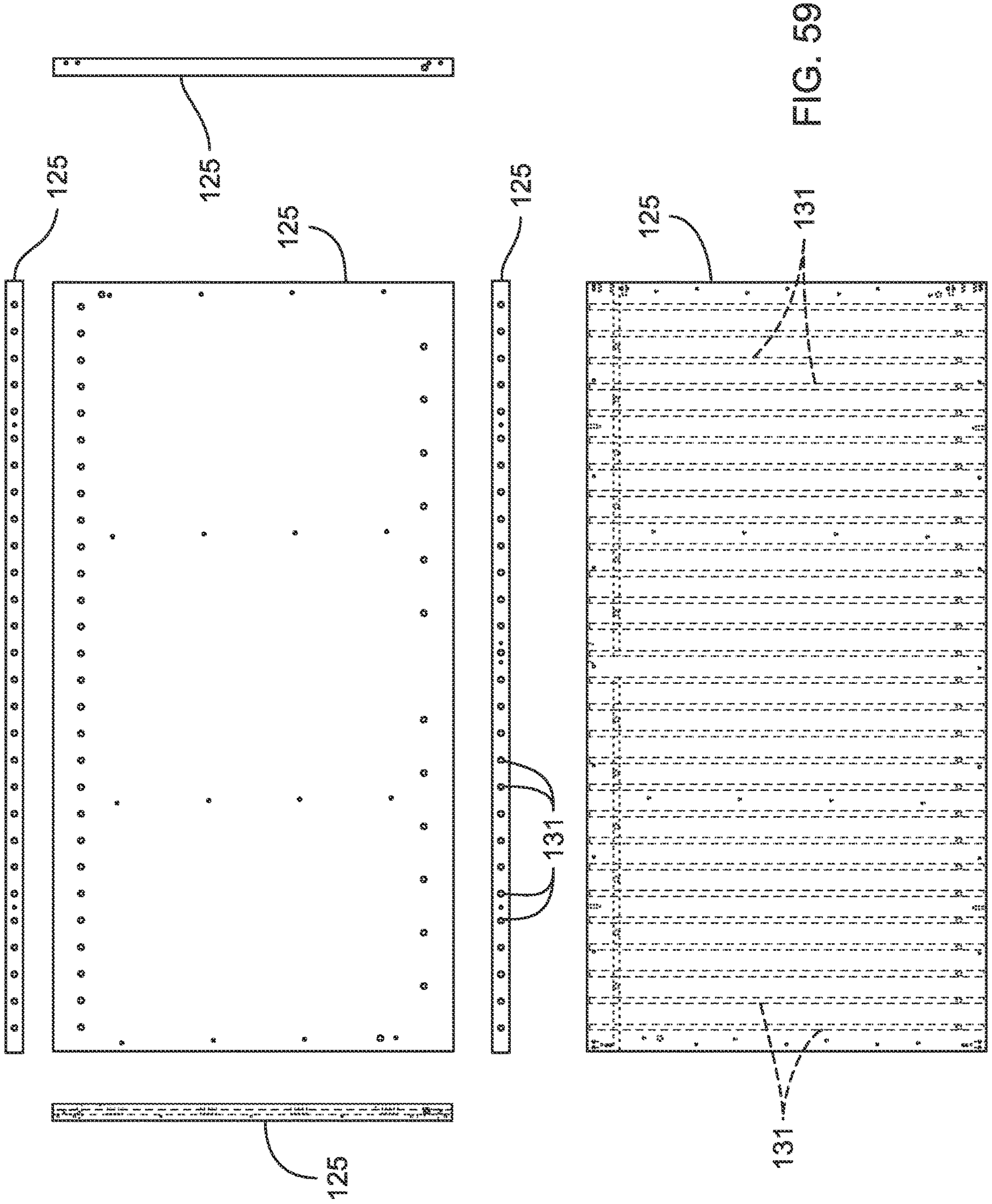
FIG. 59 is a fragmentary view of the alternate embodiment of FIGS. 44-57 showing internal water courses or flow channels.

FIG. 50 provides a flow chart for an alternative preferred embodiment of the present invention, designated generally by the numeral 100. Molding apparatus 100 provides mold or mold tool 101 having separable mold sections 124, 125. Resin can be pumped, vacuumed or gravity fed from resin bulk storage tank 143 to day tank 144 via flow line 152. Flow line 152 can be provided with a valve to control flow in line 152. Tank 143 can be blanketed with nitrogen, or another inert gas, using gas injection or nitrogen injection 162. Tank 144 can have mixer 165 for mixing resin and microspheres 148 (commercially available) that are added to tank 144 via flow line or inlet fitting 153. Vacuum pump 164 can be used to pull resin from tank 143 to tank 144. Tank 144 can be blanketed with nitrogen, or another inert gas, using gas injection or nitrogen injection 163 as a safety precaution against fire. Flow line 155 can be provided to add catalyst 147 to the resin/microsphere mixture in pump 146, which be a positive displacement pump. Flow line 154 can transmit the resin and glass microsphere/catalyst mixture to mold 101 using pump 146, which can be a positive displacement pump.

Each mold section 124, 125 can be temperature controlled. A fluid (e.g., water) is contained in tank 149. Water or fluid from tank 149 can be chilled to a selected temperature by flowing in line 167 to chiller 151 and then in line 157 to a selected mold section such as mold section 124. Water or fluid exiting tank 149 via flow line 156 can be heated with a heat exchanger, heater or thermolator 150. Heated water or fluid can flow in line 158 to mold section 125. Water or fluid exiting mold sections 124, 125 can return to tank 149 via flow lines 159, 160, 161. Each mold section 124, 125 preferably has a water channel or channels that can receive water that has a desired temperature. As an example, one mold section can receive colder water while the other mold section can receive hotter water.

Mixing of the formulated resin and a catalyst curative can be achieved before finally being fed via a respective hose or flow line to the mold 101. Panels 20, 21, 22 can cure in mold 101 rapidly through an exothermic curing reaction allowing them to reach published flexural and compressive strength quickly.

A preferred embodiment of a molding tool 101 is seen in FIGS. 44-59. Molding tool 101 for panel production can be constructed of machined aluminum preferably with temperature control (e.g., water cooling or heating) on both sides ensuring a controlled and reproducible curing process resulting in a high-quality product. Upon curing, a panel 20, 21, 22 can be removed from the tooling, handled, and installed as needed.

In FIGS. 44-49, molding apparatus 100 has a frame 102 (e.g., welded metal) with base 103. Base 103 can be generally rectangular and comprised of multiple beams 168, which preferably are aluminum beams, welded together. Frame 102 supports molding tool 101 comprised of separable mold sections 124, 125. Frame 102 preferably has spaced apart rails 104, 105. Each rail 104, 105 provides a runway or track for enabling movement of wheeled carriages 106, 107 between the closed position of FIG. 44 (wherein the mold sections 124, 125 abut) and the open positions of FIGS. 45 and 48 wherein mold sections 124, 125 are spaced apart.

Each carriage 106, 107 can be wheeled. In one embodiment, carriages 106, 107 are each preferably fitted with two (2) wheels or casters. Carriage 106 can have wheels or casters 108, 109. Carriage 107 can have wheels or casters 110, 111. Stops 112, 113 can limit movement of carriages 106, 107 as the carriages 106, 107 reach the fully open positions of FIGS. 46 and 47.

Figure 47:
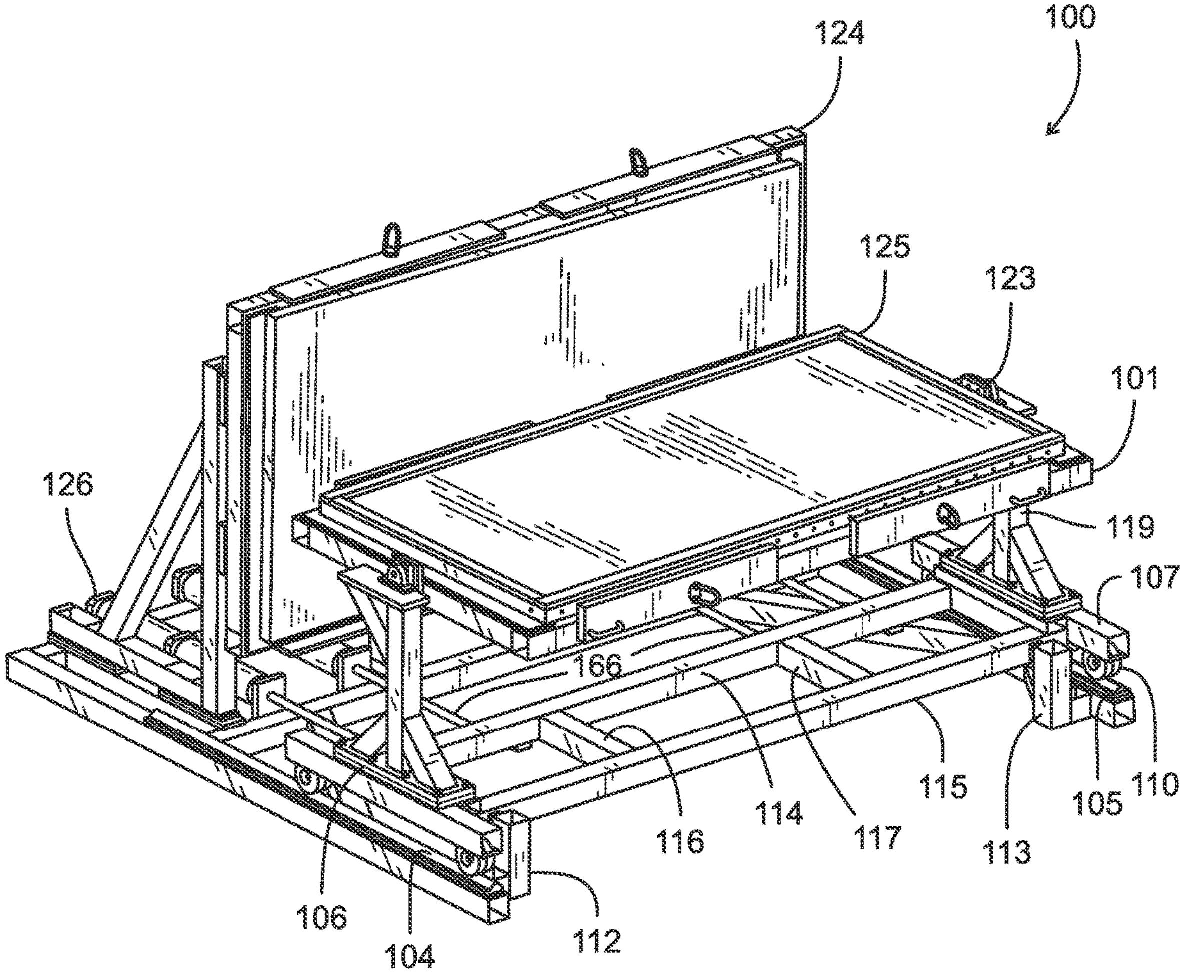
FIG. 47 is a perspective view of an alternative preferred embodiment of the method and apparatus of the present invention showing a mold in an open position.
Figure 48:
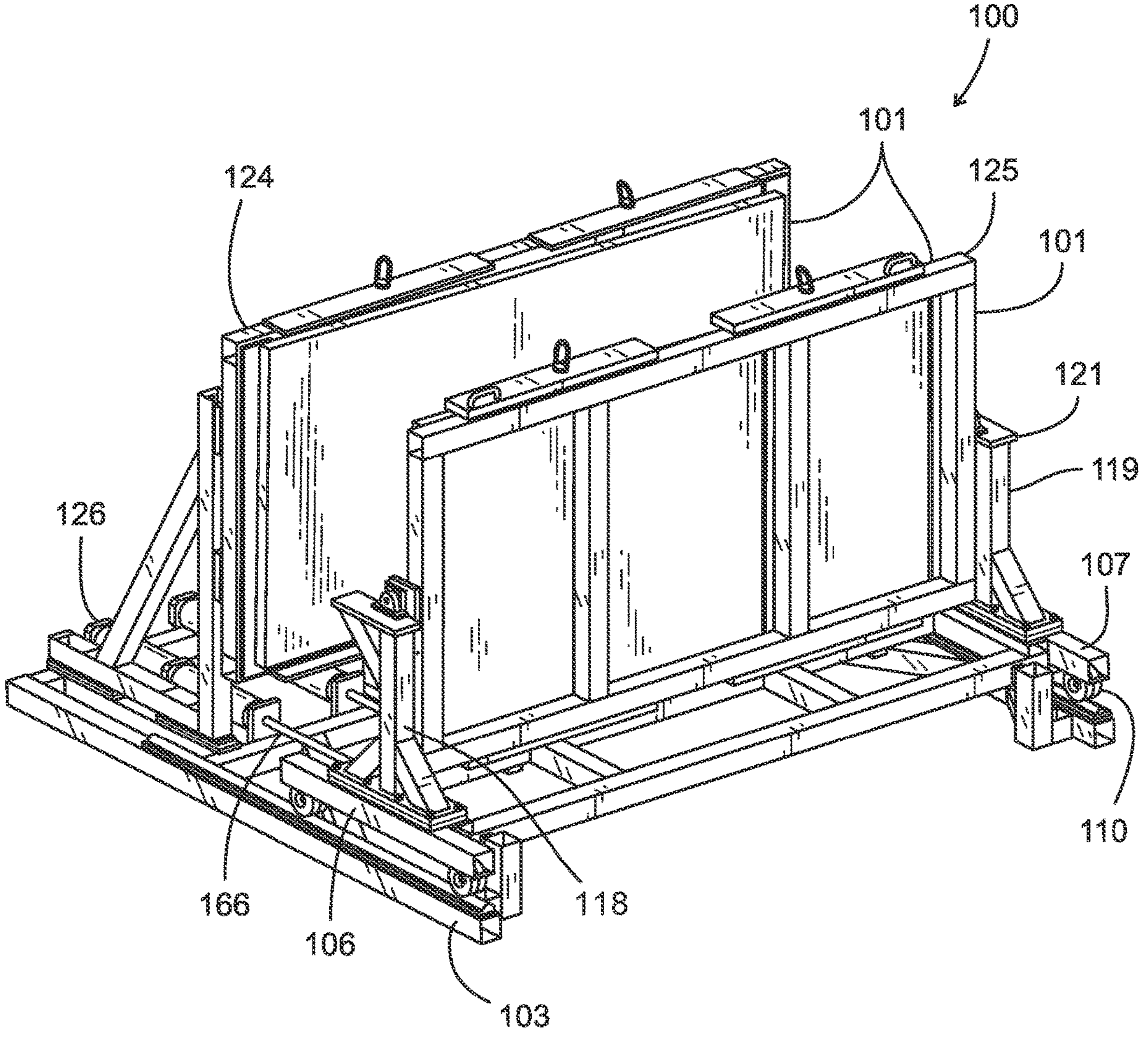
FIG. 48 is a perspective view of an alternative embodiment of the method and apparatus of the present invention showing mold in an extended position.
Figure 49:
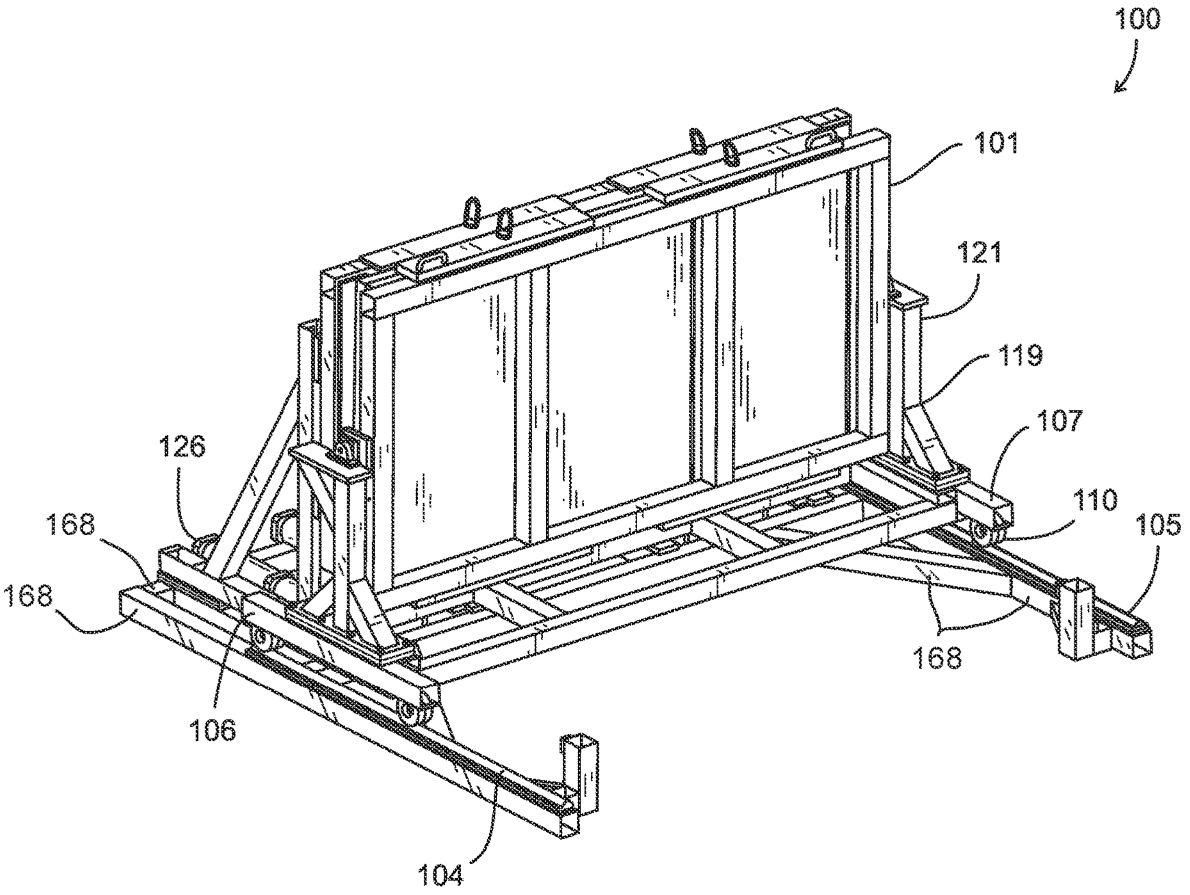
FIG. 49 is a perspective view of an alternative preferred embodiment of the method and apparatus of the present invention showing a mold in a closed position.

As seen in FIG. 47, carriages 106, 107 can be connected with traverse beams 114, 115. Beams 114, 115 can be welded to carriages 106, 107, for example. Beams 116, 117 can be welded to beams 114, 115 as seen in FIG. 47.

Figure 46:
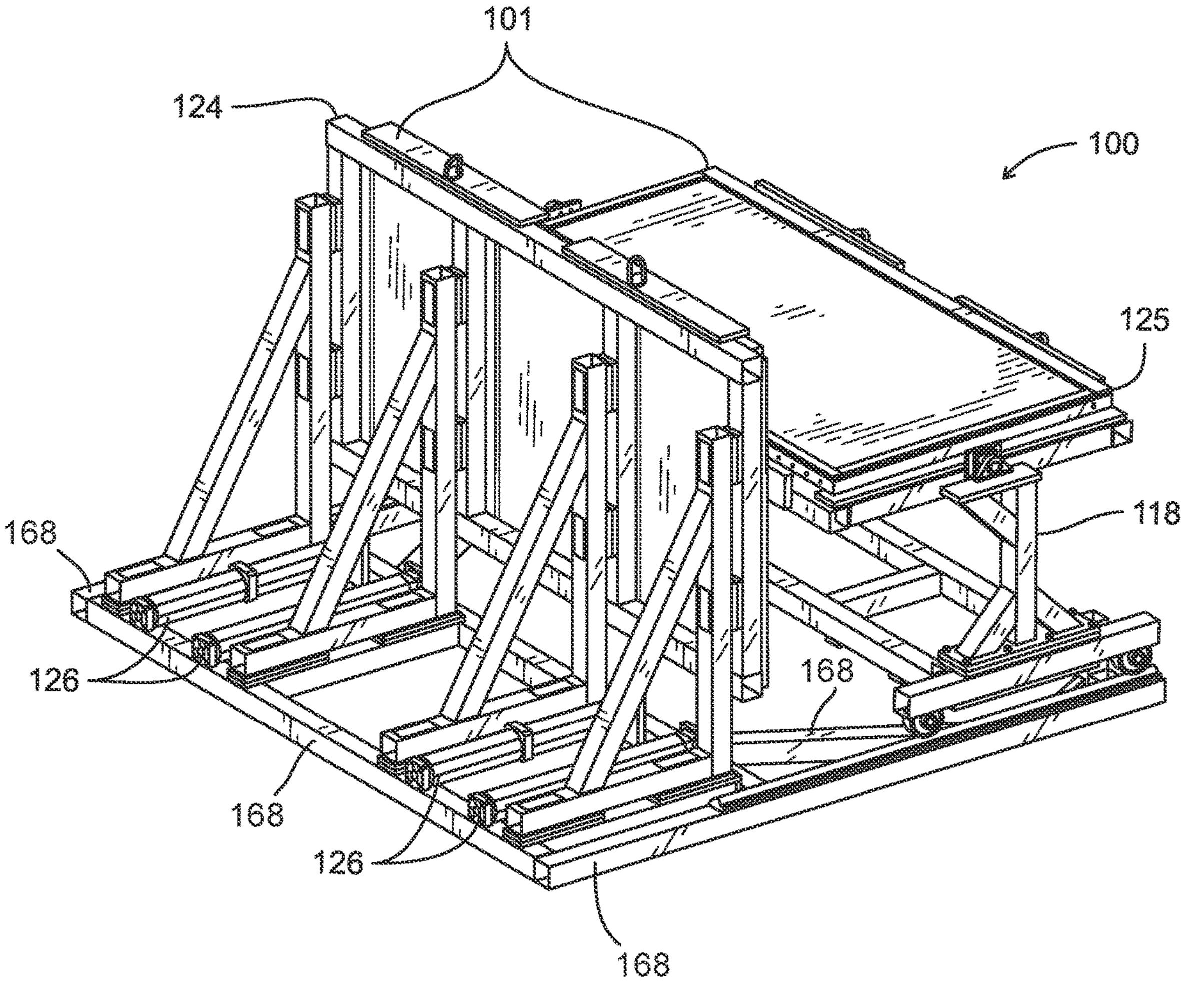
FIG. 46 is a perspective view of an alternative preferred embodiment of the method and apparatus of the present invention showing a mold in an open position.

Inclined supports 118, 119 can be mounted to carriages 106, 107. As seen in FIGS. 44-47, each inclined support 118, 119 has an upper end portion 120, 121 preferably with a rotary bearing 122, 123. The rotary bearings 122, 123 can enable mold or molding tool 101 to rotate from a generally inclined or vertical position of FIGS. 44, 45, 45A, 48 and 49 to a more horizontal position as seen in FIGS. 46-47.

The mold sections 124, 125 can include one fixed section, e.g., mold section 124 as shown in the figures, and one movable section, e.g., mold section 125 as shown in the figures. Extendable rams (e.g., pneumatic rams) 126 have pushrods 166 that can move section 125 between the closed position of FIG. 44 and the opened position of FIGS. 45, 45A, 46. In the opened position of Figures of 45, 45A, 46 the movable section 125 can be rotated from an inclined position to a generally horizontal position (e.g., rotate about ninety (90) degrees) so that the cast panel 20, 21 or 22 can be easily removed by lifting the panel 20, 21 or 22 upwardly. To firmly lock the panels/sections 124, 125 together, a cam locking mechanism 127 can be mounted to the top and to the bottom of mold 101 (see FIG. 56). In FIGS. 51, 52, 55 and 56, the cam locking mechanism can include posts 128 at the top and bottom of moving mold section 125 and moving (sliding) bar or rod 129 fitted with hooks 130. When bar or rod 129 slides laterally, the hooks 130 engage the posts 128. The hooks 130 have camming surfaces that tightly pull the panels 124, 125 together when the hooks 130 engage the posts 128. An actuator, e.g., pneumatic can be used to slide bar or rod 129 for engaging posts 128 with hooks 130.

In one embodiment, each mold section 124, 125 can be temperature controlled using a selected fluid (e.g., water). Each panel 124, 125 preferably has an internal channel/internal water channel or course 131 (see FIGS. 58, 59). Hoses or other manifolding 145 can be used to supply water to the channels or water channels 131 of panels 124, 125 (see FIG. 57). As seen in FIG. 50, water temperature can be controlled to a desired temperature using a cooler/chiller 151 or a heater 150. Movable panel 125 has cavity 132 surrounded by peripheral members 133, 134, 135, 136. Each peripheral member 133-136 has a thickness that defines the thickness of mold cavity 132 and thus the thickness of the case panel 20, 21, 22. Mold section 125 has a flow inlet fitting 137 and flow outlet fitting 138. A seal member 140 extends around the periphery of mold section 125. Seal member 140 can occupy a milled out recess 139 in the peripheral members 133-136. As seen in FIGS. 51, 52, 53 and 54, inlet fitting 137 can be placed lower than outlet fitting 138. Inlet fitting 137 can be fitted with an inlet flow line that occupies cylindrically shaped opening 141 defined by inlet fittings 137 on both panels or sections 124, 125. A vent hose can be placed in cylindrically shaped opening 142 defined by outlet fittings 138 on both panels or sections 124, 125. During filling of mold cavity 132, outlet fitting 138 at first vents air. As cavity 132 reaches full capacity, the liquid influent will reach outlet fitting 138 to indicate to a technician that inflow should stop. Alternatively, metering positive displacement pump 146 (FIG. 50) could specify that a certain volume of fluid should be pumped before pumping is stopped.

For preparation of a concrete surface for bonding, first ensure a sound surface free of any substances that may inhibit the bonding between the two substrates. Surface prep can be in accordance with ASTM D4259, or ACI 503R. It is recommended, but not required, to lightly abrade the panel bonding surface using commercially known means or methods.

Panel Installation

Upon completion of the surface preparation, the adhesive will be applied to molded panel and/or concrete surface making sure to meet adhesive coverage and application requirements. In this step, operators will ensure that all application tools remain clean and free of bond-inhibiting substances throughout the adhesive application. After installation the adhesive will be allowed to cure.

Panel Properties and Performance

Testing was performed based on representative specimens machined from molded panels. These panels were prepared using the resin Proxima HPR 2102 and curative CT-714 along with microsphere filler additive.

| Property | Test Standard | MPa | psi |
|---|---|---|---|
| Flexural Strength | ASTM D790 | 57 | 8,300 |
| Flexural Modulus | ASTM D790 | 2280 | 330,700 |
| Compression Strength | ASTM D695 | 60 | 8,700 |
| Compression Modulus | ASTM D695 | 1630 | 236,400 |
| Tensile Strength | ASTM D638 | 27 | 3,900 |
| Tensile Modulus | ASTM D638 | 2290 | 332,100 |
| Tensile Strain At Break, % | ASTM D638 | 3.3% | 3.3% |
| Tg, DSC | ASTM E1356 | 144 °C | 291 °F |
| Density, g/cc, cured | Internal | 0.96 g/cc | NA |
| Thermal Conductivity, 25 °C | ASTM C518 | 0.169 W/m-K | NA |

The above tests are preferably performed on a regular basis for internal evaluations and provides this data as an indication of typical performance.

The following is a list of parts and materials suitable for use in the present invention:

PARTS LIST:

| PART NUMBER | DESCRIPTION |
|---|---|
| 10 | trench apparatus/LNG trench |
| 11 | section/straight trough section |
| 12 | bottom wall |
| 13 | side wall |
| 14 | side wall |
| 15 | end portion |
| 16 | end portion |
| 17 | connection/interlocking connection |
| 18 | adhesive/bonder paste |
| 19 | tool/trowel |
| 20 | bottom panel |
| 21 | side panel |
| 22 | side panel |
| 23 | mold |
| 24 | frame |
| 25 | leg |
| 26 | peripheral frame/beams/rectangular periphery |
| 27 | cavity |
| 28 | insulating polymer concrete material/cryogenic grade insulating material |
| 30 | section |
| 31 | section |
| 32 | section |
| 33 | corner trough section/bend |
| 34 | corner trough section/bend |
| 35 | corner trough section/bend |
| 36 | trough riser section/wall riser section |
| 37 | trough lap joint |
| 38 | trough expansion joint |
| 39 | bellow |
| 40 | recess |
| 41 | water-tight fire-resistant seal |
| 42 | riser to trough connection detail |
| 44 | anchor bolt |
| 45 | opening/tie down hole |
| 46 | end trough section |
| 47 | rod/pin/fastener |
| 48 | void space/recess/cavity |
| 49 | curved section |
| 50 | flange |
| 51 | anchor/anchor bolt |
| 52 | tab |
| 53 | gap |
| 54 | bellow joint |
| 55 | bellow joint |
| 55A | bellow joint |
| 56 | bellow |
| 57 | curved section |
| 58 | flange |
| 59 | angle beam |
| 60 | void space |
| 61 | gap |
| 62 | seal |
| 63 | galvanized tubing/tubing section |
| 64 | anchor bolt |
| 65 | bolt/anchor bolt |
| 66 | non-sag filler |
| 67 | nosing |
| 68 | tongue and groove connection |
| 69 | gap |
| 70 | non-sag sealer/sealing material |
| 71 | non-sag sealer/sealing material |
| 72 | vertical channel/opening |
| 73 | cover plate |
| 74 | arrow |
| 75 | angle plate/tab |
| 76 | non-sag filler |
| 77 | fastener |
| 78 | bolt |
| 79 | gap |
| 80 | gap/joint |
| 81 | mesh/woven material/tape |
| 82 | non-sag sealer/sealant |
| 83 | non-sag joint sealant |
| 88 | connecting portion |
| 98 | void space/recess/cavity |
| 100 | molding apparatus/pump and mold system |
| 101 | molding tool/mold |
| 102 | frame |
| 103 | base |
| 104 | rail |
| 105 | rail |
| 106 | carriage |
| 107 | carriage |
| 108 | wheel/caster |
| 109 | wheel/caster |
| 110 | wheel/caster |
| 111 | wheel/caster |
| 112 | stop |
| 113 | stop |
| 114 | transverse beam |
| 115 | transverse beam |
| 116 | beam |
| 117 | beam |
| 118 | inclined support |
| 119 | inclined support |
| 120 | upper end |
| 121 | upper end |
| 122 | bearing/rotary bearing |
| 123 | bearing/rotary bearing |
| 124 | mold section/panel/fixed panel |
| 125 | mold section/panel/moving panel |
| 126 | extensible ram/pneumatic ram/actuator |
| 127 | cam locking mechanism |
| 128 | post |
| 129 | bar/rod |
| 130 | hook |
| 131 | water channel/water course |
| 132 | mold cavity |
| 133 | peripheral member |
| 134 | peripheral member |
| 135 | peripheral member |
| 136 | peripheral member |
| 137 | flow inlet fitting |
| 138 | flow outlet fitting |
| 139 | milled recess |
| 140 | seal member |
| 141 | cylindrically shaped opening |
| 142 | cylindrically shaped opening |
| 143 | resin tank/tank/resin bulk storage tank |
| 144 | day tank |
| 145 | manifolding/water flow lines/hoses |
| 146 | pump/positive displacement pump |
| 147 | catalyst/catalyst tank |
| 148 | microspheres/microspheres container |
| 149 | tank/water tank |
| 150 | thermolator/heater/heat exchanger |
| 151 | chiller/cooler |
| 152 | flow line |
| 153 | flow line/inlet fitting |
| 154 | flow line |
| 155 | flow line |
| 156 | flow line |
| 157 | flow line |
| 158 | flow line |
| 159 | flow line |
| 160 | flow line |
| 161 | flow line |
| 162 | nitrogen injection/gas injection |
| 163 | nitrogen injection/gas injection |
| 164 | vacuum pump |
| 165 | mixer |

-continued

| PARTS LIST: | |
|---|---|
| PART NUMBER | DESCRIPTION |
| 166 | pushrod |
| 167 | flow line |
| 168 | beam |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A method of constructing a trough for containing a cryogenic spill, comprising the steps of:

a) constructing multiple precast concrete sections, each precast concrete section having a bottom wall and spaced apart side walls connected to and extending up from said bottom wall;

b) wherein in step “a” each said precast concrete section has end portions that enable connection to another said precast concrete section;

c) applying a layer of cryogenic insulative material to the bottom wall and side walls of each said precast concrete section, wherein said layer is a panel cast in a mold having first and second mold sections;

d) wherein said mold sections move relative to one another between opened and closed positions e) wherein said mold sections form an unfilled cavity when in said closed position;

f) wherein one or both of said mold sections are movable between a lowered position and an elevated, inclined position;

g) placing the mold sections in the elevated, inclined position;

h) closing the mold sections;

i) filling the mold cavity after steps “g” and “h” and when the first and second mold sections are in the closed position and in the elevated, inclined position;

j) connecting end portions of some said precast concrete sections to end portions of other said precast concrete sections to form connections;

k) applying an epoxy grout to the connections of step “i”; and l) wherein in step “j” said connections of step “j” includes spacing the said end portions apart to form a gap and filling the gap with a seal.

2. The method of claim 1 wherein in step “c” each said layer is between about one quarter and one-half inch thick.

3. The method of claim 2 wherein the cryogenic insulating material includes polymeric concrete.

4. The method of claim 1 wherein at least one of the side walls has a side wall height and wherein said layer extends vertically only part of said side wall height.

5. The method of claim 1 further comprising the step of cooling at least one of the mold sections during step “i”.

6. The method of claim 1 further comprising the step of heating at least one of the mold sections during step “i”.

7. The method of claim 1 further comprising rotating one of the mold sections to a less inclined position after step “i”.

8. The method of claim 7, further comprising removing the panel when said mold section is in the less inclined position.

9. The method of claim 1 wherein at least one of the panels is a rotatable panel in said opened position and further comprising rotating the rotatable panel to said closed position.

10. A method of constructing a trench for containing a cryogenic spill, comprising the steps of:

a) constructing multiple precast concrete sections, each precast concrete section having a bottom wall and spaced apart side walls connected to and extending up from said bottom wall;

b) wherein in step “a” each precast concrete section has end portions that enable connection to another said precast concrete section; and c) applying a panel of cryogenic insulative material to the bottom wall and side walls of each said precast concrete section;

d) wherein each said panel is cast in a mold comprised of first and second mold sections that move relative to each other between opened and closed positions, wherein in said closed position said mold sections form an empty mold cavity that is configured to be filled with liquid cryogenic insulative material;

e) wherein at least one said mold section is movable to an elevated, inclined position that also defines the closed position;

f) placing the mold sections in the elevated, inclined position;

g) closing the mold sections; and h) filling the empty cavity with liquid cryogenic material when in the closed position.

11. The method of claim 10 wherein the cryogenic insulating material includes polymeric concrete.

12. The method of claim 10 further comprising the step of cooling at least one of the mold sections during step “h”.

13. The method of claim 10 further comprising the step of heating at least one of the mold sections during step “h”.

14. The method of claim 10 further comprising rotating one of the mold sections to a less inclined position after step “h”.

15. The method of claim 14, further comprising removing the cryogenic insulative panel when the mold section is in the less inclined position.

16. The method of claim 10 wherein at least one of the panels is a rotatable panel in said opened position and further comprising rotating the rotatable panel to form the closed position.

17. A method of installing a trench for containing a cryogenic spill, comprising the steps of:

a) constructing multiple precast concrete sections, each said precast concrete section having a bottom wall and spaced apart side walls connected to and extending up from said bottom wall;

b) wherein in step “a” each said precast concrete section has end portions that enable connection to another said precast concrete section;

c) applying a panel of cryogenic insulating material to the bottom wall and side walls of each said precast concrete section;

d) wherein said panel is cast in a mold comprised of first and second mold sections that move relative to one another between opened and closed positions, said closed position providing an empty mold cavity;

e) one of said mold sections being rotatable between inclined, upright and lowered, generally horizontal positions;

f) filling said empty mold cavity with liquid cryogenic material when said mold sections are in the closed and inclined, upright positions;

g) removing the panel from the mold cavity after step “f”;

h) transporting said precast concrete sections from a first location to a second location;

i) at said second location, connecting end portions of some said precast concrete sections to other end portions of other said precast concrete sections to form connections; and j) applying an epoxy grout to the connections of step “i” at said second location.

18. The method of claim 17 wherein the panel is between about one half and three inches thick.

19. The method of claim 17 wherein the panel is a polymeric concrete material.

20. The method of claim 17 wherein at least one of the side walls has a side wall height and wherein in step “c” the panel extends vertically only part of said side wall height.

21. The method of claim 17 wherein the precast concrete sections have openings through the bottom wall at one or both of said end portions.

22. The method of claim 17 wherein the panel is about ⅛ inch to 2 inches thick.

23. A method of installing a trench for containing a cryogenic spill, comprising the steps of:

a) constructing multiple precast concrete sections, each precast concrete section having a bottom wall and spaced apart side walls connected to and extending up from said bottom wall;

b) wherein in step “a” each said precast concrete section has end portions that enable connection to another said precast concrete section;

c) applying a panel of cryogenic material to the bottom wall and side walls of each said precast concrete section;

d) wherein the panel of step “c” is cast in a mold having a plurality of mold sections that are movable between open and closed positions;

e) providing an empty mold cavity that is formed when said mold sections are in the closed position;

f) placing the mold sections in an inclined position;

g) filling the empty mold cavity with a resin mixed with a catalyst and multiple microspheres;

h) transporting the precast concrete sections from a first location to a second location; and i) at said second location, connecting the precast concrete sections together using connections of one end portion to another end portion.

* * * * *